(12) United States Patent
Elich et al.

(10) Patent No.: US 12,460,259 B2
(45) Date of Patent: Nov. 4, 2025

(54) FED-BATCH IN VITRO TRANSCRIPTION PROCESS

(71) Applicant: ModernaTX, Inc., Cambridge, MA (US)

(72) Inventors: Joseph Elich, Cambridge, MA (US); Amy E. Rabideau, Waltham, MA (US); Michael Shamashkin, Cambridge, MA (US); Rosalie Philpot, Cambridge, MA (US); Brian Fritz, Norwood, MA (US); Peter Wojciechowski, Cambridge, MA (US)

(73) Assignee: ModernaTX, Inc., Cambridge, MA (US)

(*) Notice: Subject to any disclaimer, the term of this patent is extended or adjusted under 35 U.S.C. 154(b) by 1033 days.

(21) Appl. No.: 17/438,049

(22) PCT Filed: Mar. 11, 2020

(86) PCT No.: PCT/US2020/021955
§ 371 (c)(1),
(2) Date: Sep. 10, 2021

(87) PCT Pub. No.: WO2020/185811
PCT Pub. Date: Sep. 17, 2020

(65) Prior Publication Data
US 2022/0145381 A1 May 12, 2022

Related U.S. Application Data

(60) Provisional application No. 62/816,734, filed on Mar. 11, 2019.

(51) Int. Cl.
*C12Q 1/6865* (2018.01)
*C12N 15/10* (2006.01)
*C12N 15/67* (2006.01)

(52) U.S. Cl.
CPC .......... *C12Q 1/6865* (2013.01); *C12N 15/10* (2013.01); *C12N 15/67* (2013.01)

(58) Field of Classification Search
None
See application file for complete search history.

(56) References Cited

U.S. PATENT DOCUMENTS

| | | | |
|---|---|---|---|
| 5,256,555 A | 10/1993 | Milburn et al. | |
| 5,756,264 A | 5/1998 | Schwartz et al. | |
| 6,022,715 A | 2/2000 | Merenkova et al. | |
| 6,096,503 A | 8/2000 | Sutcliffe et al. | |
| 6,100,024 A | 8/2000 | Hudson et al. | |
| 6,528,262 B1 | 3/2003 | Gilad et al. | |
| 6,969,587 B2 | 11/2005 | Taylor | |
| 8,383,340 B2 | 2/2013 | Ketterer et al. | |
| 8,710,200 B2 | 4/2014 | Schrum et al. | |
| 8,754,062 B2 | 6/2014 | De Fougerolles et al. | |
| 8,822,663 B2 | 9/2014 | Schrum et al. | |
| 8,980,864 B2 | 3/2015 | Hoge et al. | |
| 8,999,380 B2 | 4/2015 | Bancel et al. | |
| 9,221,891 B2 | 12/2015 | Bancel et al. | |
| 9,283,287 B2 | 3/2016 | Bancel et al. | |
| 9,303,079 B2 | 4/2016 | Bancel et al. | |
| 9,364,433 B2 | 6/2016 | Andersson et al. | |
| 9,464,124 B2 | 10/2016 | Bancel et al. | |
| 9,512,456 B2 | 12/2016 | Wang et al. | |
| 9,533,047 B2 | 1/2017 | de Fougerolles et al. | |
| 9,572,896 B2 | 2/2017 | Bancel et al. | |
| 9,597,380 B2 | 3/2017 | Chakraborty et al. | |
| 9,675,668 B2 | 6/2017 | Bancel et al. | |
| 9,868,691 B2 | 1/2018 | Benenato et al. | |
| 9,872,900 B2 | 1/2018 | Ciaramella et al. | |
| 10,023,626 B2 | 7/2018 | Bolen et al. | |
| 10,064,934 B2 | 9/2018 | Ciaramella et al. | |
| 10,064,935 B2 | 9/2018 | Ciaramella et al. | |
| 10,124,055 B2 | 11/2018 | Ciaramella et al. | |
| 10,207,010 B2 | 2/2019 | Besin et al. | |
| 10,232,055 B2 | 3/2019 | Kariko et al. | |
| 10,273,269 B2 | 4/2019 | Ciaramella | |
| 10,286,086 B2 | 5/2019 | Roy et al. | |
| 10,323,076 B2 | 6/2019 | Ellsworth et al. | |
| 10,385,088 B2 | 8/2019 | Fraley et al. | |
| 10,449,244 B2 | 10/2019 | Ciaramella et al. | |
| 10,465,190 B1 | 11/2019 | Chen et al. | |
| 10,493,143 B2 | 12/2019 | Ciaramella et al. | |
| 10,526,629 B2 | 1/2020 | Rabideau et al. | |
| 10,653,712 B2 | 5/2020 | Hoge | |

(Continued)

FOREIGN PATENT DOCUMENTS

CN 102076847 A 5/2011
CN 102177236 A 9/2011
(Continued)

OTHER PUBLICATIONS

DASbox® Mini Bioreactor System for cell culture and microbiology; Published in 2017 by Eppendorf AG (Year: 2017).*
McCalla et al. "Quantifying transcription of clinically relevant immobilized DNA within a continuous flow microfluidic reactor." Langmuir 26.17 (2010): 14372-14379 (Year: 2010).*
Kern JA, Davis RH. Application of a fed-batch system to produce RNA by in vitro transcription. Biotechnol Prog. Mar.-Apr. 1999;15(2):174-84. doi: 10.1021/bp990008g. PMID: 10194392. (Year: 1999).*

(Continued)

*Primary Examiner* — Aaron A Priest
*Assistant Examiner* — Tian Yu
(74) *Attorney, Agent, or Firm* — Wolf, Greenfield & Sacks, P.C.

(57) ABSTRACT

The present disclosure provides methods of in vitro transcribing a ribonucleic acid (RNA) of interest. In some embodiments, such methods include determining consumption rates of nucleoside triphosphates (NTPs).

19 Claims, 23 Drawing Sheets
Specification includes a Sequence Listing.

(56) References Cited

U.S. PATENT DOCUMENTS

| | | |
|---|---|---|
| 10,653,767 B2 | 5/2020 | Ciaramella et al. |
| 10,695,419 B2 | 6/2020 | Ciaramella et al. |
| 10,857,105 B2 | 12/2020 | Benenato et al. |
| 10,925,958 B2 | 2/2021 | Ciaramella |
| 11,027,025 B2 | 6/2021 | Hoge et al. |
| 11,045,540 B2 | 6/2021 | Ciaramella |
| 11,103,578 B2 | 8/2021 | Ciaramella et al. |
| 11,174,500 B2 | 11/2021 | Parella et al. |
| 11,279,923 B2 | 3/2022 | Funker et al. |
| 11,351,242 B1 | 6/2022 | Lori et al. |
| 11,384,352 B2 | 7/2022 | Miracco |
| 11,406,703 B2 | 8/2022 | Kramarczyk et al. |
| 11,464,848 B2 | 10/2022 | Ciaramella et al. |
| 11,485,960 B2 | 11/2022 | Dousis et al. |
| 11,497,807 B2 | 11/2022 | Ciaramella et al. |
| 11,564,893 B2 | 1/2023 | Smith |
| 11,576,961 B2 | 2/2023 | Ciaramella et al. |
| 11,643,441 B1 | 5/2023 | Ciaramella et al. |
| 11,696,946 B2 | 7/2023 | Ciaramella |
| 11,752,206 B2 | 9/2023 | Ciaramella et al. |
| 11,786,607 B2 | 10/2023 | Hoge et al. |
| 11,851,694 B1 | 12/2023 | Mauger et al. |
| 11,866,696 B2 | 1/2024 | Issa et al. |
| 11,872,278 B2 | 1/2024 | Ciaramella et al. |
| 11,905,525 B2 | 2/2024 | Brito et al. |
| 11,911,453 B2 | 2/2024 | Ciaramella et al. |
| 11,912,982 B2 | 2/2024 | Issa et al. |
| 12,070,495 B2 | 8/2024 | Lusso et al. |
| 12,151,029 B2 | 11/2024 | Hennessy et al. |
| 2001/0001066 A1 | 5/2001 | Cezayirli et al. |
| 2001/0005506 A1 | 6/2001 | Cezayirli et al. |
| 2003/0135040 A1 | 7/2003 | Eritja et al. |
| 2003/0165849 A1 | 9/2003 | Zhang et al. |
| 2005/0287539 A1 | 12/2005 | Labourier et al. |
| 2006/0247195 A1 | 11/2006 | Ray |
| 2007/0281336 A1 | 12/2007 | Jendrisak et al. |
| 2008/0220471 A1 | 9/2008 | Davis et al. |
| 2010/0028943 A1 | 2/2010 | Thomas et al. |
| 2010/0048883 A1 | 2/2010 | Ketterer et al. |
| 2010/0291156 A1 | 11/2010 | Barner et al. |
| 2012/0301955 A1 | 11/2012 | Thomas et al. |
| 2013/0059344 A1 | 3/2013 | Striedner et al. |
| 2013/0102034 A1 | 4/2013 | Schrum et al. |
| 2013/0236974 A1 | 9/2013 | De Fougerolles |
| 2013/0245103 A1 | 9/2013 | de Fougerolles et al. |
| 2013/0259923 A1 | 10/2013 | Bancel et al. |
| 2013/0266640 A1 | 10/2013 | De Fougerolles et al. |
| 2014/0142290 A1 | 5/2014 | Madden et al. |
| 2014/0147432 A1 | 5/2014 | Bancel et al. |
| 2014/0148502 A1 | 5/2014 | Bancel et al. |
| 2014/0193482 A1 | 7/2014 | Bancel et al. |
| 2014/0206752 A1 | 7/2014 | Afeyan et al. |
| 2014/0275229 A1 | 9/2014 | Bancel et al. |
| 2014/0328825 A1 | 11/2014 | Meis et al. |
| 2014/0378538 A1 | 12/2014 | Bancel |
| 2015/0051268 A1 | 2/2015 | Bancel et al. |
| 2015/0056253 A1 | 2/2015 | Bancel et al. |
| 2015/0141499 A1 | 5/2015 | Bancel et al. |
| 2015/0307542 A1 | 10/2015 | Roy et al. |
| 2015/0315541 A1 | 11/2015 | Bancel et al. |
| 2016/0024140 A1 | 1/2016 | Issa et al. |
| 2016/0024141 A1 | 1/2016 | Issa et al. |
| 2016/0032273 A1 | 2/2016 | Shahrokh et al. |
| 2016/0032316 A1 | 2/2016 | Weissman et al. |
| 2016/0038612 A1 | 2/2016 | Hoge et al. |
| 2016/0194368 A1 | 7/2016 | Hoge et al. |
| 2016/0194625 A1 | 7/2016 | Hoge et al. |
| 2016/0243221 A1 | 8/2016 | Hoge et al. |
| 2016/0317647 A1 | 11/2016 | Ciaramella et al. |
| 2017/0009244 A1 | 1/2017 | Sahin et al. |
| 2017/0043037 A1 | 2/2017 | Kariko et al. |
| 2017/0114378 A1* | 4/2017 | Wochner ............ C12M 41/26 |
| 2017/0130255 A1 | 5/2017 | Wang et al. |
| 2017/0202979 A1 | 7/2017 | Chakraborty et al. |
| 2017/0204152 A1 | 7/2017 | Nelson et al. |
| 2017/0247670 A1 | 8/2017 | Ong et al. |
| 2017/0340724 A1 | 11/2017 | Ciaramella et al. |
| 2017/0340725 A1 | 11/2017 | Ciaramella et al. |
| 2018/0000953 A1 | 1/2018 | Almarsson et al. |
| 2018/0002393 A1 | 1/2018 | Bancel et al. |
| 2018/0028645 A1 | 2/2018 | Ciaramella et al. |
| 2018/0028664 A1 | 2/2018 | Besin et al. |
| 2018/0237849 A1 | 8/2018 | Thompson |
| 2018/0243225 A1 | 8/2018 | Ciaramella |
| 2018/0243230 A1 | 8/2018 | Smith |
| 2018/0251754 A1 | 9/2018 | DeRosa et al. |
| 2018/0256628 A1 | 9/2018 | Hoge et al. |
| 2018/0271795 A1 | 9/2018 | Martini et al. |
| 2018/0271970 A1 | 9/2018 | Ciaramella et al. |
| 2018/0273977 A1 | 9/2018 | Mousavi et al. |
| 2018/0274009 A1 | 9/2018 | Marquardt et al. |
| 2018/0280496 A1 | 10/2018 | Ciaramella et al. |
| 2018/0289792 A1 | 10/2018 | Ciaramella et al. |
| 2018/0303929 A1 | 10/2018 | Ciaramella et al. |
| 2018/0311336 A1 | 11/2018 | Ciaramella et al. |
| 2018/0311343 A1 | 11/2018 | Huang et al. |
| 2018/0312549 A1 | 11/2018 | Ciaramella |
| 2018/0318409 A1 | 11/2018 | Valiante et al. |
| 2018/0363019 A1 | 12/2018 | Hoge |
| 2018/0369374 A1 | 12/2018 | Frederick et al. |
| 2018/0371047 A1 | 12/2018 | Ticho et al. |
| 2019/0002851 A1 | 1/2019 | Miller et al. |
| 2019/0002890 A1 | 1/2019 | Martini et al. |
| 2019/0008938 A1 | 1/2019 | Ciaramella et al. |
| 2019/0085368 A1 | 3/2019 | Bancel et al. |
| 2019/0099481 A1 | 4/2019 | Ciaramella et al. |
| 2019/0125839 A1 | 5/2019 | Frederick et al. |
| 2019/0175517 A1 | 6/2019 | Martini et al. |
| 2019/0175727 A1 | 6/2019 | Huang et al. |
| 2019/0192646 A1 | 6/2019 | Cohen et al. |
| 2019/0192653 A1 | 6/2019 | Hoge et al. |
| 2019/0241633 A1 | 8/2019 | Fotin-Mleczek et al. |
| 2019/0275170 A1 | 9/2019 | Benenato et al. |
| 2019/0298657 A1 | 10/2019 | Martini et al. |
| 2019/0298658 A1 | 10/2019 | Benenato |
| 2019/0300906 A1 | 10/2019 | Martini et al. |
| 2019/0314292 A1 | 10/2019 | Benenato et al. |
| 2019/0336452 A1 | 11/2019 | Brader |
| 2019/0351040 A1 | 11/2019 | Valiante et al. |
| 2019/0382774 A1 | 12/2019 | Hoge et al. |
| 2019/0390181 A1 | 12/2019 | Benenato et al. |
| 2020/0030432 A1 | 1/2020 | Ciaramella et al. |
| 2020/0032274 A1 | 1/2020 | Mauger et al. |
| 2020/0038499 A1 | 2/2020 | Narayanan et al. |
| 2020/0054737 A1 | 2/2020 | Ciaramella et al. |
| 2020/0069599 A1 | 3/2020 | Smith et al. |
| 2020/0071689 A1 | 3/2020 | Miracco |
| 2020/0085916 A1 | 3/2020 | Martini et al. |
| 2020/0109420 A1 | 4/2020 | Brito et al. |
| 2020/0129445 A1 | 4/2020 | Patel et al. |
| 2020/0129608 A1 | 4/2020 | Ciaramella et al. |
| 2020/0129615 A1 | 4/2020 | Ciaramella et al. |
| 2020/0239869 A1 | 7/2020 | Issa et al. |
| 2020/0254086 A1 | 8/2020 | Hoge et al. |
| 2020/0282047 A1 | 9/2020 | Ciaramella et al. |
| 2020/0306191 A1 | 10/2020 | Schariter et al. |
| 2020/0338004 A1 | 10/2020 | Hansson et al. |
| 2020/0368162 A1 | 11/2020 | Martini |
| 2020/0399322 A1 | 12/2020 | Baumhof et al. |
| 2021/0046173 A1 | 2/2021 | Ciaramella et al. |
| 2021/0087135 A1 | 3/2021 | Benenato et al. |
| 2021/0145982 A1 | 5/2021 | Hoge et al. |
| 2021/0162037 A1 | 6/2021 | Jasny et al. |
| 2021/0163919 A1 | 6/2021 | Issa et al. |
| 2021/0187097 A1 | 6/2021 | Ciaramella et al. |
| 2021/0206818 A1 | 7/2021 | Huang et al. |
| 2021/0217484 A1 | 7/2021 | Giessel et al. |
| 2021/0228707 A1 | 7/2021 | Mektar et al. |
| 2021/0268086 A1 | 9/2021 | Zhong et al. |
| 2021/0309976 A1 | 10/2021 | Dousis et al. |
| 2021/0378980 A1 | 12/2021 | Horhota et al. |
| 2022/0031631 A1 | 2/2022 | Almarsson et al. |
| 2022/0047518 A1 | 2/2022 | Hennessy et al. |
| 2022/0054653 A1 | 2/2022 | Martini et al. |

(56) References Cited

U.S. PATENT DOCUMENTS

| | | |
|---|---|---|
| 2022/0062175 A1 | 3/2022 | Smith et al. |
| 2022/0062408 A1 | 3/2022 | Kramarczyk et al. |
| 2022/0125899 A1 | 4/2022 | Ashburn et al. |
| 2022/0145381 A1 | 5/2022 | Elich et al. |
| 2022/0236253 A1 | 7/2022 | Hopson |
| 2022/0347292 A1 | 11/2022 | Panther et al. |
| 2022/0348900 A1 | 11/2022 | Shamashkin et al. |
| 2022/0349006 A1 | 11/2022 | Amato et al. |
| 2023/0000970 A1 | 1/2023 | Nachbagauer et al. |
| 2023/0142529 A1 | 5/2023 | White et al. |
| 2023/0181481 A1 | 6/2023 | White et al. |
| 2023/0190761 A1 | 6/2023 | Brader et al. |
| 2023/0212645 A1 | 7/2023 | Marquardt et al. |
| 2023/0287437 A1 | 9/2023 | Smith et al. |
| 2023/0338506 A1 | 10/2023 | Shaw et al. |
| 2023/0346914 A1 | 11/2023 | Stewart-Jones et al. |
| 2023/0355743 A1 | 11/2023 | Stewart-Jones et al. |
| 2024/0100145 A1 | 3/2024 | Bollman et al. |
| 2024/0100151 A1 | 3/2024 | Carfi et al. |
| 2024/0139309 A1 | 5/2024 | Carfi et al. |
| 2024/0173400 A1 | 5/2024 | Ciaramella et al. |
| 2024/0181030 A1 | 6/2024 | Himansu et al. |
| 2024/0207392 A1 | 6/2024 | Chandramouli et al. |
| 2024/0209068 A1 | 6/2024 | Deal et al. |
| 2024/0226028 A1 | 7/2024 | Goldman et al. |
| 2024/0226277 A1 | 7/2024 | Nachbagauer et al. |
| 2024/0229109 A1 | 7/2024 | Rabideau et al. |
| 2024/0238211 A1 | 7/2024 | Brader et al. |
| 2024/0263226 A1 | 8/2024 | Schmitt |
| 2024/0285754 A1 | 8/2024 | Stewart-Jones |
| 2024/0293534 A1 | 9/2024 | Stewart-Jones |
| 2024/0299531 A1 | 9/2024 | Stewart-Jones |
| 2024/0358819 A1 | 10/2024 | Stewart-Jones |
| 2024/0368580 A1 | 11/2024 | Geng et al. |
| 2024/0382581 A1 | 11/2024 | Stewart-Jones et al. |
| 2024/0383940 A1 | 11/2024 | Endo et al. |

FOREIGN PATENT DOCUMENTS

| | | |
|---|---|---|
| CN | 105051213 A | 11/2015 |
| CN | 106244608 A | 12/2016 |
| CN | 106661621 A | 5/2017 |
| CN | 108366604 A | 8/2018 |
| CN | 111032863 A | 4/2020 |
| EP | 2092064 B1 | 9/2010 |
| EP | 3119873 A1 | 1/2017 |
| WO | WO 2002/48310 A2 | 6/2002 |
| WO | WO 2004/024929 A2 | 3/2004 |
| WO | WO 2005/012487 A2 | 2/2005 |
| WO | WO 2005/118857 A2 | 12/2005 |
| WO | WO 2008/077592 A1 | 7/2008 |
| WO | WO 2011/028218 A1 | 3/2011 |
| WO | WO 2011/071931 A2 | 6/2011 |
| WO | WO 2012/038450 A1 | 3/2012 |
| WO | WO 2013/090648 A1 | 6/2013 |
| WO | WO 2013/102203 A1 | 7/2013 |
| WO | WO 2014/140211 A1 | 9/2014 |
| WO | WO 2014/144711 A1 | 9/2014 |
| WO | WO 2014/152030 A1 | 9/2014 |
| WO | WO 2014/152659 A1 | 9/2014 |
| WO | WO 2014/152966 A1 | 9/2014 |
| WO | WO 2014/159813 A1 | 10/2014 |
| WO | WO 2014/160243 A1 | 10/2014 |
| WO | WO 2015/085318 A2 | 6/2015 |
| WO | WO 2015/164773 A1 | 10/2015 |
| WO | WO 2015/188933 A1 | 12/2015 |
| WO | WO 2016/051170 A1 | 4/2016 |
| WO | WO 2016/164762 A1 | 10/2016 |
| WO | WO 2016/174227 A1 | 11/2016 |
| WO | WO 2016/201377 A1 | 12/2016 |
| WO | WO 2017/011773 A2 | 1/2017 |
| WO | WO 2017/015457 A1 | 1/2017 |
| WO | WO 2017/015463 A1 | 1/2017 |
| WO | WO 2017/019935 A1 | 2/2017 |
| WO | WO 2017/020026 A1 | 2/2017 |
| WO | WO 2017/031232 A1 | 2/2017 |
| WO | WO 2017/031241 A1 | 2/2017 |
| WO | WO 2017/062513 A1 | 4/2017 |
| WO | WO 2017/066789 A1 | 4/2017 |
| WO | WO 2017/070601 A1 | 4/2017 |
| WO | WO 2017/070616 A1 | 4/2017 |
| WO | WO 2017/070618 A1 | 4/2017 |
| WO | WO 2017/070620 A1 | 4/2017 |
| WO | WO 2017/070622 A1 | 4/2017 |
| WO | WO 2017/070623 A1 | 4/2017 |
| WO | WO 2017/182524 A1 | 4/2017 |
| WO | WO 2017/098468 A1 | 6/2017 |
| WO | WO 2017/112865 A1 | 6/2017 |
| WO | WO 2017/127750 A1 | 7/2017 |
| WO | WO 2017/201333 A1 | 11/2017 |
| WO | WO 2017/201340 A1 | 11/2017 |
| WO | WO 2017/201342 A1 | 11/2017 |
| WO | WO 2017/201347 A1 | 11/2017 |
| WO | WO 2018/053209 A1 | 3/2018 |
| WO | WO 2018/075980 A1 | 4/2018 |
| WO | WO 2018/081459 A1 | 5/2018 |
| WO | WO 2018/081462 A1 | 5/2018 |
| WO | WO 2018/089851 A1 | 5/2018 |
| WO | WO 2018/107088 A1 | 6/2018 |
| WO | WO 2018/111967 A1 | 6/2018 |
| WO | WO 2018/144082 A1 | 8/2018 |
| WO | WO 2018/144778 A1 | 8/2018 |
| WO | WO 2018/157009 A1 | 8/2018 |
| WO | WO 2018/157141 A1 | 8/2018 |
| WO | WO 2018/170245 A1 | 9/2018 |
| WO | WO 2018/170256 A1 | 9/2018 |
| WO | WO 2018/170260 A1 | 9/2018 |
| WO | WO 2018/170270 A1 | 9/2018 |
| WO | WO 2018/170347 A1 | 9/2018 |
| WO | WO 2018/175783 A1 | 9/2018 |
| WO | WO 2018/187590 A2 | 10/2018 |
| WO | WO 2018/200737 A1 | 11/2018 |
| WO | WO 2018/232355 A1 | 12/2018 |
| WO | WO 2018/232357 A1 | 12/2018 |
| WO | WO 2019/018765 A1 | 1/2019 |
| WO | WO 2019/036670 A1 | 2/2019 |
| WO | WO 2019/036682 A1 | 2/2019 |
| WO | WO 2019/036683 A1 | 2/2019 |
| WO | WO 2019/036685 A1 | 2/2019 |
| WO | WO 2019/103993 A1 | 5/2019 |
| WO | WO 2020/097509 A1 | 11/2019 |
| WO | WO 2020/056370 A1 | 3/2020 |
| WO | WO 2020/061284 A | 3/2020 |
| WO | WO 2020/061295 A1 | 3/2020 |
| WO | WO 2020/061367 A1 | 3/2020 |
| WO | WO 2020/097291 A1 | 5/2020 |
| WO | WO 2020/165158 A1 | 8/2020 |
| WO | WO 2020/172239 A1 | 8/2020 |
| WO | WO 2020/185811 A1 | 9/2020 |
| WO | WO 2020/190750 A1 | 9/2020 |
| WO | WO 2020/243561 A1 | 12/2020 |
| WO | WO 2021/030533 A1 | 2/2021 |
| WO | WO 2021/050864 A1 | 3/2021 |
| WO | WO 2021/055811 A1 | 3/2021 |
| WO | WO 2021/055849 A1 | 3/2021 |
| WO | WO 2021/155243 A1 | 8/2021 |
| WO | WO 2021/155274 A1 | 8/2021 |
| WO | WO 2021/159040 A2 | 8/2021 |
| WO | WO 2021/159130 A2 | 8/2021 |
| WO | WO 2021/211343 A1 | 10/2021 |
| WO | WO 2021/222304 A1 | 11/2021 |
| WO | WO 2021/231929 A1 | 11/2021 |
| WO | WO 2021/231963 A1 | 11/2021 |
| WO | WO 2021/237084 A1 | 11/2021 |
| WO | WO 2021/247817 A1 | 12/2021 |
| WO | WO 2022/032154 A2 | 2/2022 |
| WO | WO 2022/067010 A1 | 3/2022 |
| WO | WO 2022/221335 A1 | 10/2022 |
| WO | WO 2022/221336 A1 | 10/2022 |
| WO | WO 2022/226277 A1 | 10/2022 |
| WO | WO 2022/241103 A1 | 11/2022 |
| WO | WO 2022/245888 A1 | 11/2022 |
| WO | WO 2022/266389 A1 | 12/2022 |
| WO | WO 2023/283642 A2 | 1/2023 |

(56) References Cited

FOREIGN PATENT DOCUMENTS

| | | |
|---|---|---|
| WO | WO 2023/014649 A1 | 2/2023 |
| WO | WO 2023/018773 A1 | 2/2023 |
| WO | WO 2023/019181 A1 | 2/2023 |
| WO | WO 2023/056401 A1 | 4/2023 |
| WO | WO 2023/069625 A1 | 4/2023 |
| WO | WO 2023/069895 A1 | 4/2023 |
| WO | WO 2023/069900 A1 | 4/2023 |
| WO | WO 2023/076658 A1 | 5/2023 |
| WO | WO 2023/081311 A1 | 5/2023 |
| WO | WO 2023/092069 A1 | 5/2023 |
| WO | WO 2023/107999 A2 | 6/2023 |
| WO | WO 2023/114307 A1 | 6/2023 |
| WO | WO 2023/132885 A1 | 7/2023 |
| WO | WO 2023/137149 A1 | 7/2023 |
| WO | WO 2023/150256 A1 | 8/2023 |
| WO | WO 2023/154818 A1 | 8/2023 |
| WO | WO 2023/196914 A1 | 10/2023 |
| WO | WO 2023/201204 A1 | 10/2023 |
| WO | WO 2023/201294 A1 | 10/2023 |
| WO | WO 2023/201296 A1 | 10/2023 |
| WO | WO 2023/212696 A1 | 11/2023 |
| WO | WO 2023/225524 A1 | 11/2023 |
| WO | WO 2023/250119 A1 | 12/2023 |
| WO | WO 2024/010993 A1 | 1/2024 |
| WO | WO 2024/015890 A1 | 1/2024 |
| WO | WO 2024/026005 A1 | 2/2024 |
| WO | WO 2024/030369 A1 | 2/2024 |
| WO | WO 2024/050483 A1 | 3/2024 |
| WO | WO 2024/097874 A1 | 5/2024 |
| WO | WO 2024/123978 A1 | 6/2024 |
| WO | WO 2024/151811 A1 | 7/2024 |
| WO | WO 2024/163465 A1 | 8/2024 |
| WO | WO 2024/191860 A2 | 9/2024 |
| WO | WO 2024/206835 A1 | 10/2024 |
| WO | WO 2024/215721 A1 | 10/2024 |

OTHER PUBLICATIONS

International Search Report and Written Opinion for Application No. PCT/US2020/021955, mailed Jun. 2, 2020.
[No Author Listed], MEGAscript Kit Product Manual, Oct. 27, 2009. Ambion/Invitrogen website: http://tools.invitrogen.com/contenl/sfs/manuals/ cms_072987.pdf, (last accessed Mar. 17, 2013). 29 pages.
Andrews-Pfannkoch, C. et al., Hydroxyapatite-mediated separation of double-stranded DNA, single-stranded DNA, and RNA genomes from natural viral assemblages. Appl Environ Microbiol. Aug. 2010;76(15):5039-45. Epub Jun. 11, 2010.
Brennan, Ribonucleoside triphosphate concentration-dependent termination of bacteriophage SP01 transcription in vitro by Bacillus subtilis RNA polymerase. Virology. Jun. 1984;135(2):555-60. doi: 10.1016/0042-6822(84)90211-3.
Devoldere et al., Evading innate immunity in nonviral mRNA delivery: don't shoot the messenger. Drug Discov Today. Jan. 2016;21(1):11-25. doi: 10.1016/j.drudis.2015.07.009. Epub Jul. 23, 2015.
Easton et al., Rapid, nondenaturing RNA purification using weak anion-exchange fast performance liquid chromatography. RNA. Mar. 2010;16(3):647-53. Epub Jan. 25, 2010.
Furuichi, Caps on Eukaryotic mRNAs. eLS. John Wiley & Sons. Jul. 1-12, 2014.
Georgopoulos et al., Use of high-performance liquid chromatographic fractionation of large RNA molecules in the assay of group I intron ribozyme activity. J Chromatogr A. Jan. 28, 2000;868(1):109-14.
Gruegelsiepe et al., Handbook of RNA Biochemistry, ed. R.K. Hartmann, Part LI, pp. 3-21, 2005.
Hartmann et al., Handbook of RNA Biochemistry, Second Edition, "Part I RNA Synthesis and Detection." 2014. p 1-27.
Jia et al., Kinetic mechanism of GTP binding and RNA synthesis during transcription initiation by bacteriophage T7 RNA polymerase. J Biol Chem. Nov. 28, 1997;272(48):30147-53. doi: 10.1074/jbc.272.48.30147.

Kariko et al., Generating the optimal mRNA for therapy: HPLC purification eliminates immune activation and improves translation of nucleoside-modified, protein-encoding mRNA. Nucleic Acids Res. Nov. 2011;39(21):e142.
Kauffman et al., Optimization of Lipid Nanoparticle Formulations for mRNA Delivery in Vivo with Fractional Factorial and Definitive Screening Designs. Nano Lett. Nov. 11, 2015;15(11):7300-6. doi: 10.1021/acs.nanolett.5b02497. Epub Oct. 20, 2015.
Kern et al., Application of a Fed-Batch System to Produce RNA by in Vitro Transcription. Biotechnol Prog. Mar.-Apr. 1999;15(2):174-84. doi: 10.1021/bp990008g.
Koch, G., et al., Quantitative Studies on the Infectivity of ribonucleic acid from partially purified and highly purified poliovirus preparations. Virology. Mar. 1960; 10(3): 329-343.
Lewandowski, L.J. et al., Separation of the infectious ribonucleic acid of potato spindle tuber virus from double- stranded ribonucleic acid of plant tissue extracts. J Virol. Nov. 1971;8(5):809-12.
Mellits, K.H. et al., Removal of double-stranded contaminants from RNA transcripts: synthesis of adenovirus VA RNAI from a T7 vector. Nucleic Acids Res. Sep. 25, 1990;18(18):5401-6.
Nedialkov et al., NTP-driven translocation by human RNA polymerase II. J Biol Chem. May 16, 2003;278(20):18303-12. doi: 10.1074/jbc.M301103200. Epub Mar. 13, 2003.
Ouranidis et al., Pharma 4.0 Continuous mRNA Drug Products Manufacturing. Pharmaceutics. Aug. 31, 2021;13(9):1371. doi: 10.3390/pharmaceutics13091371.
Sahin et al., mRNA-based therapeutics—developing a new class of drugs. Nat Rev Drug Discov. Oct. 2014;13(10):759-80. doi: 10.1038/nrd4278. Epub Sep. 19, 2014.
Schmidt et al., Fast and Flexible mRNA Vaccine Manufacturing as a Solution to Pandemic Situations by Adopting Chemical Engineering Good Practice-Continuous Autonomous Operation in Stainless Steel Equipment Concepts. Processes. 2021;9(11):1874-93.
Steinle et al., Concise Review: Application of In Vitro Transcribed Messenger RNA for Cellular Engineering and Reprogramming: Progress and Challenges. Stem Cells. Jan. 2017;35(1):68-79. doi: 10.1002/stem.2402. Epub Jun. 20, 2016.
Thess et al., Sequence-engineered mRNA Without Chemical Nucleoside Modifications Enables an Effective Protein Therapy in Large Animals. Mol Ther. Sep. 2015;23(9):1456-64. doi: 10.1038/mt.2015.103. Epub Jun. 8, 2015.
Wang et al., Purification of the messenger ribonucleic acid for the lipoprotein of the *Escherichia coli* outer membrane. Biochemistry. Oct. 2, 1979;18(20):4270-7.
Weissman et al., HPLC purification of in vitro transcribed long RNA. Methods Mol Biol. 2013;969:43-54. doi: 10.1007/978-1-62703-260-5_3.
[No Author Listed], T7RNAP [Cloning vector pTara:500*]. GenBank Accession No. ATP60600. Nov. 4, 2017. Retrieved on Jan. 19, 2024 from <https://www.ncbi.nlm.nih.gov/protein/ATP60600.1?report=genbank&log$=protalign&blast_rank=8&RID=UM61W4MM016>. 1 page.
Blumenthal et al.,Q beta replicase template specificity: different templates require different GTP concentrations for initiation. Proc Natl Acad Sci U S A. May 1980;77(5):2601-5. doi: 10.1073/pnas.77.5.2601.
Choi et al., 2'-O-methylation in mRNA disrupts tRNA decoding during translation elongation. Nat Struct Mol Biol. Mar. 2018;25(3):208-216. doi: 10.1038/s41594-018-0030-z. Epub Feb. 19, 2018.
Cobb et al., Who discovered messenger RNA? Curr Biol. Jun. 29, 2015;25(13):R526-32. doi:10.1016/j.cub.2015.05.032.
Govind et al., Primer-independent initiation of RNA synthesis by SeMV recombinant RNA-dependent RNA polymerase. Virology. Jun. 5, 2010;401(2):280-92. doi: 10.1016/j.virol.2010.02.025. Epub Mar. 23, 2010.
Grodberg et al., ompT encodes the *Escherichia coli* outer membrane protease that cleaves T7 RNA polymerase during purification. J Bacteriol. Mar. 1988;170(3):1245-53. doi: 10.1128/jb.170.3.1245-1253.1988.
Kaukinen et al., The reactivity of phosphodiester bonds within linear single-stranded oligoribonucleotides is strongly dependent on the base sequence. Nucleic Acids Res. Jan. 15, 2002;30(2):468-74. doi: 10.1093/nar/30.2.468.

(56) References Cited

OTHER PUBLICATIONS

Kern et al., Application of solution equilibrium analysis to in vitro RNA transcription. Biotechnol Prog. Nov.-Dec. 1997;13(6):747-56. doi: 10.1021/bp970094p.

Leppek et al, Combinatorial optimization of mRNA structure, stability, and translation for RNA-based therapeutics. Nat Commun. Mar. 22, 2022;13(1):1536. doi: 10.1038/s41467-022-28776-w.

Nilsen et al., High-yield synthesis of RNA using T7 RNA polymerase and plasmid DNA or oligonucleotide templates. Cold Spring Harb Protoc. Nov. 1, 2013;2013(11):pdb.prot078535. doi: 10.1101/pdb.prot078535.

Pitulle et al., Initiator oligonucleotides for the combination of chemical and enzymatic RNA synthesis. Gene. Mar. 1, 1992;112(1):101-5. doi: 10.1016/0378-1119(92)90309-d.

Rydzik et al., Synthetic dinucleotide mRNA cap analogs with tetraphosphate 5',5' bridge containing methylenebis(phosphonate) modification. Org Biomol Chem. Nov. 21, 2009;7(22):4763-76. doi: 10.1039/b911347a. Epub Sep. 7, 2009.

Schlatterer et al., Universal initiator nucleotides for the enzymatic synthesis of 5'-amino- and 5'-thiol-modified RNA. Biochem Biophys Res Commun. Jun. 9, 2006;344(3):887-92. doi: 10.1016/j.bbrc.2006.03.218. Epub Apr. 19, 2006.

Schneider et al., Measuring control of transcription initiation by changing concentrations of nucleotides and their derivatives. Methods Enzymol. 2003:370:606-17. doi: 10.1016/S0076-6879(03)70051-2.

Seelig et al., Site-specific modification of enzymatically synthesized RNA: Transcription initiation and Diels-Alder reaction. Tetrahedron Letters. Nov. 3, 1997;38(44):7729-7732.

Triana-Alonso et al., Self-coded 3'-extension of run-off transcripts produces aberrant products during in vitro transcription with T7 RNA polymerase. J Biol Chem. Mar. 17, 1995;270(11):6298-307. doi: 10.1074/jbc.270.11.6298.

Wei et al., Mass Preparation of Dengue Type 2 Virus RNA by In Vitro Transcription Method. Bull Acad Mil Med Sci. Mar. 15, 2002;1;77-78.

Weissman, mRNA transcript therapy. Expert Rev Vaccines. Feb. 2015;14(2):265-81. doi: 10.1586/14760584.2015.973859. Epub Oct. 31, 2014.

U.S. Appl. No. 18/161,857, filed Jan. 30, 2023, Smith.
U.S. Appl. No. 17/523,034, filed Nov. 10, 2021, Hoge et al.
U.S. Appl. No. 17/523,060, filed Nov. 10, 2021, Hoge et al.
U.S. Appl. No. 17/852,974, filed Jun. 29, 2022, Marquardt et al.
U.S. Appl. No. 16/483,012, filed Aug. 1, 2019, Mauger et al.
U.S. Appl. No. 18/093,119, filed Jan. 4, 2023, Mauger et al.
U.S. Appl. No. 18/448,856, filed Aug. 11, 2023, Rabideau et al.
U.S. Appl. No. 18/955,683, filed Nov. 21, 2024, Rabideau et al.
U.S. Appl. No. 18/318,689, filed May 16, 2023, Hoge et al.
U.S. Appl. No. 17/634,939, filed Feb. 11, 2022, Shamashkin et al.
U.S. Appl. No. 17/816,696, filed Aug. 1, 2022, Dousis et al.
U.S. Appl. No. 18/930,766, filed Oct. 29, 2024, Dousis et al.
U.S. Appl. No. 17/761,420, filed Mar. 17, 2022, Amato et al.
U.S. Appl. No. 18/008,139, filed Dec. 2, 2022, Smith et al.
U.S. Appl. No. 17/926,353, filed Nov. 18, 2022, Brader et al.
U.S. Appl. No. 17/925,114, filed Nov. 14, 2022, White et al.
U.S. Appl. No. 18/294,279, filed Feb. 1, 2024, Packer et al.
U.S. Appl. No. 18/702,284, filed Apr. 17, 2024, Smith et al.
U.S. Appl. No. 18/284,938, filed Sep. 29, 2023, Rabideau et al.
U.S. Appl. No. 18/702,280, filed Apr. 17, 2024, Smith.
U.S. Appl. No. 18/560,444, filed Nov. 13, 2023, Schmitt.
U.S. Appl. No. 18/284,395, filed Sep. 27, 2023, Endo et al.
U.S. Appl. No. 18/288,328, filed Oct. 25, 2023, Goldman et al.
U.S. Appl. No. 17/925,125, filed Nov. 14, 2022, White et al.
U.S. Appl. No. 18/570,927, filed Dec. 15, 2023, Ladd Effio et al.
U.S. Appl. No. 18/683,285, filed Feb. 13, 2024, Geng et al.
U.S. Appl. No. 18/703,189, filed Apr. 19, 2024, Goldman et al.
U.S. Appl. No. 18/682,685, filed Feb. 9, 2024, Smith.
U.S. Appl. No. 18/707,251, filed May 3, 2024, Smith.
U.S. Appl. No. 18/856,588, filed Oct. 11, 2024, Rabideau et al.
U.S. Appl. No. 18/836,530, filed Aug. 7, 2024, Edwards et al.
U.S. Appl. No. 18/728,664, filed Jul. 12, 2024, Rabideau et al.
U.S. Appl. No. 18/856,118, filed Oct. 11, 2024, Reid.
U.S. Appl. No. 18/085,457, filed Dec. 20, 2022, Joyal et al.
U.S. Appl. No. 18/706,043, filed Apr. 30, 2024, Schneeberger et al.
U.S. Appl. No. 18/719,476, filed Jun. 13, 2024, Brader.
U.S. Appl. No. 18/855,999, filed Oct. 10, 2024, Goldman.
U.S. Appl. No. 18/835,106, filed Aug. 1, 2024, Geng.
U.S. Appl. No. 18/866,285, filed Nov. 15, 2024, Geng et al.
U.S. Appl. No. 18/725,999, filed Jul. 1, 2024, Smith.

Martins et al., Ribonucleic acid purification. J Chromatogr A. Aug. 15, 2014;1355:1-14. doi: 10.1016/j.chroma.2014.05.075. Epub Jun. 6, 2014.

Schroeder et al., Optical melting measurements of nucleic acid thermodynamics. Methods Enzymol. 2009;468:371-87. doi: 10.1016/S0076-6879(09)68017-4. Epub Nov. 17, 2009.

* cited by examiner

Continuous Feeds for RNA #3:

Bolus Feeds for RNA #3:

SEQUENCE LISTING

```
<160> NUMBER OF SEQ ID NOS: 14

<210> SEQ ID NO 1
<211> LENGTH: 883
<212> TYPE: PRT
<213> ORGANISM: Artificial Sequence
<220> FEATURE:
<223> OTHER INFORMATION: Synthetic polypeptide

<400> SEQUENCE: 1

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Gly Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125
```

```
Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
                180                 185                 190

Lys Gly Leu Leu Gly Gly Glu Ala Trp Ser Ser Trp His Lys Glu Asp
            195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Tyr Trp Ala
            275                 280                 285

Asn Gly Arg Arg Pro Leu Ala Leu Val Arg Thr His Ser Lys Lys Ala
    290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
            340                 345                 350

Pro Ala Ile Glu Arg Glu Leu Pro Met Lys Pro Glu Asp Ile Asp
    355                 360                 365

Met Asn Pro Glu Ala Leu Thr Ala Trp Lys Arg Ala Ala Ala Val
    370                 375                 380

Tyr Arg Lys Asp Lys Ala Arg Lys Ser Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
            420                 425                 430

Asn Pro Gln Gly Asn Asp Met Thr Lys Gly Leu Leu Thr Leu Ala Lys
                435                 440                 445

Gly Lys Pro Ile Gly Lys Glu Gly Tyr Tyr Trp Leu Lys Ile His Gly
450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
530                 535                 540
```

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570                 575

Lys Val Asn Glu Ile Leu Gln Ala Asp Ala Ile Asn Gly Thr Asp Asn
        580                 585                 590

Glu Val Val Thr Val Thr Asp Glu Asn Thr Gly Glu Ile Ser Glu Lys
    595                 600                 605

Val Lys Leu Gly Thr Lys Ala Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
            645                 650                 655

Pro Ala Ile Asp Ser Gly Lys Gly Leu Met Phe Thr Gln Pro Asn Gln
        660                 665                 670

Ala Ala Gly Tyr Met Ala Lys Leu Ile Trp Glu Ser Val Ser Val Thr
    675                 680                 685

Val Val Ala Ala Val Glu Ala Met Asn Trp Leu Lys Ser Ala Ala Lys
690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
            725                 730                 735

Gln Glu Tyr Lys Lys Pro Ile Gln Thr Arg Leu Asn Leu Met Phe Leu
        740                 745                 750

Gly Gln Phe Arg Leu Gln Pro Thr Ile Asn Thr Asn Lys Asp Ser Glu
    755                 760                 765

Ile Asp Ala His Lys Gln Glu Ser Gly Ile Ala Pro Asn Phe Val His
770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
            805                 810                 815

Ile Pro Ala Asp Ala Ala Asn Leu Phe Lys Ala Val Arg Glu Thr Met
        820                 825                 830

Val Asp Thr Tyr Glu Ser Cys Asp Val Leu Ala Asp Phe Tyr Asp Gln
    835                 840                 845

Phe Ala Asp Gln Leu His Glu Ser Gln Leu Asp Lys Met Pro Ala Leu
850                 855                 860

Pro Ala Lys Gly Asn Leu Asn Leu Arg Asp Ile Leu Glu Ser Asp Phe
865                 870                 875                 880

Ala Phe Ala

<210> SEQ ID NO 2
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 2

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu

```
                20                  25                  30
Ala Arg Glu Gln Leu Ala Leu Glu His Glu Ser Tyr Glu Met Gly Glu
            35                  40                  45

Ala Arg Phe Arg Lys Met Phe Glu Arg Gln Leu Lys Ala Gly Glu Val
        50                  55                  60

Ala Asp Asn Ala Ala Lys Pro Leu Ile Thr Leu Leu Pro Lys
65                  70                  75                  80

Met Ile Ala Arg Ile Asn Asp Trp Phe Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
            115                 120                 125

Ala Asp Asn Thr Thr Val Gln Ala Val Ala Ser Ala Ile Gly Arg Ala
            130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
            195                 200                 205

Ser Ile His Val Gly Val Arg Cys Ile Glu Met Leu Ile Glu Ser Thr
            210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Gly Tyr Trp Ala
            275                 280                 285

Asn Gly Arg Arg Pro Leu Ala Leu Val Arg Thr His Ser Lys Lys Ala
            290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
            340                 345                 350

Pro Ala Ile Glu Arg Glu Glu Leu Pro Met Lys Pro Glu Asp Ile Asp
            355                 360                 365

Met Asn Pro Glu Ala Leu Thr Ala Trp Lys Arg Ala Ala Ala Val
            370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
            420                 425                 430

Asn Pro Gln Gly Asn Asp Met Thr Lys Gly Leu Leu Thr Leu Ala Lys
            435                 440                 445
```

```
Gly Lys Pro Ile Gly Lys Glu Gly Tyr Tyr Trp Leu Lys Ile His Gly
    450             455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
    530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
        595                 600                 605

Val Lys Leu Gly Thr Lys Ala Leu Ala Gly Gln Trp Leu Ala Tyr Gly
    610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
        675                 680                 685

Val Val Ala Ala Val Glu Ala Met Asn Trp Leu Lys Ser Ala Ala Lys
690                 695                 700

Leu Leu Ala Ala Glu Val Lys Asp Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
        755                 760                 765

Ile Asp Ala His Lys Gln Glu Ser Gly Ile Ala Pro Asn Phe Val His
770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
850                 855                 860
```

-continued

```
Pro Ala Lys Gly Asn Leu Asn Leu Arg Asp Ile Leu Glu Ser Asp Phe
865                 870                 875                 880

Ala Phe Ala Gly

<210> SEQ ID NO 3
<211> LENGTH: 883
<212> TYPE: PRT
<213> ORGANISM: Artificial Sequence
<220> FEATURE:
<223> OTHER INFORMATION: Synthetic polypeptide

<400> SEQUENCE: 3

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
                20                  25                  30

Ala Arg Glu Gln Leu Ala Leu Glu His Glu Ser Tyr Glu Met Ala Glu
            35                  40                  45

Ala Arg Phe Arg Lys Met Phe Glu Arg Gln Leu Lys Ala Gly Glu Val
        50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Gly Tyr Trp Ala
        275                 280                 285

Asn Gly Arg Arg Pro Leu Ala Leu Val Arg Thr His Ser Lys Lys Ala
290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
```

```
            340                 345                 350
Pro Ala Ile Glu Arg Glu Leu Pro Met Lys Pro Glu Asp Ile Asp
        355                 360                 365
Met Asn Pro Glu Ala Leu Thr Ala Trp Lys Arg Ala Ala Ala Val
        370                 375                 380
Tyr Arg Lys Asp Lys Ala Arg Lys Ser Arg Arg Ile Ser Leu Glu Phe
385                 390                 395                 400
Met Leu Glu Gln Ala Asn Lys Phe Ala Asn His Lys Ala Ile Trp Phe
                405                 410                 415
Pro Tyr Asn Met Asp Trp Arg Gly Arg Val Tyr Ala Val Ser Met Phe
            420                 425                 430
Asn Pro Gln Gly Asn Asp Met Thr Lys Gly Leu Leu Thr Leu Ala Lys
        435                 440                 445
Gly Lys Pro Ile Gly Lys Glu Gly Tyr Tyr Trp Leu Lys Ile His Gly
        450                 455                 460
Ala Asn Cys Ala Gly Val Asp Lys Val Pro Phe Pro Glu Arg Ile Lys
465                 470                 475                 480
Phe Ile Glu Glu Asn His Glu Asn Ile Met Ala Cys Ala Lys Ser Pro
                485                 490                 495
Leu Glu Asn Thr Trp Trp Ala Glu Gln Asp Ser Pro Phe Cys Phe Leu
            500                 505                 510
Ala Phe Cys Phe Glu Tyr Ala Gly Val Gln His His Gly Leu Ser Tyr
        515                 520                 525
Asn Cys Ser Leu Pro Leu Ala Phe Asp Gly Ser Cys Ser Gly Ile Gln
        530                 535                 540
His Phe Ser Ala Met Leu Arg Asp Glu Val Gly Gly Arg Ala Val Asn
545                 550                 555                 560
Leu Leu Pro Ser Glu Thr Val Gln Asp Ile Tyr Gly Ile Val Ala Lys
                565                 570                 575
Lys Val Asn Glu Ile Leu Gln Ala Asp Ala Ile Asn Gly Thr Asp Asn
            580                 585                 590
Glu Val Val Thr Val Thr Asp Glu Asn Thr Gly Glu Ile Ser Glu Lys
        595                 600                 605
Val Lys Leu Gly Thr Lys Ala Leu Ala Gly Gln Trp Leu Ala Tyr Gly
        610                 615                 620
Val Thr Arg Ser Val Thr Lys Arg Ser Val Met Thr Leu Ala Tyr Gly
625                 630                 635                 640
Ser Lys Glu Phe Gly Phe Arg Gln Gln Val Leu Glu Asp Thr Ile Gln
                645                 650                 655
Pro Ala Ile Asp Ser Gly Lys Gly Leu Met Phe Thr Gln Pro Asn Gln
            660                 665                 670
Ala Ala Gly Tyr Met Ala Lys Leu Ile Trp Glu Ser Val Ser Val Thr
        675                 680                 685
Val Val Ala Ala Val Glu Ala Met Asn Trp Leu Lys Ser Ala Ala Lys
        690                 695                 700
Leu Leu Ala Ala Glu Val Lys Asp Lys Lys Thr Gly Glu Ile Leu Arg
705                 710                 715                 720
Lys Arg Cys Ala Val His Trp Val Thr Pro Asp Gly Phe Pro Val Trp
                725                 730                 735
Gln Glu Tyr Lys Lys Pro Ile Gln Thr Arg Leu Asn Leu Met Phe Leu
            740                 745                 750
Gly Gln Phe Arg Leu Gln Pro Thr Ile Asn Thr Asn Lys Asp Ser Glu
        755                 760                 765
```

```
Ile Asp Ala His Lys Gln Glu Ser Gly Ile Ala Pro Asn Phe Val His
    770                 775                 780
Ser Gln Asp Gly Ser His Leu Arg Lys Thr Val Val Trp Ala His Glu
785                 790                 795                 800
Lys Tyr Gly Ile Glu Ser Phe Ala Leu Ile His Asp Ser Phe Gly Thr
                805                 810                 815
Ile Pro Ala Asp Ala Ala Asn Leu Phe Lys Ala Val Arg Glu Thr Met
            820                 825                 830
Val Asp Thr Tyr Glu Ser Cys Asp Val Leu Ala Asp Phe Tyr Asp Gln
        835                 840                 845
Phe Ala Asp Gln Leu His Glu Ser Gln Leu Asp Lys Met Pro Ala Leu
    850                 855                 860
Pro Ala Lys Gly Asn Leu Asn Leu Arg Asp Ile Leu Glu Ser Asp Phe
865                 870                 875                 880
Ala Phe Ala
```

<210> SEQ ID NO 4
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 4

```
Met Asn Thr Ile Asn Ile Ala Lys Asn Asp Phe Ser Asp Ile Glu Leu
1               5                   10                  15
Ala Ala Ile Pro Phe Asn Thr Leu Ala Asp His Tyr Gly Glu Arg Leu
            20                  25                  30
Ala Arg Glu Gln Leu Ala Leu Glu His Glu Ser Tyr Glu Met Ala Glu
        35                  40                  45
Ala Arg Phe Arg Lys Met Phe Glu Arg Gln Leu Lys Ala Gly Glu Val
    50                  55                  60
Ala Asp Asn Ala Ala Ala Lys Pro Leu Ile Thr Thr Leu Leu Pro Lys
65                  70                  75                  80
Met Ile Ala Arg Ile Asn Asp Trp Phe Glu Glu Val Lys Ala Lys Arg
                85                  90                  95
Gly Lys Arg Pro Thr Ala Phe Gln Phe Leu Gln Glu Ile Lys Pro Glu
            100                 105                 110
Ala Val Ala Tyr Ile Thr Ile Lys Thr Thr Leu Ala Cys Leu Thr Ser
        115                 120                 125
Ala Asp Asn Thr Thr Val Gln Ala Val Ala Ser Ala Ile Gly Arg Ala
    130                 135                 140
Ile Glu Asp Glu Ala Arg Phe Gly Arg Ile Arg Asp Leu Glu Ala Lys
145                 150                 155                 160
His Phe Lys Lys Asn Val Glu Glu Gln Leu Asn Lys Arg Val Gly His
                165                 170                 175
Val Tyr Lys Lys Ala Phe Met Gln Val Val Glu Ala Asp Met Leu Ser
            180                 185                 190
Lys Gly Leu Leu Gly Gly Glu Ala Trp Ser Ser Trp His Lys Glu Asp
        195                 200                 205
Ser Ile His Val Gly Val Arg Cys Ile Glu Met Leu Ile Glu Ser Thr
    210                 215                 220
Gly Met Val Ser Leu His Arg Gln Asn Ala Gly Val Val Gly Gln Asp
225                 230                 235                 240
```

-continued

Ser Glu Thr Ile Glu Leu Ala Pro Glu Tyr Ala Glu Ile Ala Thr
            245                 250                 255

Arg Ala Gly Ala Leu Ala Gly Ile Ser Pro Met Phe Gln Pro Cys Val
        260                 265                 270

Val Pro Pro Lys Pro Trp Thr Gly Ile Thr Gly Gly Tyr Trp Ala
    275                 280                 285

Asn Gly Arg Arg Pro Leu Ala Leu Val Arg Thr His Ser Lys Lys Ala
290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
            340                 345                 350

Pro Ala Ile Glu Arg Glu Glu Leu Pro Met Lys Pro Glu Asp Ile Asp
        355                 360                 365

Met Asn Pro Glu Ala Leu Thr Ala Trp Lys Arg Ala Ala Ala Val
    370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
            420                 425                 430

Asn Pro Gln Gly Asn Asp Met Thr Lys Gly Leu Leu Thr Leu Ala Lys
        435                 440                 445

Gly Lys Pro Ile Gly Lys Glu Gly Tyr Tyr Trp Leu Lys Ile His Gly
    450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
    530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
        595                 600                 605

Val Lys Leu Gly Thr Lys Ala Leu Ala Gly Gln Trp Leu Ala Tyr Gly
    610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln

```
                660                 665                 670
Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
            770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
            850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 5
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 5

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140
```

```
Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Tyr Trp Ala
        275                 280                 285

Asn Gly Arg Arg Pro Leu Ala Leu Val Arg Thr His Ser Lys Lys Ala
290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Lys Asp Ile
            340                 345                 350

Pro Ala Ile Glu Arg Glu Leu Pro Met Lys Pro Glu Asp Ile Asp
        355                 360                 365

Met Asn Pro Glu Ala Leu Thr Ala Trp Lys Arg Ala Ala Ala Val
370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
            420                 425                 430

Asn Pro Gln Gly Asn Asp Met Thr Lys Gly Leu Leu Thr Leu Ala Lys
        435                 440                 445

Gly Lys Pro Ile Gly Lys Glu Gly Tyr Tyr Trp Leu Lys Ile His Gly
        450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
        530                 535                 540

His Phe Ser Ala Met Leu Arg Asp Glu Val Gly Gly Arg Ala Val Asn
545                 550                 555                 560
```

```
Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
                660                 665                 670

Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
                740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
                820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
            850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 6
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 6

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
                20                  25                  30

Ala Arg Glu Gln Leu Ala Leu Glu His Glu Ser Tyr Glu Met Ala Glu
```

```
                35                  40                  45
Ala Arg Phe Arg Lys Met Phe Glu Arg Gln Leu Lys Ala Gly Glu Val
 50                  55                  60
Ala Asp Asn Ala Ala Ala Lys Pro Leu Ile Thr Thr Leu Leu Pro Lys
 65                  70                  75                  80
Met Ile Ala Arg Ile Asn Asp Trp Phe Glu Val Lys Ala Lys Arg
                 85                  90                  95
Gly Lys Arg Pro Thr Ala Phe Gln Phe Leu Gln Glu Ile Lys Pro Glu
                100                 105                 110
Ala Val Ala Tyr Ile Thr Ile Lys Thr Thr Leu Ala Cys Leu Thr Ser
                115                 120                 125
Ala Asp Asn Thr Thr Val Gln Ala Val Ala Ser Ala Ile Gly Arg Ala
                130                 135                 140
Ile Glu Asp Glu Ala Arg Phe Gly Arg Ile Arg Asp Leu Glu Ala Lys
145                 150                 155                 160
His Phe Lys Lys Asn Val Glu Glu Gln Leu Asn Lys Arg Val Gly His
                165                 170                 175
Val Tyr Lys Lys Ala Phe Met Gln Val Val Glu Ala Asp Met Leu Ser
                180                 185                 190
Lys Gly Leu Leu Gly Gly Glu Ala Trp Ser Ser Trp His Lys Glu Asp
                195                 200                 205
Ser Ile His Val Gly Val Arg Cys Ile Glu Met Leu Ile Glu Ser Thr
                210                 215                 220
Gly Met Val Ser Leu His Arg Gln Asn Ala Gly Val Val Gly Gln Asp
225                 230                 235                 240
Ser Glu Thr Ile Glu Leu Ala Pro Glu Tyr Ala Glu Ala Ile Ala Thr
                245                 250                 255
Arg Ala Gly Ala Leu Ala Gly Ile Ser Pro Met Phe Gln Pro Cys Val
                260                 265                 270
Val Pro Pro Lys Pro Trp Thr Gly Ile Thr Gly Gly Gly Tyr Trp Ala
                275                 280                 285
Asn Gly Arg Arg Pro Leu Ala Leu Val Arg Thr His Ser Lys Lys Ala
                290                 295                 300
Leu Met Arg Tyr Glu Asp Val Tyr Met Pro Glu Val Tyr Lys Ala Ile
305                 310                 315                 320
Asn Ile Ala Gln Asn Thr Ala Trp Lys Ile Asn Lys Lys Val Leu Ala
                325                 330                 335
Val Ala Asn Val Ile Thr Lys Trp Lys His Cys Pro Val Asn Asp Ile
                340                 345                 350
Pro Ala Ile Glu Arg Glu Leu Pro Met Lys Pro Glu Asp Ile Asp
                355                 360                 365
Met Asn Pro Glu Ala Leu Thr Ala Trp Lys Arg Ala Ala Ala Val
                370                 375                 380
Tyr Arg Lys Asp Lys Ala Arg Lys Ser Arg Arg Ile Ser Leu Glu Phe
385                 390                 395                 400
Met Leu Glu Gln Ala Asn Lys Phe Ala Asn His Lys Ala Ile Trp Phe
                405                 410                 415
Pro Tyr Asn Met Asp Trp Arg Gly Arg Val Tyr Ala Val Ser Met Phe
                420                 425                 430
Asn Pro Gln Gly Asn Asp Met Thr Lys Gly Leu Leu Thr Leu Ala Lys
                435                 440                 445
Gly Lys Pro Ile Gly Lys Glu Gly Tyr Tyr Trp Leu Lys Ile His Gly
450                 455                 460
```

-continued

```
Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
    530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
            580                 585                 590

Glu Val Thr Val Thr Asp Glu Asn Thr Gly Glu Ile Ser Glu Lys
        595                 600                 605

Val Lys Leu Gly Thr Lys Ala Leu Ala Gly Gln Trp Leu Ala Tyr Gly
    610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
        675                 680                 685

Val Val Ala Ala Val Glu Ala Met Asn Trp Leu Lys Ser Ala Ala Lys
    690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
        755                 760                 765

Ile Asp Ala His Lys Gln Glu Ser Gly Ile Ala Pro Asn Phe Val His
    770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
    850                 855                 860

Pro Ala Lys Gly Asn Leu Asn Leu Arg Asp Ile Leu Glu Ser Asp Phe
865                 870                 875                 880
```

Ala Phe Ala Gly

<210> SEQ ID NO 7
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 7

```
Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Tyr Trp Ala
        275                 280                 285

Asn Gly Arg Arg Pro Leu Ala Leu Val Arg Thr His Ser Lys Lys Ala
    290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Ala Asp Ile
            340                 345                 350

Pro Ala Ile Glu Arg Glu Glu Leu Pro Met Lys Pro Glu Asp Ile Asp
```

-continued

|   | 355 |   |   |   | 360 |   |   |   | 365 |   |   |
|---|---|---|---|---|---|---|---|---|---|---|---|

Met Asn Pro Glu Ala Leu Thr Ala Trp Lys Arg Ala Ala Ala Val
        370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
            420                 425                 430

Asn Pro Gln Gly Asn Asp Met Thr Lys Gly Leu Leu Thr Leu Ala Lys
            435                 440                 445

Gly Lys Pro Ile Gly Lys Glu Gly Tyr Tyr Trp Leu Lys Ile His Gly
            450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
            515                 520                 525

Asn Cys Ser Leu Pro Leu Ala Phe Asp Gly Ser Cys Ser Gly Ile Gln
530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
            610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
770                 775                 780

```
Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
            805                 810                 815

Ile Pro Ala Asp Ala Ala Asn Leu Phe Lys Ala Val Arg Glu Thr Met
                820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
                850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 8
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 8

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255
```

```
Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Tyr Trp Ala
        275                 280                 285

Asn Gly Arg Arg Pro Leu Ala Leu Val Arg Thr His Ser Lys Lys Ala
        290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
            325                 330                 335

Val Ala Asn Val Ile Thr Lys Trp Lys His Cys Pro Val Trp Asp Ile
            340                 345                 350

Pro Ala Ile Glu Arg Glu Leu Pro Met Lys Pro Glu Asp Ile Asp
            355                 360                 365

Met Asn Pro Glu Ala Leu Thr Ala Trp Lys Arg Ala Ala Ala Val
            370                 375                 380

Tyr Arg Lys Asp Lys Ala Arg Lys Ser Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
                435                 440                 445

Gly Lys Pro Ile Gly Lys Glu Gly Tyr Tyr Trp Leu Lys Ile His Gly
450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570                 575

Lys Val Asn Glu Ile Leu Gln Ala Asp Ala Ile Asn Gly Thr Asp Asn
                580                 585                 590

Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
        610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
```

```
                    675                 680                 685
Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                    725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
        770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                    805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
        850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 9
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 9

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160
```

```
His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
                180                 185                 190

Lys Gly Leu Leu Gly Gly Glu Ala Trp Ser Ser Trp His Lys Glu Asp
            195                 200                 205

Ser Ile His Val Gly Val Arg Cys Ile Glu Met Leu Ile Glu Ser Thr
        210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
                260                 265                 270

Val Pro Pro Lys Pro Trp Thr Gly Ile Thr Gly Gly Tyr Trp Ala
                275                 280                 285

Asn Gly Arg Arg Pro Leu Ala Leu Val Arg Thr His Ser Lys Lys Ala
            290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Val Ile
                340                 345                 350

Pro Ala Ile Glu Arg Glu Glu Leu Pro Met Lys Pro Glu Asp Ile Asp
                355                 360                 365

Met Asn Pro Glu Ala Leu Thr Ala Trp Lys Arg Ala Ala Ala Val
                370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
                435                 440                 445

Gly Lys Pro Ile Gly Lys Glu Gly Tyr Tyr Trp Leu Lys Ile His Gly
            450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
                500                 505                 510

Ala Phe Cys Phe Glu Tyr Ala Gly Val Gln His His Gly Leu Ser Tyr
            515                 520                 525

Asn Cys Ser Leu Pro Leu Ala Phe Asp Gly Ser Cys Ser Gly Ile Gln
            530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575
```

```
Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
            610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
            645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
            725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
            770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
            805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
            850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 10
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 10

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
            35                  40                  45

Ala Arg Phe Arg Lys Met Phe Glu Arg Gln Leu Lys Ala Gly Glu Val
```

```
               50                  55                  60
Ala Asp Asn Ala Ala Lys Pro Leu Ile Thr Thr Leu Leu Pro Lys
 65                  70                  75                  80

Met Ile Ala Arg Ile Asn Asp Trp Phe Glu Val Lys Ala Lys Arg
                     85                  90                  95

Gly Lys Arg Pro Thr Ala Phe Gln Phe Leu Gln Glu Ile Lys Pro Glu
                100                 105                 110

Ala Val Ala Tyr Ile Thr Ile Lys Thr Thr Leu Ala Cys Leu Thr Ser
                115                 120                 125

Ala Asp Asn Thr Thr Val Gln Ala Val Ala Ser Ala Ile Gly Arg Ala
        130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
                180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
        210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
                260                 265                 270

Val Pro Pro Lys Pro Trp Thr Gly Ile Thr Gly Gly Tyr Trp Ala
                275                 280                 285

Asn Gly Arg Arg Pro Leu Ala Leu Val Arg Thr His Ser Lys Lys Ala
        290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
                340                 345                 350

Pro Ala Ile Glu Arg Glu Glu Leu Pro Met Lys Pro Glu Asp Ile Asp
                355                 360                 365

Met Asn Pro Glu Ala Leu Thr Ala Trp Lys Arg Ala Ala Ala Val
        370                 375                 380

Tyr Arg Ser Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
        435                 440                 445

Gly Lys Pro Ile Gly Lys Glu Gly Tyr Tyr Trp Leu Lys Ile His Gly
        450                 455                 460

Ala Asn Cys Ala Gly Val Asp Lys Val Pro Phe Pro Glu Arg Ile Lys
465                 470                 475                 480
```

```
Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
                515                 520                 525

Asn Cys Ser Leu Pro Leu Ala Phe Asp Gly Ser Cys Ser Gly Ile Gln
            530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
                595                 600                 605

Val Lys Leu Gly Thr Lys Ala Leu Ala Gly Gln Trp Leu Ala Tyr Gly
            610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
                675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
                740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
        770                 775                 780

Ser Gln Asp Gly Ser His Leu Arg Lys Thr Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
            850                 855                 860

Pro Ala Lys Gly Asn Leu Asn Leu Arg Asp Ile Leu Glu Ser Asp Phe
865                 870                 875                 880

Ala Phe Ala Gly
```

<210> SEQ ID NO 11
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 11

```
Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270

Val Pro Pro Lys Pro Trp Thr Gly Ile Thr Gly Gly Gly Tyr Trp Ala
        275                 280                 285

Asn Gly Arg Arg Pro Leu Ala Leu Val Arg Thr His Ser Lys Lys Ala
    290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
            340                 345                 350

Pro Ala Ile Glu Arg Glu Glu Leu Pro Met Lys Pro Glu Asp Ile Asp
        355                 360                 365

Met Asn Pro Glu Ala Leu Thr Ala Trp Lys Arg Ala Ala Ala Ala Val
```

```
                    370                 375                 380
Tyr Arg His Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
                435                 440                 445

Gly Lys Pro Ile Gly Lys Glu Gly Tyr Tyr Trp Leu Lys Ile His Gly
                450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
                500                 505                 510

Ala Phe Cys Phe Glu Tyr Ala Gly Val Gln His His Gly Leu Ser Tyr
                515                 520                 525

Asn Cys Ser Leu Pro Leu Ala Phe Asp Gly Ser Cys Ser Gly Ile Gln
                530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
                580                 585                 590

Glu Val Val Thr Val Thr Asp Glu Asn Thr Gly Glu Ile Ser Glu Lys
                595                 600                 605

Val Lys Leu Gly Thr Lys Ala Leu Ala Gly Gln Trp Leu Ala Tyr Gly
                610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
                660                 665                 670

Ala Ala Gly Tyr Met Ala Lys Leu Ile Trp Glu Ser Val Ser Val Thr
                675                 680                 685

Val Val Ala Ala Val Glu Ala Met Asn Trp Leu Lys Ser Ala Ala Lys
                690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
                740                 745                 750

Gly Gln Phe Arg Leu Gln Pro Thr Ile Asn Thr Asn Lys Asp Ser Glu
                755                 760                 765

Ile Asp Ala His Lys Gln Glu Ser Gly Ile Ala Pro Asn Phe Val His
                770                 775                 780

Ser Gln Asp Gly Ser His Leu Arg Lys Thr Val Val Trp Ala His Glu
785                 790                 795                 800
```

-continued

```
Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
    850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 12
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 12

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Ala Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser
            180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
            260                 265                 270
```

```
Val Pro Pro Lys Pro Trp Thr Gly Ile Thr Gly Gly Tyr Trp Ala
            275                 280             285

Asn Gly Arg Arg Pro Leu Ala Leu Val Arg Thr His Ser Lys Lys Ala
            290                 295             300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
            325                 330             335

Val Ala Asn Val Ile Thr Lys Trp Lys His Cys Pro Val Glu Asp Ile
            340                 345             350

Pro Ala Ile Glu Arg Glu Glu Leu Pro Met Lys Pro Glu Asp Ile Asp
            355                 360             365

Met Asn Pro Glu Ala Leu Thr Ala Trp Lys Arg Ala Ala Ala Val
            370                 375             380

Tyr Arg Asn Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
            405                 410             415

Pro Tyr Asn Met Asp Trp Arg Gly Arg Val Tyr Ala Val Ser Met Phe
            420                 425             430

Asn Pro Gln Gly Asn Asp Met Thr Lys Gly Leu Leu Thr Leu Ala Lys
            435                 440             445

Gly Lys Pro Ile Gly Lys Glu Gly Tyr Tyr Trp Leu Lys Ile His Gly
            450                 455             460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
            485                 490             495

Leu Glu Asn Thr Trp Trp Ala Glu Gln Asp Ser Pro Phe Cys Phe Leu
            500                 505             510

Ala Phe Cys Phe Glu Tyr Ala Gly Val Gln His His Gly Leu Ser Tyr
            515                 520             525

Asn Cys Ser Leu Pro Leu Ala Phe Asp Gly Ser Cys Ser Gly Ile Gln
            530                 535             540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570             575

Lys Val Asn Glu Ile Leu Gln Ala Asp Ala Ile Asn Gly Thr Asp Asn
            580                 585             590

Glu Val Val Thr Val Thr Asp Glu Asn Thr Gly Glu Ile Ser Glu Lys
            595                 600             605

Val Lys Leu Gly Thr Lys Ala Leu Ala Gly Gln Trp Leu Ala Tyr Gly
            610                 615             620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
            645                 650             655

Pro Ala Ile Asp Ser Gly Lys Gly Leu Met Phe Thr Gln Pro Asn Gln
            660                 665             670

Ala Ala Gly Tyr Met Ala Lys Leu Ile Trp Glu Ser Val Ser Val Thr
            675                 680             685

Val Val Ala Ala Val Glu Ala Met Asn Trp Leu Lys Ser Ala Ala Lys
```

```
                690             695             700
Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
                740                 745                 750

Gly Gln Phe Arg Leu Gln Pro Thr Ile Asn Thr Asn Lys Asp Ser Glu
                755                 760                 765

Ile Asp Ala His Lys Gln Glu Ser Gly Ile Ala Pro Asn Phe Val His
770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
                820                 825                 830

Val Asp Thr Tyr Glu Ser Cys Asp Val Leu Ala Asp Phe Tyr Asp Gln
                835                 840                 845

Phe Ala Asp Gln Leu His Glu Ser Gln Leu Asp Lys Met Pro Ala Leu
                850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 13
<211> LENGTH: 884
<212> TYPE: PRT
<213> ORGANISM: Artificial Sequence
<220> FEATURE:
<223> OTHER INFORMATION: Synthetic polypeptide

<400> SEQUENCE: 13

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
                20                  25                  30

Ala Arg Glu Gln Leu Ala Leu Glu His Glu Ser Tyr Glu Met Ala Glu
            35                  40                  45

Ala Arg Phe Arg Lys Met Phe Glu Arg Gln Leu Lys Ala Gly Glu Val
        50                  55                  60

Ala Asp Asn Ala Ala Lys Pro Leu Ile Thr Thr Leu Leu Pro Lys
65              70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
                100                 105                 110

Ala Val Ala Tyr Ile Thr Ile Lys Thr Thr Leu Ala Cys Leu Thr Ser
                115                 120                 125

Ala Asp Asn Thr Thr Val Gln Ala Val Ala Ser Ala Ile Gly Arg Ala
            130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175
```

-continued

Val Tyr Lys Lys Ala Phe Met Gln Val Val Glu Ala Asp Met Leu Ser
        180                 185                 190

Lys Gly Leu Leu Gly Gly Glu Ala Trp Ser Ser Trp His Lys Glu Asp
        195                 200                 205

Ser Ile His Val Gly Val Arg Cys Ile Glu Met Leu Ile Glu Ser Thr
        210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
        260                 265                 270

Val Pro Pro Lys Pro Trp Thr Gly Ile Thr Gly Gly Tyr Trp Ala
        275                 280                 285

Asn Gly Arg Arg Pro Leu Ala Leu Val Arg Thr His Ser Lys Lys Ala
        290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Trp Val Ile
        340                 345                 350

Pro Ala Ile Glu Arg Glu Leu Pro Met Lys Pro Glu Asp Ile Asp
        355                 360                 365

Met Asn Pro Glu Ala Leu Thr Ala Trp Lys Arg Ala Ala Ala Val
        370                 375                 380

Tyr Arg Lys Asp Lys Ala Arg Lys Ser Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
        420                 425                 430

Asn Pro Gln Gly Asn Asp Met Thr Lys Gly Leu Leu Thr Leu Ala Lys
        435                 440                 445

Gly Lys Pro Ile Gly Lys Glu Gly Tyr Tyr Trp Leu Lys Ile His Gly
450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
        500                 505                 510

Ala Phe Cys Phe Glu Tyr Ala Gly Val Gln His His Gly Leu Ser Tyr
        515                 520                 525

Asn Cys Ser Leu Pro Leu Ala Phe Asp Gly Ser Cys Ser Gly Ile Gln
        530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Ala Asp Ala Ile Asn Gly Thr Asp Asn
        580                 585                 590

```
Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
                740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
            770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
850                 855                 860

Pro Ala Lys Gly Asn Leu Asn Leu Arg Asp Ile Leu Glu Ser Asp Phe
865                 870                 875                 880

Ala Phe Ala Gly

<210> SEQ ID NO 14
<211> LENGTH: 883
<212> TYPE: PRT
<213> ORGANISM: Artificial Sequence
<220> FEATURE:
<223> OTHER INFORMATION: Synthetic polypeptide

<400> SEQUENCE: 14

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
                20                  25                  30

Ala Arg Glu Gln Leu Ala Leu Glu His Glu Ser Tyr Glu Met Gly Glu
            35                  40                  45

Ala Arg Phe Arg Lys Met Phe Glu Arg Gln Leu Lys Ala Gly Glu Val
        50                  55                  60

Ala Asp Asn Ala Ala Ala Lys Pro Leu Ile Thr Thr Leu Leu Pro Lys
```

```
                65                  70                  75                  80
Met Ile Ala Arg Ile Asn Asp Trp Phe Glu Glu Val Lys Ala Lys Arg
                        85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Ala Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Gln Leu Asn Lys Arg Val Gly His
                    165                 170                 175

Val Tyr Lys Lys Ala Phe Met Gln Val Glu Ala Asp Met Leu Ser
                180                 185                 190

Lys Gly Leu Leu Gly Gly Glu Ala Trp Ser Ser Trp His Lys Glu Asp
            195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                    245                 250                 255

Arg Ala Gly Ala Leu Ala Gly Ile Ser Pro Met Phe Gln Pro Cys Val
                260                 265                 270

Val Pro Pro Lys Pro Trp Thr Gly Ile Thr Gly Gly Tyr Trp Ala
            275                 280                 285

Asn Gly Arg Arg Pro Leu Ala Leu Val Arg Thr His Ser Lys Lys Ala
    290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Trp Val Ile
                340                 345                 350

Pro Ala Ile Glu Arg Glu Leu Pro Met Lys Pro Glu Asp Ile Asp
        355                 360                 365

Met Asn Pro Glu Ala Leu Thr Ala Trp Lys Arg Ala Ala Ala Val
    370                 375                 380

Tyr Arg Lys Asp Lys Ala Arg Lys Ser Arg Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
        435                 440                 445

Gly Lys Pro Ile Gly Lys Glu Gly Tyr Tyr Trp Leu Lys Ile His Gly
    450                 455                 460

Ala Asn Cys Ala Gly Val Asp Lys Val Pro Phe Pro Glu Arg Ile Lys
465                 470                 475                 480

Phe Ile Glu Glu Asn His Glu Asn Ile Met Ala Cys Ala Lys Ser Pro
                485                 490                 495
```

```
Leu Glu Asn Thr Trp Trp Ala Glu Gln Asp Ser Pro Phe Cys Phe Leu
            500                 505                 510

Ala Phe Cys Phe Glu Tyr Ala Gly Val Gln His His Gly Leu Ser Tyr
            515                 520                 525

Asn Cys Ser Leu Pro Leu Ala Phe Asp Gly Ser Cys Ser Gly Ile Gln
            530                 535                 540

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570                 575

Lys Val Asn Glu Ile Leu Gln Ala Asp Ala Ile Asn Gly Thr Asp Asn
            580                 585                 590

Glu Val Val Thr Val Thr Asp Glu Asn Thr Gly Glu Ile Ser Glu Lys
            595                 600                 605

Val Lys Leu Gly Thr Lys Ala Leu Ala Gly Gln Trp Leu Ala Tyr Gly
            610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
            645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Thr Gly Glu Ile Leu Arg
705                 710                 715                 720

Lys Arg Cys Ala Val His Trp Val Thr Pro Asp Gly Phe Pro Val Trp
            725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
            755                 760                 765

Ile Asp Ala His Lys Gln Glu Ser Gly Ile Ala Pro Asn Phe Val His
            770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
            805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
            835                 840                 845

Phe Ala Asp Gln Leu His Glu Ser Gln Leu Asp Lys Met Pro Ala Leu
            850                 855                 860

Pro Ala Lys Gly Asn Leu Asn Leu Arg Asp Ile Leu Glu Ser Asp Phe
865                 870                 875                 880

Ala Phe Ala
```

FED-BATCH IN VITRO TRANSCRIPTION PROCESS

RELATED APPLICATIONS

This application is a national stage filing under 35 U.S.C. § 371 of international application number PCT/US2020/021955, filed Mar. 11, 2020, which claims priority under 35 U.S.C. § 119 (e) to U.S. provisional application No. 62/816,734, filed Mar. 11, 2019; each of which is incorporated by reference herein in its entirety.

BACKGROUND

In vitro transcription (IVT) uses bacteriophage DNA-dependent ribonucleic acid (RNA) polymerases (e.g., SP6, T3 and T7) to synthesize template-directed mRNA transcripts. IVT reactions are commonly "batch" reactions in that several reagents, including nucleoside triphosphates (NTPs), magnesium, RNA polymerase, deoxyribonucleic acid (DNA), and pyrophosphatase are combined at the beginning of the reaction. The components are then incubated, and the reaction proceeds until at least one of the nucleotides is depleted. Thus, the reaction has at least one limiting reagent that may cause low yield of the RNA transcript (product). Other potential shortcomings of IVT reactions include, for example, abortive (truncated) transcripts, run-on transcripts, polyA tail variants producing 3' heterogeneity, mutated transcripts, and/or double-stranded contaminants produced during the reactions.

SUMMARY

The present disclosure provides, in some embodiments, empirically-balanced fed-batch in vitro transcription (IVT) methods and compositions that enable, inter alia, high yield, high integrity transcription of ribonucleic acid (RNA), such as messenger RNA (mRNA). Surprisingly, in some embodiments, RNA transcripts having a length of at least 2000 nucleotides or more can be synthesized with yields of at least 100% higher than those of RNA transcripts produced using previously known IVT methods, and wherein at least 90% of which is correctly capped using co-transcriptional capping. In certain embodiments, the empirically-balanced fed-batch IVT reactions of the present disclosure include four nucleotides, CTP, GTP, UTP, and ATP, the relative molar ratios of each of which can be varied to maximize use of reactants and/or to alter attributes of the RNA product. Importantly, the ratios of the four nucleotides are balanced according to their rate of consumption (consumption rate) so that no one nucleotide is rate limiting during the IVT reaction. Advantageously, and unlike previously described fed-batch methods, this process does not require prior knowledge of the RNA product sequence or rely on the known sequence of a target RNA product.

This process, in some embodiments, includes performing an initial batch IVT reaction on a DNA encoding the RNA of interest with known initial concentrations of CTP, GTP, UTP, and ATP (e.g., equimolar concentrations, e.g., 5 mM), and measuring the rate of decrease in concentration of each nucleotide during the actual reaction until the concentration of at least one of the NTPs drops below a threshold level over the course of 20-40 minutes. The measured concentrations and times collected may then be used to calculate the rate of CTP, GTP, UTP, and ATP consumption during the reaction (individual NTP consumption rate). For multiple time points, this can be the slope of a linear fit of the data (see, e.g., FIG. 1A). The individual NTP consumption rates (for CTP, GTP, UTP, and ATP) are added together to determine the consumption rate of all nucleotides (total NTP consumption rate) (see, e.g., FIG. 1B). A percent (%) consumption value is then determined for each NTP by dividing the individual NTP consumption rate by the total NTP consumption rate.

The percent consumption values can be used to formulate an initial "master" reaction mixture for an IVT reaction and for a "feed stock" mixture. For example, to allow non-limiting consumption of all NTPs in a batch reaction, the initial reaction mixture may contain NTPs at a molar ratio equivalent to the percent (%) consumption value calculated for each NTP (ATP, UTP, GTP, and CTP).

In some embodiments, the initial NTP concentrations comprise equimolar NTP concentrations of each of [ATP], [CTP], [UTP], and [GTP] (e.g., molar ratio of 1:1:1:1).

In some embodiments, the initial NTP concentrations comprise non-equimolar NTP concentrations of each of [ATP], [CTP], [UTP], and [GTP] (e.g., molar ratio of 2:1:1:4). In some embodiments, the molar ratio of [ATP]:[UTP]:[CTP]:[GTP] is 1:1:1:1 to 2:1:1:4. In some embodiments, the molar ratio of [ATP]:[CTP] is 2:1. In some embodiments, the molar ratio of [ATP]:[UTP] is 2:1. In some embodiments, the molar ratio of [ATP]:[GTP] is 1:2. In some embodiments, the molar ratio of [CTP]:[UTP] is 1:1. In some embodiments, the molar ratio of [CTP]:[GTP] is 1:4. In some embodiments, the molar ratio of [UTP]:[GTP] is 1:4. In some embodiments, the initial NTP concentrations comprise a ratio of [ATP]:[UTP] of 1:1 to 2:1 and/or a ratio of [GTP]:[CTP] of 1:1 to 2:1. In some embodiments, the initial NTP concentrations comprise a ratio of [ATP]:[UTP] of 2:1 to 4:1 and/or a ratio of [GTP]:[CTP] of 1:1 to 4:1. In some embodiments, the initial NTP concentrations comprise a ratio of [ATP]:[UTP] of 2:1 and/or a ratio of [GTP]:[CTP] of 4:1.

These % consumption values are empirically determined and are specific to the RNA of interest. During the IVT reaction, the reaction mixture may be supplemented with a feed stock mixture that comprises NTPs, each present in the feed mixture at a molar ratio based on a % consumption value calculated for each NTP. In some embodiments, the feed stock mixture is supplemented in an amount that maintains a total NTP concentration in the reaction mixture above 0 mM, but at least between 5% to 50% of the initial NTP concentration. In some embodiments, the feed stock mixture is supplemented in an amount that maintains a total NTP concentration in the reaction mixture above 0 mM, but at least between 5% to 100% or at least between 5% and 200% of the initial NTP concentration. In some embodiments, the feed stock mixture is supplemented in an amount that maintains a total NTP concentration in the reaction mixture between 5 mM to 20 mM and/or within 5%-75% of the initial NTP concentration. In some embodiments, the feed stock mixture is supplemented in an amount that maintains a ratio of [ATP]:[UTP] of 1:1 to 4:1, optionally 1:1 to 2:1 (e.g., 2:1). In some embodiments, the feed stock mixture is supplemented in an amount that maintains a ratio of [GTP]:[CTP] of 1:1 to 4:1 (e.g., 4:1). Improvements to IVT reactions have led to the development and incorporation of a cap analog referred to as a trinucleotide (see PCT/US2018/046989, incorporated herein by reference). This allows for co-transcriptional capping of the RNA product and eliminates the need for a subsequent processing step to cap the RNA. Although this trinucleotide is preferentially incorporated at the 5' end of the RNA product over the mono-nucleotides in the reaction mixture, it is possible for some number of purines (ATP and GTP) to be incorporated instead of the cap analog. Such an event leads to the production of uncapped RNA product, which is an undesirable inactive product variant. Our studies have shown that maintaining a trinucleotide-to-purine ratio of >1 allows for sufficient concentrations of capped RNA relative to uncapped RNA in the product to remain at acceptable levels.

When performing IVT reactions using co-transcriptional capping, the consumption of cap analog compared to total nucleotides in the reaction to generate an mRNA is very low. Only one mole of cap analog is consumed per mole of capped RNA product, versus up to 5,000 or more moles of nucleotides per mole of capped RNA product (actual consumption varies based on the product sequence and length). As a result, a large excess of expensive cap analog remains un-consumed in the IVT reaction after the NTPs have been consumed. In a batch reaction, this low utilization of the cap analog (e.g. trinucleotide capping reagent) contributes to a more expensive and wasteful process.

The fed-batch process of the present disclosure improves utilization of plasmid DNA, the cap analog, (e.g., a trinucleotide or tetranucleotide capping reagent) and other expensive reagents while maintaining high % capping of RNA production and mRNA yield. For example, in the present disclosure, NTPs and magnesium can be added into an active IVT reaction to prevent depletion of reactants and improve yield of RNA product without providing additional DNA or cap analog (e.g., trinucleotide). In another example, the NTPs may be added at a lower initial concentration, and maintained at this low level throughout the reaction, enabling a lower concentration of cap analog to be used without compromising capping efficiency. Compared to previously described IVT batch and fed-batch processes, the empirically determined % consumption balanced fed-batch IVT process as provided herein, in some embodiments with co-transcriptional capping, has shown a greater than 2-fold improvement in capped RNA yield relative to the amount of cap analog used. Furthermore, the molar ratio of RNA produced to input DNA used in the fed-batch IVT process as provided herein is greatly increased. In some embodiments, the molar ratio of RNA produced to input DNA used in the fed-batch IVT process as provided herein is increased by 2-fold or even 3-fold over non-fed-batch or batch processes.

Thus, provided herein, in some aspects, are methods of determining percent (%) NTP consumption of an IVT reaction comprising (a) conducting an IVT reaction with a reaction mixture that comprises known initial NTP concentrations, DNA encoding an mRNA of interest, RNA polymerase, and pyrophosphatase, and (b) calculating a percent (%) consumption value for each NTP of the reaction mixture. In some embodiments, step (b) comprises (i) calculating individual NTP consumption rate (individual NTP concentration/time) over total NTP consumption rate (total NTP concentration/time). In some embodiments, the known initial NTP concentrations are equimolar NTP concentrations.

Also provided herein, in some aspects, are methods of fed-batch IVT of an RNA of interest comprising (a) conducting an IVT reaction with a reaction mixture that comprises DNA encoding an RNA of interest, RNA polymerase, and NTPs (and optionally magnesium and/or pyrophosphatase), and (b) delivering to the IVT reaction mixture over time a feed stock mixture that comprises NTPs (and optionally magnesium and/or pyrophosphatase), wherein each NTP is present at a molar ratio based on to a % consumption value calculated for each NTP in a particular RNA of interest, wherein the % consumption values are specific to the RNA of interest, and wherein the feed stock mixture is delivered in an amount that maintains a total NTP concentration in the reaction mixture above zero. In some embodiments, each NTP in the reaction mixture of step (a) is present at a molar ratio equivalent to the percent (%) consumption value calculated for each NTP.

In some embodiments, the NTPs are balanced using the percent consumption. In other embodiments, the NTPs are maintained at different ratios to alter the attributes of the product, or improve the utilization of different NTPs. For example, the percent consumption may be used to maintain desired conditions throughout a reaction.

The feed stock mixture may be delivered to the ongoing IVT reaction mixture using bolus or continuous feeding over time, e.g., every 10-250 minutes, optionally every 20-200 minutes. Continuous feeding involves the delivery of feed stock mixture to the ongoing IVT reaction mixture at a continuous flow rate, e.g., 2-8 mL/min or 4-6 mL/min.

In some embodiments, the reaction mixture further comprises an RNA cap analog, thereby producing transcribed RNA that incorporates said RNA cap analog (e.g., at least 90% or at least 95% of the transcribed RNA comprises the RNA cap analog). An initial and/or an ongoing IVT reaction mixture may comprise a ratio of [RNA cap analog]:[purine] of 1:1 to 20:1, 1:1 to 15:1, 1:1 to 10:1, 1:1 to 5:1, 1:1 to 3:1, or 1:1 to 2:1.

BRIEF DESCRIPTION OF THE DRAWINGS

FIGS. 11A-11B show the measured total [NTPs] and individual [NTPs] during the fed-batch IVT reaction for RNA #1. FIGS. 12A-12B show the measured total [NTPs] and individual [NTPs] during the fed-batch IVT reaction for RNA #2.

FIGS. 13A-13B show the measured concentration of total RNA and tailed RNA for RNA #1 and RNA #2. FIGS. 14A-14B show the measured mass of total RNA and tailed RNA versus initial IVT reaction volume for RNA #1 and RNA #2.

FIG. 16B shows measured % capped RNA product over time for RNA #1.

FIGS. 18A-18B show the measured concentration of tailed RNA for the bolus (FIG. 18A) and continuous (FIG. 18B) processes. FIGS. 19A-19B show the measured mass of tailed RNA versus initial IVT reaction volume for the bolus (FIG. 19A) and continuous (FIG. 19B) processes.

DETAILED DESCRIPTION

Figure 1A:
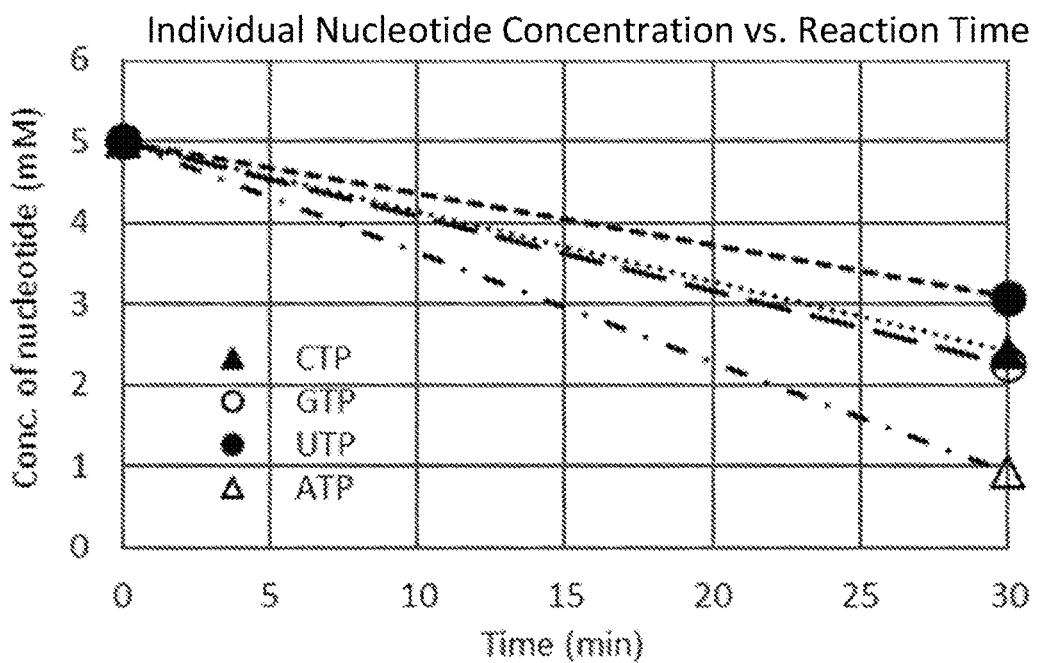
FIGS. 1A-1B. An example of nucleotide empirical balancing. An in vitro transcription (IVT) reaction was conducted with known initial nucleotide concentrations. The concentrations of CTP, GTP, UTP, and ATP (FIG. 1A) and the total nucleotide concentration (FIG. 1B) were measured over time. The % consumption of each nucleotide was calculated by dividing the rate of the individual NTP consumption (for example, as determined in FIG. 1A) by the rate of the total NTP consumption (for example, as determined in FIG. 1B).

Provided herein is an empirically-balanced fed-batch in vitro transcription (IVT) platform developed to improve the total product yield of a single batch and maintain high product quality, while increasing the utilization of reactants. Unlike existing IVT methods, which have low utilization of reaction components, have a high percentage of unused NTPs, and require high concentrations of RNA cap analog or trinucleotide capping reagent, the empirically-balanced fed-batch IVT methods of the present disclosure maximize the use of expensive reagents present in a reaction, to increase product yield without compromising product integrity. This improved fed-batch IVT process, in some embodiments, starts with an initial nucleotide empirical balancing reaction, which is used to calculate a percent (%) consumption value for each type of NTP in the initial reaction, specific to the RNA being transcribed. These empirically-determined values are then used to balance the nucleotide ratios in subsequent fed-batch IVT reactions for efficient, high yield RNA production.

As used herein, percent consumption generally refers to the relative consumption rate of an individual NTP compared to the consumption rate of all NTPs for a given DNA encoding an RNA of interest. In some embodiments, a percent consumption rate is determined by dividing an individual NTP consumption rate by the total NTP consumption rate. In some embodiments, the individual NTP consumption rate is a measure of individual NTP concentration over time (e.g., over the course of a nucleotide empirical balancing reaction) and total NTP consumption rate is a measure of total NTP concentration over time (e.g., over the course of the nucleotide empirical balancing reaction).

As used herein, empirical balancing of NTPs generally refers to the process used to determine the percent consumption of each NTP for a DNA encoding an RNA of interest. This process involves conducting a batch IVT reaction with known initial concentrations of CTP, GTP, UTP, and ATP and measuring the rate of decrease in concentration of each nucleotide during the actual reaction until the concentration of at least one of the NTPs drops below a threshold level, e.g., 1-5 mM or 20-50% of the starting concentration, over the course of the reaction, e.g., 20-40 minutes. The measured concentrations and times collected may then be used to calculate the percent consumption of CTP, GTP, UTP, and ATP consumption during the reaction.

As used herein, batch IVT generally refers to an in vitro transcription reaction in which all components of the reaction, e.g., NTPs, polymerase, salt, and/or DNA, are added to the reaction mixture only once, e.g., at the beginning of the reaction. In some embodiments, the reaction mixture is held at specified conditions, e.g., temperature, for a period of time, after which the transcribed RNA product is collected.

As used herein, fed-batch IVT generally refers to an in vitro transcription reaction in which the active reaction mixture is supplemented with reaction components, e.g., NTPs, polymerase, salt, and/or DNA, to prevent depletion of limiting reagents or counteract degradation of unstable components, as the reaction progresses over time. In some embodiments, the mixture that is added to the reaction is referred to as a feed stock. In some embodiments, reaction components or a feed stock are supplemented into an active reaction mixture using bolus feeding. In some embodiments, bolus feeding comprises the addition of discrete volumetric amounts of reaction components or feed stock into an active reaction mixture at defined time intervals, e.g., addition of 5 mL of feed stock to a reaction mixture every 20 minutes. In some embodiments, reaction components or a feed stock are supplemented into an active reaction mixture using continuous feeding. In some embodiments, continuous feeding comprises the addition of reaction components or feed stock into an active reaction mixture by a continuous flow rate of reaction components feed stock over a defined period of time, e.g., addition of feed stock at a continuous flow rate of 2-8 mL/min, 2-6 mL/min, or 4-6 mL/min or a continuous flow rate of 0.0030-0.007 mL/min per mL of initial volume, 0.0040-0.0060 mL/min per mL of initial volume, 0.0050-0.0080 mL/min per mL of initial volume, or 0.0060-0.0090 mL/min per mL of initial volume.

As used herein, scouting fed-batch IVT generally refers to an initial fed-batch IVT reaction using bolus feeding that is used to model reaction rate(s) over time and to set appropriate feed volumes and times in a downstream fed-batch IVT reaction.

As used herein, percent tailed RNA generally refers to the relative abundance of transcribed RNA product that contains 3' polyA tail. In some embodiments, a 3' polyA tail is a $A_{100}$ polyA tail (i.e., consisting of 100 alanine residues). In some embodiments, percent tailed RNA (the percent of transcribed RNA product comprising a 3' polyA tail) is greater than 20%, 25%, 30%, 35%, 40%, 45%, 50%, 55%, 60%, 65%, 70%, 75%, 80%, or 85%. In some embodiments, percent tailed RNA is greater than greater than 90%, 95%, 97%, or 99%. In some embodiments, percent tailed RNA (the percent of transcribed RNA product comprising a 3' polyA tail) is between 20-100%, 20-90%, 20-80%, 20-70%, 20-60%, 20-50%, 20-40%, 20-30%, 25-75%, 30-50%, 40-60%, 50-70%, 45-60%, 55-70%, 60-80%, 60-100%, 75-100%, 50-95%, 75-95%, 80-100%, 80-90%, 90-95%, 95-100%, 90-99%, or 95-99%.

As used herein, percent capped RNA generally refers to the relative abundance of transcribed RNA product that contains an incorporated cap analog at its 5' terminus. In some embodiments, a cap analog is an RNA cap analog. In some embodiments, an RNA cap analog is a dinucleotide, trinucleotide, or tetranucleotide. In some embodiments, percent capped RNA (the percent of transcribed RNA product comprising a 5' cap analog) is greater than 20%, 25%, 30%, 35%, 40%, 45%, 50%, 55%, 60%, 65%, 70%, 75%, 80%, or 85%. In some embodiments, percent capped RNA is greater than greater than 90%, 95%, 97%, or 99%. In some embodiments, percent capped RNA is between 20-100%, 20-90%, 20-80%, 20-70%, 20-60%, 20-50%, 20-40%, 20-30%, 25-75%, 30-50%, 40-60%, 50-70%, 45-60%, 55-70%, 60-80%, 60-100%, 75-100%, 50-95%, 75-95%, 80-100%, 80-90%, 90-95%, 95-100%, 90-99%, or 95-99%.

In some embodiments, an RNA cap analog is added to an IVT reaction mixture that preferentially initiates the 5' end of an RNA sequence during transcription. This allows for "co-transcriptional capping" IVT reaction, in which the IVT mixture comprises an RNA cap. Examples of RNA cap analogs that allow for "co-transcriptional capping" IVT reactions include 7-methyl guanosine (m7G) and 3'-O-me-7-meGpppG.

As used herein, an initial IVT reaction mixture for use in a fed-batch application generally refers to the IVT reaction mixture at the start of a fed-batch IVT reaction and prior to being supplemented with additional reaction components or feed stock. In some embodiments, an initial IVT reaction mixture comprises NTPs (e.g., naturally-occurring and/or modified NTPs, e.g., ATP, UTP, GTP, and CTP), buffers (e.g., Tris and/or Good's buffers), cofactors (e.g., magnesium), RNA cap analog(s) (e.g., trinucleotide cap analog), RNA polymerase (e.g., T7 RNA polymerase), detergent (e.g., Triton X-100, DNA encoding an RNA of interest, reducing agents (e.g., dithiothreitol (DTT) or tris(2-carboxyethyl)phosphine (TCEP)), small molecule additives (e.g., spermidine), and/or enzymatic additives (e.g., inorganic phosphatase (PPiase)).

As used herein, an ongoing IVT reaction mixture for use in a fed-batch application generally refers to the IVT reaction mixture after the starting reaction conditions. In some embodiments, the concentrations of components, e.g., NTPs and RNA cap analogs, in an ongoing IVT reaction mixture changes over time. In some embodiments, an ongoing IVT reaction mixture comprises NTPs (e.g., naturally-occurring and/or modified NTPs, e.g., ATP, UTP, GTP, and CTP), buffers (e.g., Tris and/or Good's buffers), cofactors (e.g., magnesium), RNA cap analog(s) (e.g., trinucleotide cap analog), RNA polymerase (e.g., T7 RNA polymerase), detergent (e.g., Triton X-100, DNA encoding an RNA of interest, reducing agents (e.g., DTT, TCEP), small molecule additives (e.g., spermidine), enzymatic additives (e.g., inorganic phosphatase or PPiase), and/or transcribed RNA of interest.

As used herein, the first coding position in an RNA of interest generally refers to the first nucleotide transcribed after a promoter sequence (e.g., a T7 RNA polymerase promoter). In some embodiments, the first coding position is any NTP, e.g., a ATP, UTP, GTP, or CTP.

As used herein, the RNA of interest generally refers to the RNA molecule that is encoded by a DNA in an IVT reaction. In some embodiments, the RNA of interest is a transcribed RNA of interest, wherein the transcribed RNA of interest is produced by an IVT reaction, e.g., a fed-batch IVT reaction. In some embodiments, an RNA of interest is a mRNA, optionally comprising a 5' cap, a 5' untranslated region (5' UTR), an open reading frame (ORF) that encodes a protein of interest, a 3' untranslated region (3' UTR), and/or a polyA tail. In some embodiments, the 5' cap analog is a 5' trinucleotide cap.

Nucleotide Empirical Balancing

Provided herein, in some aspects, are methods of determining percent (%) nucleoside triphosphates (NTPs) consumption of an in vitro transcription (IVT) reaction. Percent (%) NTP consumption (also referred to more simply as "% consumption") is a value obtained for each NTP of an initial nucleotide empirical balancing reaction, calculated using the following equation:

% consumption=(individual NTP consumption rate)/
(total NTP consumption rate), whereby the individual NTP consumption rate is a measure of individual NTP concentration over time (over the course of the nucleotide empirical balancing reaction), and total NTP consumption rate is a measure of total NTP concentration over time (over the course of the nucleotide empirical balancing reaction).

Thus, an individual ATP consumption rate is calculated by measuring the concentration of ATP consumed at various time points during an initial nucleotide empirical balancing reaction until the ATP concentration, or the concentration of another NTP in the reaction, drops below a threshold level, e.g., 5 mM to 20 mM; an individual UTP consumption rate is calculated by measuring the concentration of UTP consumed at various time points during an initial nucleotide empirical balancing reaction until the UTP concentration, or the concentration of another NTP in the reaction, drops below a threshold level, e.g., 5 mM to 20 mM; an individual GTP consumption rate is calculated by measuring the concentration of GTP consumed at various time points during an initial nucleotide empirical balancing reaction until the GTP concentration, or the concentration of another NTP in the reaction, drops below a threshold level, e.g., 5 mM to 20 mM; and an individual CTP consumption rate is calculated by measuring the concentration of CTP consumed at various time points during an initial nucleotide empirical balancing reaction until the CTP concentration, or the concentration of another NTP in the reaction, drops below a threshold level, e.g., 5 mM to 20 mM.

Total NTP consumption rate is calculated by measuring the concentration of all (e.g., all four) NTPs consumed at various time points during an initial nucleotide empirical balancing reaction.

A % consumption value for ATP is then calculated by dividing the individual ATP consumption rate by the total NTP consumption rate. Likewise, a percent consumption value for UTP is calculated by dividing the individual UTP consumption rate by the total NTP consumption rate; a percent consumption value for GTP is calculated by dividing the individual GTP consumption rate by the total NTP consumption rate; and a percent consumption value for CTP is calculated by dividing the individual CTP consumption rate by the total NTP consumption rate.

An initial nucleotide empirical balancing reaction, in some embodiments, includes a DNA (e.g., DNA plasmid encoding an RNA of interest), RNA polymerase (e.g., a T7 polymerase), and a mixture of NTPs. In an initial nucleotide empirical balancing reaction, the starting concentration of NTP (e.g., each of ATP, UTP, GTP, and CTP) is known (pre-determined). In some embodiments, an initial nucleotide empirical balancing reaction also includes buffer (e.g., Tris HCl), magnesium (e.g., magnesium acetate), pyrophosphatase, and/or dithiothreitol (DTT). In some embodiments, an initial nucleotide empirical balancing reaction also includes an RNA cap analog, such as a trinucleotide cap analog (e.g., GAG), discussed elsewhere herein.

In some embodiments, the concentration of each individual NTP in the initial nucleotide empirical balancing reaction remains above zero (0) millimolar (mM). That is, NTP concentrations (individual and total) are collected (for which NTP consumption rates calculated) during the initial nucleotide empirical balancing reaction only until one of the NTP concentrations drops below a certain threshold level. In some embodiments, the threshold level is 1 mM to 50 mM, 1 mM to 40 mM, 1 mM to 30 mM, 1 mM to 20 mM, 1 mM to 10 mM, 2 mM to 50 mM, 2 mM to 40 mM, 2 mM to 30 mM, 2 mM to 20 mM, 2 mM to 10 mM, 3 mM to 50 mM, 3 mM to 40 mM, 3 mM to 30 mM, 3 mM to 20 mM, 3 mM to 10 mM, 4 mM to 50 mM, 4 mM to 40 mM, 4 mM to 30 mM, 4 mM to 20 mM, 4 mM to 10 mM, 5 mM to 50 mM, 5 mM to 40 mM, 5 mM to 30 mM, 5 mM to 20 mM, or 5 mM to 10 mM. In some embodiments, the threshold level is 10 mM to 20 mM. In some embodiments, the threshold level is 1 mM, 2 mM, 3 mM, 4 mM, 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, or 20 mM. In some embodiments, the threshold level is a lower limit of 2 mM to 10 mM, above a lower limit of 2 mM to 9 mM, above a lower limit of 2 mM to 8 mM, above a lower limit of 2 mM to 7 mM, above a lower limit of 2 mM to 6 mM, or above a lower limit of 2 mM to 6 mM.

In some embodiments, the threshold level is within 5% to 200% of the initial NTP concentration. For example, the threshold level may be within 5% to 175%, within 5% to 150%, within 5% to 125%, within 5% to 100%, within 5% to 75%, within 5% to 50%, or within 5% to 25% of the initial NTP concentration. In some embodiments, the threshold level is within 5%, 10%, 15%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, or 200% of the initial NTP concentration. The initial NTP concentration is the total NTP concentration in an IVT reaction before transcription begins (after all the IVT reaction components have been combined but before the polymerase is active).

The initial NTP concentration of an initial nucleotide empirical balancing reaction is therefore known, in some embodiments. In some embodiments, the known initial NTP concentrations are equimolar NTP concentrations. That is, each NTP (e.g., ATP, UTP, GTP, and UTP) are present in the reaction at an equal molar ratio (1:1:1:1). In other embodiments, the known initial NTP concentrations are not equimolar NTP concentrations. For example, one or more NTPs (e.g., ATP and/or UTP) may be present in excess of the other NTPs.

The timing of initial nucleotide empirical balancing reaction may vary. Advantageously, however, the reaction time may be as short as 10 to 60 minutes. In some embodiments, the initial nucleotide empirical balancing reaction time is 10 to 50 minutes, 10 to 40 minutes, 10 to 30 minutes, 10 to 20 minutes, 20 to 60 minutes, 20 to 50 minutes, 20 to 40 minutes, 20 to 30 minutes, 30 to 60 minutes, 30 to 50 minutes, or 30 to 40 minutes. In some embodiments, the initial nucleotide empirical balancing reaction time is 10 minutes, 20 minutes, 30 minutes, 40 minutes, 50 minutes, or 60 minutes. Longer reaction times may be used, depending on when the concentration of any one of the NTPs falls below the threshold level.

Empirically-Balanced Fed-Batch In Vitro Transcription Reactions

An initial nucleotide empirical balancing reaction described above is specific to a particular DNA encoding an RNA of interest, and the percent (%) consumption values calculated from that initial reaction may be used in subsequent fed-batch IVT reactions for synthesis of that particular RNA of interest. Thus, in some embodiments, methods of fed-batch IVT of an RNA of interest comprise (a) conducting an IVT reaction with a reaction mixture that comprises deoxyribonucleic acid (DNA) encoding an RNA of interest, RNA polymerase, and nucleoside triphosphates (NTPs), and (b) delivering to the IVT reaction mixture over time a feed stock mixture that comprises NTPs, wherein each NTP is present at a molar ratio based on a percent consumption value calculated for each NTP, wherein the percent consumption values are specific to the RNA of interest, and wherein the feed stock mixture is delivered in an amount that maintains a total NTP concentration in the reaction mixture above zero.

In some embodiments, the feed stock mixture is delivered in an amount that maintains a ratio of [ATP]:[UTP] of 1:1 to 5:1, 1:1 to 4:1, 1:1 to 3:1, or 1:1 to 2:1. In some embodiments, the feed stock mixture is delivered in an amount that maintains a ratio of [ATP]:[UTP] of 2:1. In some embodiments, the feed stock mixture is delivered in an amount that maintains a ratio of [GTP]:[CTP] of 1:1 to 5:1, 1:1 to 4:1, 1:1 to 3:1, or 1:1 to 2:1. In some embodiments, the feed stock mixture is delivered in an amount that maintains a ratio of [GTP]:[CTP] of 4:1. In some embodiments, the feed stock mixture is delivered in an amount that maintains a ratio of [ATP]:[UTP] of 2:1 and a ratio of [GTP]:[CTP] of 4:1.

An empirically-balanced fed-batch IVT reaction mixture, in some embodiments, includes components selected from the following: a deoxyribonucleic acid (DNA), ribonucleic acid (RNA) polymerase, nucleoside triphosphates (NTPs), RNA cap analog, buffer, magnesium, pyrophosphatase, and reductant (e.g. dithiothreitol). The feed stock mixture, by contrast, includes NTPs, RNA polymerase, buffer, magnesium, pyrophosphatase, and/or reductant, but generally does not include DNA and RNA cap analog. The exact conditions used in the IVT reaction depend on the amount of RNA needed, for example, for a specific application. Likewise, the total transcription reaction time may vary, although in some embodiments, the total transcription reaction time is longer than conventional IVT reaction times. In some embodiments, the total transcription reaction time is 100 minutes to 1000 minutes. For example, the total transcription reaction time may be 100-800, 100-600, 100-400, 150-1000, 150-800, 150-600, 150-400, 200-1000, 200-800, 200-600, 200-400, 200-800, 200-600, 200-400, 300-1000, 300-800, 300-600, 300-400, 300-800, 300-600, 300-400, 400-1000, 400-800, 400-600, 400-400, 400-800, 400-600, 500-1000, 500-800, 500-600, 500-500, 500-800, or 500-600 minutes. In some embodiments, the total transcription reaction time is at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, or at least 1000 minutes.

DNA Encoding an RNA of Interest

The DNA may be single-stranded or double-stranded. In some embodiments, the DNA is present on a plasmid or other vector. A DNA may include a polynucleotide encoding a polypeptide of interest. A DNA, in some embodiments, includes an RNA polymerase promoter (e.g., a T7 RNA polymerase promoter) located 5' from and operably linked to a polynucleotide encoding a polypeptide of interest. A DNA may also include a nucleotide sequence encoding a polyadenylation (polyA) tail located at the 3' end of the polynucleotide.

The length of the DNA, and thus the length of the RNA of interest, may vary. For example, the DNA (and/or the RNA of interest) may have a length of 200 nucleotides to 10,000 nucleotides. In some embodiments, the DNA (and/or the RNA of interest) has a length of 200-500, 200-1000, 200-1500, 200-2000, 200-2500, 200-3000, 200-3500, 200-4000, 200-4500, 200-5000, 200-5500, 200-6000, 200-6500, 200-7000, 200-7500, 200-8000, 200-8500, 200-9000, or 200-9500 nucleotides. In some embodiments, the DNA (and/or the RNA of interest) has a length of at least 200, at least 300, at least 400, at least 500, at least 600, at least 700, at least 800, at least 900, at least 1000, at least 2000, at least 3000, at last 4000, at least 5000, at least 6000, at least 7000, at least 8000, at least 9000, or at least 10,000 nucleotides.

In some embodiments, the reaction mixture is not supplemented with a DNA during the empirically-balanced fed-batch IVT reaction. That is, in some embodiments, throughout the entire IVT reaction, the only DNA present is that which was in the reaction mixture prior to commencement of transcription (additional DNA is not added to the IVT reaction).

In some embodiments, the concentration of DNA in an initial or ongoing IVT reaction mixture is about 0.01-0.10 mg/mL, 0.01-0.09 mg/mL, 0.01-0.075 mg/mL, 0.025-0.075 mg/mL, 0.01-0.05 mg/mL, 0.02-0.08 mg/mL, 0.02-0.06 mg/mL, 0.03-0.055 mg/mL, 0.04-0.05 mg/mL, or 0.05 mg/mL. In some embodiments, the concentration of DNA is maintained at a concentration of above 0.01 mg/mL during the entirety of an IVT reaction. In some embodiments, the concentration of DNA is maintained at a concentration is about 0.01-0.10 mg/mL, 0.01-0.09 mg/mL, 0.01-0.075 mg/mL, 0.025-0.075 mg/mL, 0.01-0.05 mg/mL, 0.02-0.08 mg/mL, 0.02-0.06 mg/mL, 0.03-0.055 mg/mL, or 0.04-0.05 mg/mL during the entirety of an IVT reaction.

RNA Product

In some embodiments, the transcribed RNA of interest as provided herein is a messenger RNA (mRNA). In some embodiments, the NTP present in the first position of the RNA of interest is ATP. In some embodiments, the NTP present in the first position of the RNA of interest is GTP. In some embodiments, the NTP present in the first position of the RNA of interest is UTP. In some embodiments, the NTP present in the first position of the RNA of interest is CTP.

In some embodiments, the method further comprises isolating (e.g., purifying) the RNA (e.g., mRNA) from the empirically-balanced fed-batch IVT reaction mixture. In some embodiments, the methods further comprise formulating the isolated RNA in a nanoparticle. In some embodiments, the nanoparticle is a lipid nanoparticle, such as a cationic lipid nanoparticle. The lipid nanoparticle may comprise, for example, a molar ratio of 20-60% ionizable amino lipid, 5-25% non-cationic lipid, 25-55% sterol, and 0.5-15% PEG-modified lipid. See, e.g., WO 2017/070624, published 27 Apr. 2017, incorporated herein by reference. Other nanoparticles may be used.

In some embodiments, the yield of transcribed RNA of interest is greater than the yield of RNA transcribed using a batch IVT reaction or method or a conventional fed-batch method (a fed-batch method that is not empirically balanced for NTP consumption). See Kerr et al., Biotechnol. Prog. 15:174-184 (1999). For example, the yield of transcribed RNA of interest may be 20% to 200% greater than the yield of RNA transcribed using a batch IVT reaction or method. In some embodiments, the yield of transcribed RNA of interest is 20%-175%, 20%-150%, 20%-125%, 20%-100%, 20%-75%, 20%-50%, 30%-200%, 30%-175%, 30%-150%, 30%-125%, 30%-100%, 30%-75%, 30%-50%, 40%-200%, 40%-175%, 40%-150%, 40%-125%, 40%-100%, 40%-75%, or 40%-50% greater than the yield of RNA transcribed using a batch IVT reaction or method. In some embodiments, the yield of transcribed RNA of interest is at least 20%, at least 30%, at least 40%, at least 50%, at least 60%, at least 70%, at least 80%, at least 90%, or at least 100% greater than the yield of RNA transcribed using a batch IVT reaction or method.

In some embodiments, the yield of transcribed RNA of interest is greater than 5 mg/mL of initial reaction volume. In some embodiments, the yield of transcribed RNA of interest is greater than 6, 7, 8, 9, 10, 11, 12, 13, 14, 15, 16, 17, 18, 19, 20, 25, 30, 35, or 40 mg/mL of initial reaction volume. In some embodiments, the yield of transcribed RNA of interest is 5-10 mg/mL of initial reaction volume, 5-15 mg/mL of initial reaction volume, 10-20 mg/mL of initial reaction volume, 15-25 mg/mL of initial reaction volume, 20-30 mg/mL of initial reaction volume, 25-35 mg/mL of initial reaction volume, or 30-40 mg/mL of initial reaction volume.

In some embodiments, % tailed RNA of interest (the percent of RNA transcript comprising a polyA tail) is greater than 50%, greater than 60%, greater than 70%, greater than 80%, greater than 90%, or greater than 95% at reaction times (minutes) of 150 minutes, 180, 210, 240, 270, 300, 330, and/or 360 minutes into the fed-batch reaction.

RNA Polymerase

Examples of RNA polymerase that may be used as provide herein include, without limitation, T7 RNA polymerase, T3 RNA polymerase, and SP6 RNA polymerase, and homologs, orthologs, and variants thereof. In some embodiments, the RNA polymerase is a T7 polymerase variant. In some embodiments, a T7 RNA polymerase is modified to include at least one amino acid substitution of a high-helix propensity amino acid in at least one position selected from E42 (e.g., E42R), S43 (e.g., S43A), Y44 (e.g., Y44A), E45 (e.g., E45R/L), M46 (e.g., M46A), G47 (e.g., G47A), A255 (e.g., A255K/Q/Y/I), R257 (e.g., R257A), A258 (e.g., A258R/E/L), G259 (e.g., G259A), A260 (e.g., A260R/E/L), L261 (e.g., L261A) and A262 (e.g., A262R/E/L), relative to wild-type T7 RNA polymerase. The T7 RNA polymerase may further comprise, in some embodiments, one or more additional amino acid substitutions (in addition to at least one high-helix propensity amino acid substitution). Thus, the present disclosure encompasses the further modification of existing (e.g., currently-available and/or commercially-available) T7 RNA polymerase variants with one or more high-helix propensity amino acid substitutions as provided herein.

In some embodiments, an RNA polymerase variant (e.g., a T7 RNA polymerase variant) includes an additional amino acid at its C terminus. In some embodiments, the additional amino acid is a glycine (G). In some embodiments, the additional amino acid is an alanine (A). In some embodiments, an RNA polymerase variant (e.g., a T7 RNA polymerase variant) includes at least two (e.g., 2, 3, 4, 5 or more) additional amino acid at its C terminus. In some embodiments, an RNA polymerase variant (e.g., a T7 RNA polymerase variant) is modified to include at least one amino acid substitution of a high-helix propensity amino acid in at least one position selected from E42 (e.g., E42R), S43 (e.g., S43A), Y44 (e.g., Y44A), E45 (e.g., E45R/L), M46 (e.g., M46A), G47 (e.g., G47A), A255 (e.g., A255K/Q/Y/I), R257 (e.g., R257A), A258 (e.g., A258R/E/L), G259 (e.g., G259A), A260 (e.g., A260R/E/L), L261 (e.g., L261A) and A262 (e.g., A262R/E/L), relative to wild-type T7 RNA polymerase and includes an additional amino acid at its C terminus.

In some embodiments, a T7 RNA polymerase comprises an amino acid sequence of SEQ ID NO: 1 or SEQ ID NO: 2 modified to include at least one amino acid substitution of a high-helix propensity amino acid at a position selected from E42 (e.g., E42R), S43 (e.g., S43A), Y44 (e.g., Y44A), E45 (e.g., E45R/L), M46 (e.g., M46A) and G47 (e.g., G47A). In some embodiments, at least one amino acid substitution comprises G47A.

In some embodiments, an RNA polymerase variant comprises an RNA polymerase that includes an additional C-terminal amino acid, relative to the wild-type RNA polymerase. The additional C-terminal amino acid, in some embodiments, is selected from glycine, alanine, threonine, proline, glutamine, serine. In some embodiments, the additional C-terminal amino acid (e.g., at position 884 relative to wild-type RNA polymerase comprising the amino acid sequence of SEQ ID NO: 1) is glycine.

In some embodiments, a T7 RNA polymerase comprises an additional glycine at the C-terminus relative to wild-type T7 RNA polymerase. In some embodiments, a T7 RNA polymerase comprises a G47A substitution relative to wild-type T7 RNA polymerase. In some embodiments, a T7 RNA polymerase comprises a G47A substitution and an additional glycine at the C-terminus relative to wild-type T7 RNA polymerase.

In some embodiments, an RNA polymerase variant comprises an RNA polymerase that includes (a) an amino acid substitution at a position selected from positions 350, 351, 387, 394, 425, 427, 437, 441, 632, 811, and 880, and (b) an additional amino acid substitution and/or an amino acid modification at the C-terminal end, relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 350, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a lysine (K) at position 350 (E350K), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), an asparagine (N) at position 350 (E350N), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), an alanine (A) at position 350 (E350A), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a tryptophan at position 350 (E350W), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 351, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a valine (V) at position 351 (D351V), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 387, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a serine at position 387 (K387S), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a histidine (H) at position 387 (K387H), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), an asparagine at position 387 (K387N), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 394, and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 425, and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 427, and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 437, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a threonine at position 437 (N437T), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), an isoleucine at position 437 (N437I), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a tyrosine at position 437 (N437Y), and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a phenylalanine at position 437 (N437F), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 441, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), an arginine at position 441 (K441R), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 632, and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 811, and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, an RNA polymerase variant comprises an RNA polymerase that includes an amino acid substitution at position 47 (e.g., G47A), an amino acid substitution at position 880, and/or an additional amino acid (e.g., G) at the C-terminal end (at position 884), relative to wild-type RNA polymerase, wherein the wild-type RNA polymerase comprises the amino acid sequence of SEQ ID NO: 1. In some embodiments, an RNA polymerase variant comprises an RNA polymerase that includes an amino acid substitution at position 47 (e.g., G47A), a tyrosine at position 880 (F880Y), and/or an additional amino acid (e.g., G) at the C-terminal end (at position 884), relative to wild-type RNA polymerase, wherein the wild-type RNA polymerase comprises the amino acid sequence of SEQ ID NO: 1.

In some embodiments, a RNA polymerase variant comprises an RNA polymerase that includes an amino acid substitution at a position selected from the group consisting of E350, D351, K387, N437, K441, D506, R632, D653, S628, P657, F880, and G884 relative to an RNA polymerase comprising the amino acid sequence of any one of SEQ ID NOs: 1-4.

In some embodiments, the RNA polymerase comprises an amino acid substitution at E350. In some embodiments, the RNA polymerase comprises an amino acid substitution at D351. In some embodiments, the RNA polymerase comprises an amino acid substitution at K387. In some embodiments, the RNA polymerase comprises an amino acid substitution at N437. In some embodiments, the RNA polymerase comprises an amino acid substitution at K441. In some embodiments, the RNA polymerase comprises an amino acid substitution at D506. In some embodiments, the RNA polymerase comprises an amino acid substitution at R632. In some embodiments, the RNA polymerase comprises an amino acid substitution at D653. In some embodiments, the RNA polymerase comprises an amino acid substitution at S628. In some embodiments, the RNA polymerase comprises an amino acid substitution at P657. In some embodiments, the RNA polymerase comprises an amino acid substitution at F880. In some embodiments, the RNA polymerase comprises an amino acid substitution at G884.

In some embodiments, the RNA polymerase comprises at least two, at least three, at least four, or at least five amino acid substitutions at positions selected from the group consisting of E350, D351, K387, N437, K441, D506, R632, D653, S628, P657, F880, and G884.

In some embodiments, the RNA polymerase comprises amino acid substitutions at positions selected from the group consisting of: E350 and D351; E350 and K387; E350 and N437; E350 and K441; E350 and D506; E350 and R632; E350 and D653; E350 and S628; E350 and P657; E350 and F880; E350 and G884; D351 and K387, D351 and N437; D351 and K441; D351 and D506; D351 and R632; D351 and D653; D351 and S628; D351 and P657; D351 and F880; D351 and G884; K387 and N437; K387 and K441; K387 and D506; K387 and R632; K387 and D653; K387 and S628; K387 and P657; K387 and F880; and K387 and G884; N437 and K441; N437 and D506; N437 and R632; N437 and D653; N437 and S628; N437 and P657; N437 and F880; N437 and G884; K441 and D506; K441 and R632; K441 and D653; K441 and S628; K441 and P657; K441 and F880; K441 and G884; D506 and R632; D506 and D653; D506 and S628; D506 and P657; D506 and F880; D506 and G884; R632 and D653; R632 and S628; R632 and P657; R632 and F880; R632 and G884; D653 and S628; D653 and P657; D653 and F880; D653 and G884; S628 and P657; S628 and F880; S628 and G884; P657 and F880; P657 and G884; and F880 and G884.

In some embodiments, the RNA polymerase comprises acid substitutions at positions selected from the group consisting of: K387, D653, and G884; E350, D351, and K387; and D653, P657, and R632. In some embodiments, the amino acid substitution at E350 is selected from the group consisting of E350A, E350K, E350N, and E350W, optionally wherein the amino acid substitution at E350 is E350N. In some embodiments, the amino acid substitution at D351 is D351V. In some embodiments, the amino acid substitution at K387 is selected from the group consisting of K387H, K387N, and K387S, optionally wherein the amino acid substitution at K387 is K387N. In some embodiments, the amino acid substitution at N437 is selected from the group consisting of N437F, N437I, N437T, and N437Y, optionally wherein the amino acid substitution at N437 is N437F. In some embodiments, the amino acid substitution at K441 is K441R. In some embodiments, the amino acid substitution at D506 is selected from the group consisting of D506F, D506L, D506R, D506W, and D506Y. In some embodiments, the amino acid substitution at R632 is R632K or R632T.

In some embodiments, the amino acid substitution at D653 is selected from the group consisting of D653A, D653F, D653G, D653H, D653I, D653K, D653L, D653M, D653N, D653P, D653Q, D653R, D653S, D653T, D653V, D653W, and D653Y, optionally wherein the amino acid substitution at D653 is D653W. In some embodiments, the amino acid substitution at S628 is S628W. In some embodiments, the amino acid substitution at P657 is selected from the group consisting of P657A, P657R, and P657W. In some embodiments, the amino acid substitution at F880 is F880Y. In some embodiments, the amino acid substitution at G884 is selected from the group consisting of G884A, G884S, G884T, and G884P.

In some embodiments, an RNA polymerase comprises amino acid substitution at two of the positions selected from the group consisting of E350, D351, K387, and D653, relative to an RNA polymerase comprising the amino acid sequence of any one of SEQ ID NOs: 1-4. In some embodiments, an RNA polymerase comprises amino acid substitutions at E350 and D351. In some embodiments, an RNA polymerase comprises amino acid substitutions at E350 and K387. In some embodiments, an RNA polymerase comprises amino acid substitutions at K387 and D653. In some embodiments, the amino acid substitution at position E350 is E350W, E350A, E350K, or E350N. In some embodiments, the amino acid substitution at position D351 is D351V. In some embodiments, the amino acid substitution at position K387 is K387N, K387S, or K387H. In some embodiments, the amino acid substitution at position D653 is D653T or D653K.

In some embodiments, an RNA polymerase comprises amino acid substitution at positions E350 and K387, relative to an RNA polymerase comprising the amino acid sequence of any one of SEQ ID NOs: 1-4, optionally wherein the substitutions are E350W and K387N.

In some embodiments, an RNA polymerase amino acid substitution at positions E350 and D351, relative an RNA polymerase comprising the amino acid sequence of any one of SEQ ID NOs: 1-4, optionally wherein the substitutions are E350W and D351V.

In some embodiments, an RNA polymerase comprises amino acid substitution at positions K387 and D653, relative to an RNA polymerase comprising the amino acid sequence of any one of SEQ ID NOs: 1-4, optionally wherein the substitutions are K387N and D653T.

In some embodiments, a T7 RNA polymerase comprise the amino acid sequence of SEQ ID NO: 1. In some embodiments, a T7 RNA polymerase comprise the amino acid sequence of SEQ ID NO: 2. In some embodiments, a T7 RNA polymerase comprise the amino acid sequence of SEQ ID NO: 3. In some embodiments, a T7 RNA polymerase comprise the amino acid sequence of SEQ ID NO: 4. In some embodiments, a T7 RNA polymerase comprise the amino acid sequence of SEQ ID NO: 5. In some embodiments, a T7 RNA polymerase comprise the amino acid sequence of SEQ ID NO: 6. In some embodiments, a T7 RNA polymerase comprise the amino acid sequence of SEQ ID NO: 7. In some embodiments, a T7 RNA polymerase comprise the amino acid sequence of SEQ ID NO: 8. In some embodiments, a T7 RNA polymerase comprise the amino acid sequence of SEQ ID NO: 9. In some embodiments, a T7 RNA polymerase comprise the amino acid sequence of SEQ ID NO: 10. In some embodiments, a T7 RNA polymerase comprise the amino acid sequence of SEQ ID NO: 11. In some embodiments, a T7 RNA polymerase comprise the amino acid sequence of SEQ ID NO: 12.

| T7 RNA Polymerase Sequences |
|---|

Wild type T7 RNA Polymerase (SEQ ID NO: 1)

>MNTINIAKNDFSDIELAMPFNTLADHYGERLAREQLALEHESYEMGEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFA

C-terminal G T7 RNA Polymerase (SEQ ID NO: 2)

>MNTINIAKNDFSDIELAMPFNTLADHYGERLAREQLALEHESYEMGEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A T7 RNA Polymerase (SEQ ID NO: 3)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRKDKARKSRRISLEFMLEQANKFANHKAIWFP

| T7 RNA Polymerase Sequences |
| --- |

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFA

G47A; C-terminal G T7 RNA Polymerase (SEQ ID NO: 4)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; E350K; C-terminal G T7 RNA Polymerase (SEQ ID NO: 5)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVKDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

T7 RNA Polymerase Sequences

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; E350N; C-terminal G T7 RNA Polymerase
(SEQ ID NO: 6)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVNDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; E350A; C-terminal G T7 RNA Polymerase
(SEQ ID NO: 7)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVADIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; E350W; C-terminal G T7 RNA Polymerase
(SEQ ID NO: 8)

>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

T7 RNA Polymerase Sequences

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVWDIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; D351V; C-terminal G T7 RNA Polymerase
(SEQ ID NO: 9)
>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEVIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; K487S; C-terminal G T7 RNA Polymerase
(SEQ ID NO: 10)
>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRSDKARKSRRISLEFMLEQANKFANHKAIWFPY

NMDWRGRVYAVSMFNPQGNDMTKGLLTLAKGKPIGKEGYYWLKIHGANCAGVDKVPFP

ERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

T7 RNA Polymerase Sequences

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; K387H; C-terminal G T7 RNA Polymerase (SEQ ID NO: 11)

\>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRHDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

G47A; K387N; C-terminal G T7 RNA Polymerase (SEQ ID NO: 12)

\>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVEDIPAIERE

ELPMKPEDIDMNPEALTAWKRAAAAVYRNDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

T7 RNA Polymerase Sequences

G47A; E350W; D351V; C-terminal G T7 RNA Polymerase
(SEQ ID NO: 13)
>MNTINIAKNDFSDIELAMPFNTLADHYGERLAREQLALEHESYEMAEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVWVIPAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFAG

E350W; D351V; T7 RNA Polymerase
(SEQ ID NO: 14)
>MNTINIAKNDFSDIELAMPFNTLADHYGERLAREQLALEHESYEMGEARFRKMFE

RQLKAGEVADNAAAKPLITTLLPKMIARINDWFEEVKAKRGKRPTAFQFLQEIKPEAVAYI

TIKTTLACLTSADNTTVQAVASAIGRAIEDEARFGRIRDLEAKHFKKNVEEQLNKRVGHVY

KKAFMQVVEADMLSKGLLGGEAWSSWHKEDSIHVGVRCIEMLIESTGMVSLHRQNAGVV

GQDSETIELAPEYAEAIATRAGALAGISPMFQPCVVPPKPWTGITGGGYWANGRRPLALVR

THSKKALMRYEDVYMPEVYKAINIAQNTAWKINKKVLAVANVITKWKHCPVWV1PAIERE

ELPMKPEDIDMNPEALTAWKRAAAAVYRKDKARKSRRISLEFMLEQANKFANHKAIWFP

YNMDWRGRVYAVSMFNPQGNDMTKGLLTLAKGKPIGKEGYYWLKIHGANCAGVDKVPF

PERIKFIEENHENIMACAKSPLENTWWAEQDSPFCFLAFCFEYAGVQHHGLSYNCSLPLAFD

GSCSGIQHFSAMLRDEVGGRAVNLLPSETVQDIYGIVAKKVNEILQADAINGTDNEVVTVT

DENTGEISEKVKLGTKALAGQWLAYGVTRSVTKRSVMTLAYGSKEFGFRQQVLEDTIQPAI

DSGKGLMFTQPNQAAGYMAKLIWESVSVTVVAAVEAMNWLKSAAKLLAAEVKDKKTGE

ILRKRCAVHWVTPDGFPVWQEYKKPIQTRLNLMFLGQFRLQPTINTNKDSEIDAHKQESGI

APNFVHSQDGSHLRKTVVWAHEKYGIESFALIHDSFGTIPADAANLFKAVRETMVDTYESC

DVLADFYDQFADQLHESQLDKMPALPAKGNLNLRDILESDFAFA

In some embodiments, the RNA polymerase (e.g., T7 RNA polymerase variant) is present in an empirically-balanced fed-batch IVT reaction mixture at a concentration of 0.01 mg/ml to 1 mg/ml. For example, the RNA polymerase may be present in a reaction mixture at a concentration of 0.01 mg/mL, 0.05 mg/ml, 0.1 mg/ml, 0.5 mg/ml or 1.0 mg/ml.

Nucleoside Triphosphates

NTPs of the present disclosure may be naturally-occurring NTPs, synthetic NTPs, and/or modified NTPs. A reaction mixture may include naturally-occurring NTPs, synthetic NTPs, modified NTPs, or any combination thereof. Thus, the NTPs of a reaction mixture may comprise unmodified and/or modified adenosine triphosphate (ATP), modified and/or unmodified uridine triphosphate (UTP), modified and/or unmodified guanosine triphosphate (GTP), and/or modified and/or unmodified cytidine triphosphate (CTP). In some embodiments, the NTPs include modified nucleobases. Non-limiting examples of modified nucleobases that may be used as provided herein include pseudouridine (ψ), 1-methylpseudouridine (m1ψ), 1-ethylpseudouridine, 2-thiouridine, 4'-thiouridine, 2-thio-1-methyl-1-deaza-pseudouridine, 2-thio-1-methyl-pseudouridine, 2-thio-5-aza-uridine, 2-thio-dihydropseudouridine, 2-thio-dihydrouridine, 2-thio-pseudouridine, 4-methoxy-2-thio-pseudouridine, 4-methoxy-pseudouridine, 4-thio-1-methyl-pseudouridine, 4-thio-pseudouridine, 5-aza-uridine, dihydropseudouridine, 5-methyluridine, 5-methoxyuridine (mo5U) and 2'-O-methyl uridine. In some embodiments, a mixture of NTPs (and thus the RNA transcript) includes a combination of at least two (e.g., 2, 3, 4 or more) of the foregoing modified nucleobases. In some embodiments, a mixture of NTPs comprises 1-methylpseudouridine (m1ψ). In some embodiments, a mixture of NTPs comprises 1-ethylpseudouridine.

In some embodiments, each NTP (e.g., ATP, UTP, GTP, and CTP) in a fed-batch IVT reaction mixture is present at a molar ratio equivalent to the percent (%) consumption value calculated for each NTP (e.g., calculated during the initial nucleotide empirical balancing reaction). For example, if the percent consumption value for ATP, UTP, GTP, and CTP calculated for a particular RNA of interest in an initial nucleotide empirical balancing reaction is respectively 35%, 20%, 25%, and 20%, then in an IVT reaction mixture comprising a total NTP concentration of 20 mM (for transcribing the same RNA of interest), the molar ratio equivalent for ATP, UTP, GTP, and CTP is respectively 7 mM, 4 mM, 5 mM, and 4 mM.

In some embodiments, each individual (and thus total) NTP concentration in a fed-batch IVT reaction mixture is maintained above zero (0) millimolar (mM) throughout the reaction. For example, the NTP concentrations may be maintained at 1 mM to 50 mM, 1 mM to 40 mM, 1 mM to 30 mM, 1 mM to 20 mM, 1 mM to 10 mM, 2 mM to 50 mM, 2 mM to 40 mM, 2 mM to 30 mM, 2 mM to 20 mM, 2 mM to 10 mM, 3 mM to 50 mM, 3 mM to 40 mM, 3 mM to 30 mM, 3 mM to 20 mM, 3 mM to 10 mM, 4 mM to 50 mM, 4 mM to 40 mM, 4 mM to 30 mM, 4 mM to 20 mM, 4 mM to 10 mM, 5 mM to 50 mM, 5 mM to 40 mM, 5 mM to 30 mM, 5 mM to 20 mM, or 5 mM to 10 mM. In some embodiments, the NTP concentrations are maintained at 10 mM to 20 mM. In some embodiments, the NTP concentrations are maintained at (or at least at) 1 mM, 2 mM, 3 mM, 4 mM, 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, or 20 mM. In some embodiments, the NTP concentrations are maintained above a lower limit of 2 mM to 10 mM, above a lower limit of 2 mM to 9 mM, above a lower limit of 2 mM to 8 mM, above a lower limit of 2 mM to 7 mM, above a lower limit of 2 mM to 6 mM, or above a lower limit of 2 mM to 6 mM.

In some embodiments, each individual (and thus total) NTP concentration is maintained within 5% to 200% of the initial NTP concentration, throughout the fed-batch IVT reaction. For example, the NTP concentrations may be maintained within 5% to 175%, within 5% to 150%, within 5% to 125%, within 5% to 100%, within 5% to 75%, within 5% to 50%, or within 5% to 25% of the initial NTP concentration. In some embodiments, the NTP concentrations are maintained within 5%, 10%, 15%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, or 200% of the initial NTP concentration. The initial NTP concentration is the total NTP concentration in an IVT reaction before transcription begins. As used herein, [NTP] (i.e., brackets around a NTP) generally refers to the concentration of the NTP contained with the brackets. For example [ATP] generally refers to the concentration of ATP; [GTP] generally refers to the concentration of GTP; [CTP] generally refers to the concentration of CTP; [UTP] generally refers to the concentration of UTP.

The concentration of NTPs and cap analog present in an IVT reaction mixture may vary. In some embodiments, each purine NTP and RNA cap analog ("cap analog") are present in the reaction at equimolar (1:1) concentrations. In some embodiments, the molar ratio of cap analog (e.g., trinucleotide cap) to each purine NTP in the reaction is greater than 1:1. For example, the molar ratio of cap analog to NTP in the reaction may be 2:1, 3:1, 4:1, 5:1, 6:1, 7:1, 8:1, 9:1, 10:1, 15:1, 20:1, 25:1, 50:1, or 100:1. In some embodiments, the molar ratio of cap analog (e.g., trinucleotide cap) to each NTP in the reaction is less than 1:1. For example, the molar ratio of cap analog (e.g., trinucleotide cap) to each NTP in the reaction may be 1:2, 1:3, 1:4, 1:5, 1:6, 1:7, 1:8, 1:9, 1:10, 1:15, 1:20, 1:25, 1:50, or 1:100.

The relative concentration of individual NTPs in an IVT reaction may also vary. For example, ATP may be used in excess of GTP, CTP and UTP. As other examples, GTP may be used in excess of ATP, CTP and UTP, CTP may be used in excess of ATP, GTP and UTP, or UTP may be used in excess of ATP, GTP and CTP.

In some embodiments, the relative concentration of NTPs in an initial IVT reaction mixture comprises a ratio of [ATP]:[UTP] of 1:1 to 5:1, 1:1 to 4:1, 1:1 to 3:1, or 1:1 to 2:1. In some embodiments, the relative concentration of NTPs in an initial IVT reaction mixture comprises a ratio of [ATP]:[UTP] of 2:1. In some embodiments, the relative concentration of NTPs in an initial IVT reaction mixture comprises a ratio of [GTP]:[CTP] of 1:1 to 5:1, 1:1 to 4:1, 1:1 to 3:1, or 1:1 to 2:1. In some embodiments, the relative concentration of NTPs in an initial IVT reaction mixture comprises a ratio of [GTP]:[CTP] of 4:1. In some embodiments, the relative concentration of NTPs in an initial IVT reaction mixture comprises a ratio of [ATP]:[UTP] of 2:1 and a ratio of [GTP]:[CTP] of 4:1.

In some embodiments, the total NTP concentration in an ongoing IVT reaction mixture is maintained above a lower limit of 0.5 mM. In some embodiments, the total NTP concentration in an ongoing IVT reaction mixture is maintained at 0.5-20 mM, 1-20 mM, 0.5-5 mM, 2-8 mM, 2-5 mM, 5-10 mM, 5-30 mM, 5-20 mM, 10-20 mM, or 5-15 mM. In some embodiments, the total NTP concentration in an ongoing IVT reaction mixture is maintained at about 10-20 mM, about 8-16, about 6-14 mM, or about 10-15 mM.

RNA Cap Analogs

In some embodiments, an empirically-balanced fed-batch IVT reaction is a "co-transcriptional capping" IVT reaction in which the IVT reaction mixture comprises an RNA cap. That is, mRNA is produced in a "one-pot" reaction, without the need for a separate capping reaction. Thus, in some embodiments, an IVT reaction mixture of the present disclosure includes an RNA cap analog. An RNA cap analog generally enhances mRNA stability and translation efficiency. Traditional cap analogs include GpppG, m7GpppG, and m2,2,7GpppG. In some embodiments, an RNA cap analog of the present disclosure is a dinucleotide cap, a trinucleotide cap, or a tetranucleotide cap.

In some embodiments, the cap analog is a trinucleotide cap. In some embodiments, the trinucleotide cap comprises a sequence selected from the following sequences: GAA, GAC, GAG, GAU, GCA, GCC, GCG, GCU, GGA, GGC, GGG, GGU, GUA, GUC, GUG, and GUU.

In some embodiments, the trinucleotide cap comprises a sequence selected from the following sequences: m$^7$GpppApA, m$^7$GpppApC, m$^7$GpppApG, m$^7$GpppApU, m$^7$GpppCpA, m$^7$GpppCpC, m$^7$GpppCpG, m$^7$GpppCpU, m$^7$GpppGpA, m$^7$GpppGpC, m$^7$GpppGpG, m$^7$GpppGpU, m$^7$GpppUpA, m$^7$GpppUpC, m$^7$GpppUpG, and m$^7$GpppUpU. In some embodiments, the trinucleotide cap comprises a sequence selected from the following sequences: m$^7$G$_{3'OMe}$pppApA, m$^7$G$_{3'OMe}$pppApC, m$^7$G$_{3'OMe}$pppApG, m$^7$G$_{3'OMe}$pppApU, m$^7$G$_{3'OMe}$pppCpA, m⁷G$_{3'OMe}$pppCpC, m⁷G$_{3'OMe}$pppCpG, m⁷G$_{3'OMe}$pppCpU, m⁷G$_{3'OMe}$pppGpA, m⁷G$_{3'OMe}$pppGpC, m⁷G$_{3'OMe}$pppGpG, m⁷G$_{3'OMe}$pppGpU, m⁷G$_{3'OMe}$pppUpA, m⁷G$_{3'OMe}$pppUpC, m⁷G$_{3'OMe}$pppUpG, and m⁷G$_{3'OMe}$pppUpU. In some embodiments, the trinucleotide cap comprises a sequence selected from the following sequences: m⁷G$_{3'OMe}$pppA$_{2'OMe}$pA, m⁷G$_{3'OMe}$pppA$_{2'OMe}$pC, m⁷G$_{3'OMe}$pppA$_{2'OMe}$pG, m⁷G$_{3'OMe}$pppA$_{2'OMe}$pU, m⁷G$_{3'OMe}$pppC$_{2'OMe}$pA, m⁷G$_{3'OMe}$pppC$_{2'OMe}$pC, m⁷G$_{3'OMe}$pppC$_{2'OMe}$pG, m⁷G$_{3'OMe}$pppC$_{2'OMe}$pU, m⁷G$_{3'OMe}$pppG$_{2'OMe}$pA, m⁷G$_{3'OMe}$pppG$_{2'OMe}$pC, m⁷G$_{3'OMe}$pppG$_{2'OMe}$pG, m⁷G$_{3'OMe}$pppG$_{2'OMe}$pU, m⁷G$_{3'OMe}$pppU$_{2'OMe}$pA, m⁷G$_{3'OMe}$pppU$_{2'OMe}$pC, m⁷G$_{3'OMe}$pppU$_{2'OMe}$pG, and m⁷G$_{3'OMe}$pppU$_{2'OMe}$pU. In some embodiments, the trinucleotide cap comprises a sequence selected from the following sequences: m⁷GpppA$_{2'OMe}$pA, m⁷GpppA$_{2'OMe}$pC, m⁷GpppA$_{2'OMe}$pG, m⁷GpppA$_{2'OMe}$pU, m⁷GpppC$_{2'OMe}$pA, m⁷GpppC$_{2'OMe}$pC, m⁷GpppC$_{2'OMe}$pG, m⁷GpppC$_{2'OMe}$pU, m⁷GpppG$_{2'OMe}$pA, m⁷GpppG$_{2'OMe}$pC, m⁷GpppG$_{2'OMe}$pG, m⁷GpppG$_{2'OMe}$pU, m⁷GpppU$_{2'OMe}$pA, m⁷GpppU$_{2'OMe}$pC, m⁷GpppU$_{2'OMe}$pG, and m⁷GpppU$_{2'OMe}$pU.

In some embodiments, the trinucleotide cap comprises a sequence selected from the following sequences: GAG, GCG, GUG, and GGG. In some embodiments, the trinucleotide cap comprises sequence GAG. In some embodiments, the trinucleotide cap comprises m⁷GpppA$_{2'OMe}$pG. In some embodiments, the trinucleotide cap comprises m⁷GpppmA$_{2'OMe}$pG. In some embodiments, the trinucleotide cap comprises m⁷Gpppm⁶A$_{2'OMe}$pG. In some embodiments, the trinucleotide cap comprises m⁷Gpppe⁶A$_{2'OMe}$pG.

In some embodiments, a trinucleotide cap comprises the following structure:

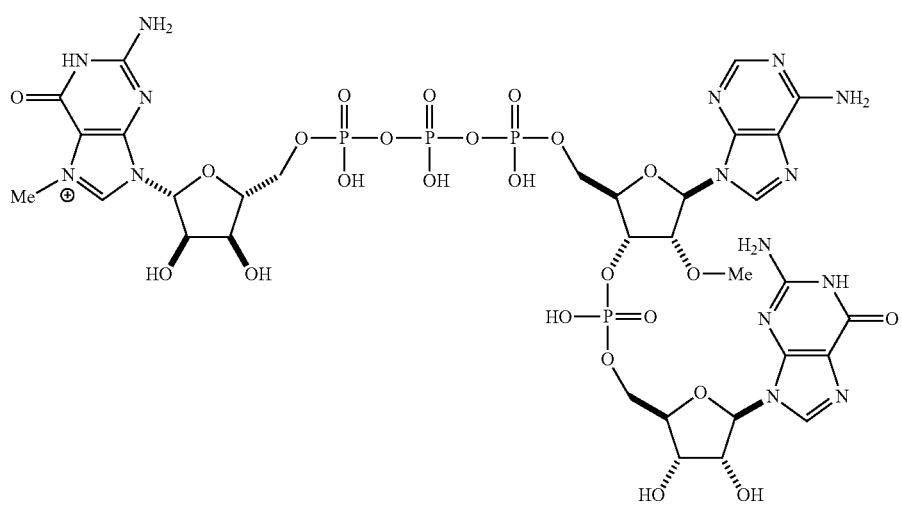

(Cap 1)

In other embodiments, a trinucleotide cap comprises the following structure:

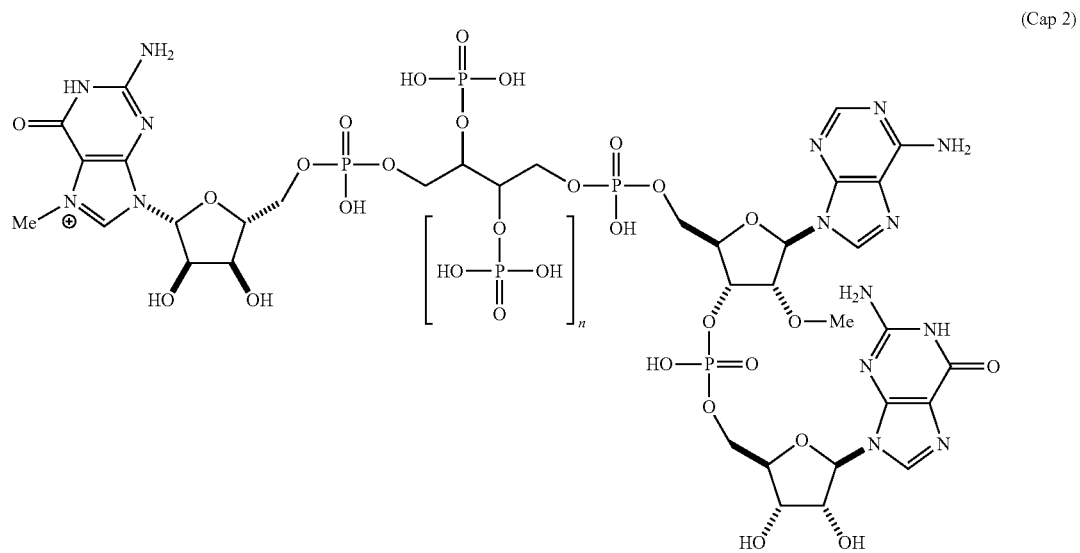

(Cap 2)

In yet other embodiments, a trinucleotide cap comprises the following structure:
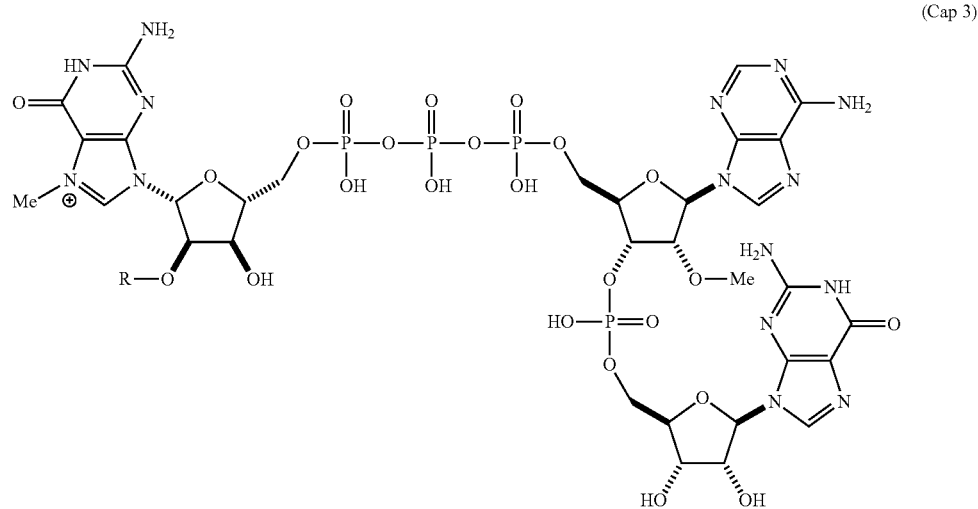
(Cap 3)
In still other embodiments, a trinucleotide cap comprises the following structure:
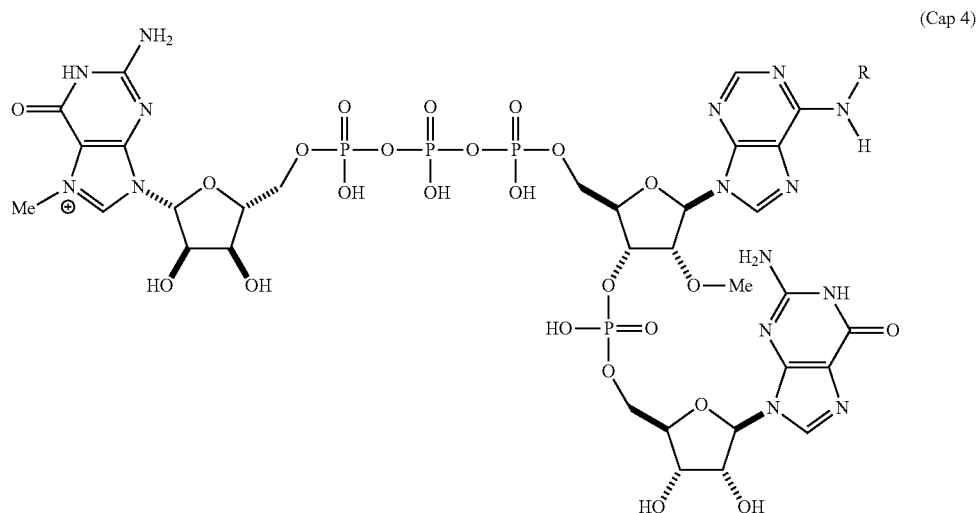
(Cap 4)

In some embodiments, the cap analog is a tetranucleotide cap analog. In some embodiments, the cap analog is a tetranucleotide cap analog comprising a GGAG sequence. In some embodiments, a tetranucleotide cap comprises the following structure:
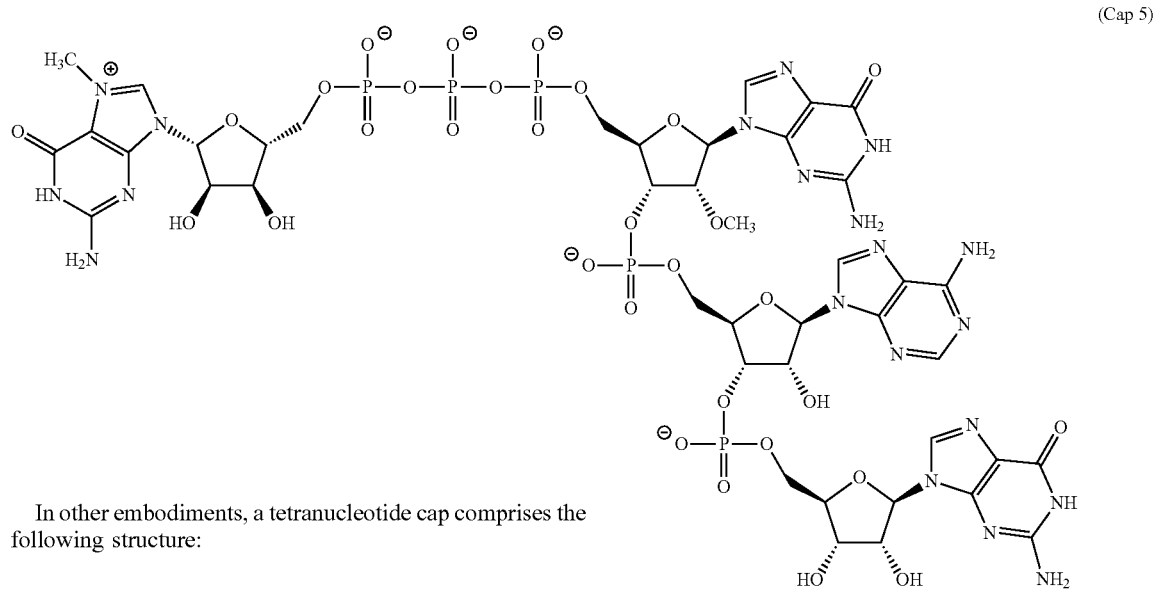
(Cap 5)
In other embodiments, a tetranucleotide cap comprises the following structure:
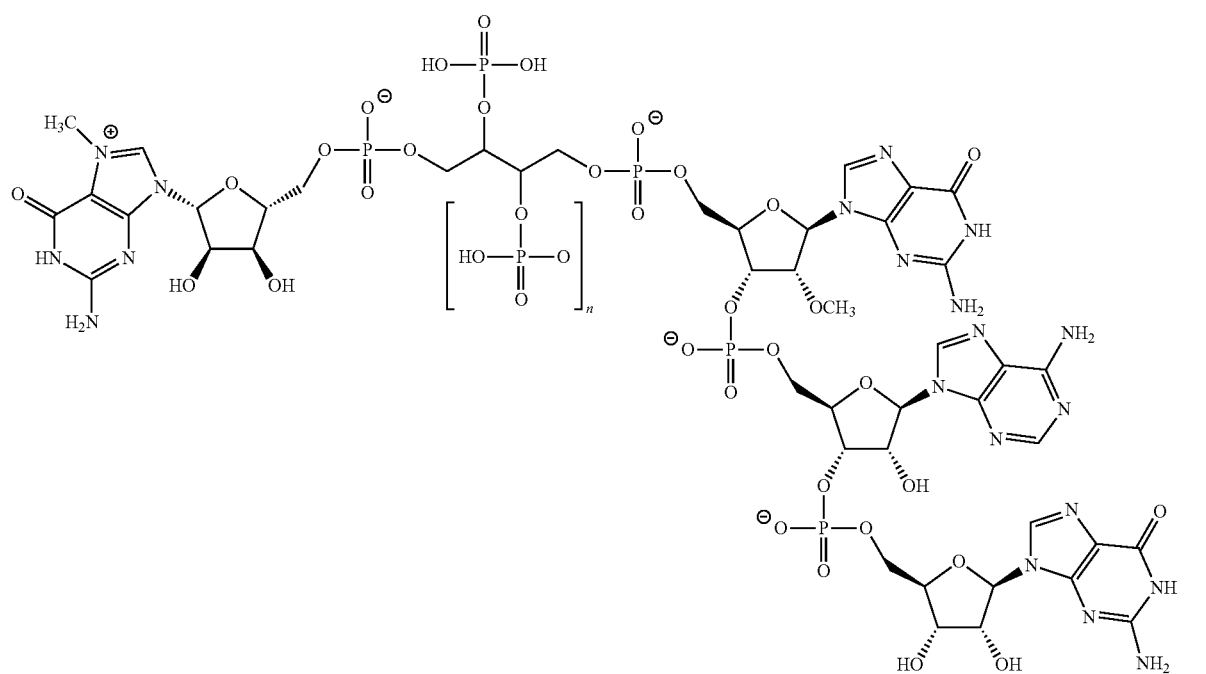
(Cap 6)

In yet other embodiments, a tetranucleotide cap comprises the following structure:

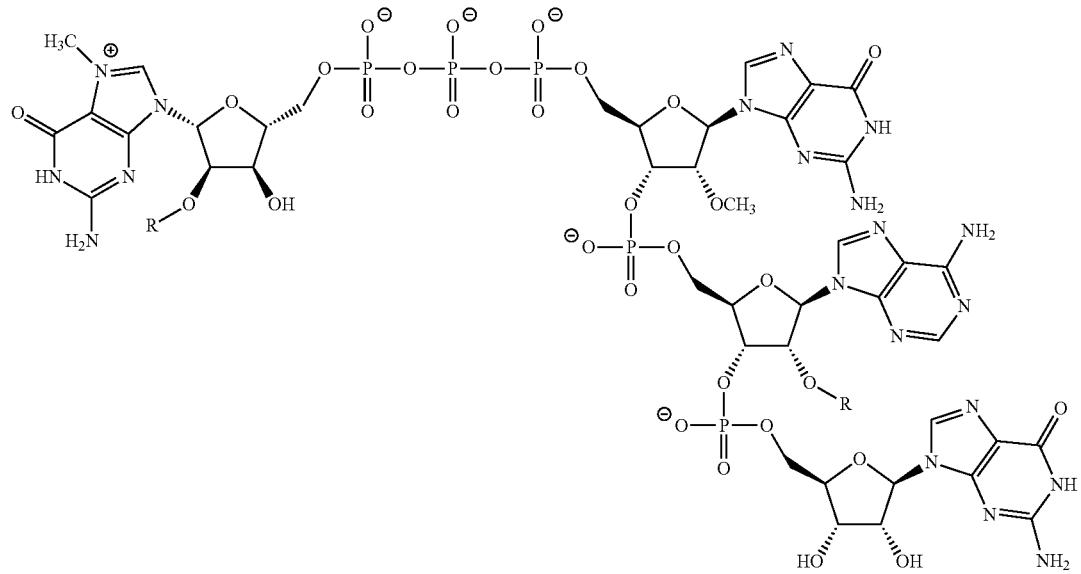

(Cap 7)

In yet other embodiments, a tetranucleotide cap comprises the following structure:

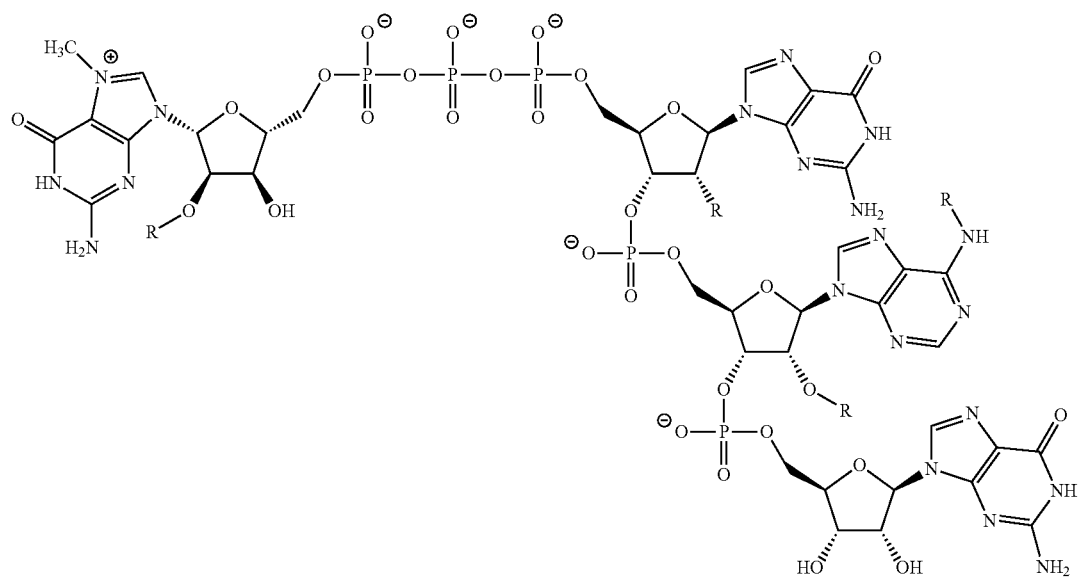

(Cap 8)

In some embodiments, R is an alkyl (e.g., $C_1$-$C_6$ alkyl). In some embodiments, R is a methyl group (e.g., $C_1$ alkyl). In some embodiments, R is an ethyl group (e.g., $C_2$ alkyl). In some embodiments, R is a hydrogen.

In some embodiments, 20% to 100%, 30% to 100%, 40% to 100%, 50% to 100%, 60% to 100%, 70% to 100%, 80% to 100, or 90% to 100% of the RNA produced by the methods of the present disclosure is capped (comprises an RNA cap analog, e.g., $m^7GpppA_{2'OMe}pG$). For example, greater than 70%, greater than 80%, greater than 85%, greater than 90%, or greater 95% of the RNA produced by the methods of the present disclosure is capped (comprises an RNA cap analog, e.g., $m^7GpppA_{2'OMe}pG$). In some embodiments, 100% of the RNA produced by the methods of the present disclosure is capped (comprises an RNA cap analog, e.g., $m^7GpppA_{2'OMe}pG$)

In some embodiments, % capping of the RNA of interest (the percent of RNA transcript comprising an RNA cap analog) is above 80%, above 90%, or above 95% at 150, 180, 210, 240, 270, 300, 330, and/or 360 minutes into the fed-batch reaction.

In some embodiments, the reaction mixture is not supplemented with an RNA cap analog during transcription of the RNA of interest. That is, throughout the entire IVT reaction, the only RNA cap analog present is that which was in the reaction mixture prior to commencement of transcription (additional RNA cap analog is not added to the IVT reaction).

In some embodiments, an IVT reaction mixture comprises a starting RNA cap analog concentration (concentration of RNA cap analog prior to commencement of transcription) that is at least 10% (e.g., at least 20%, at least 30%, at least 40%, or at least 50%) greater than the concentration of the NTP (e.g., ATP, UTP, GTP, or CTP (modified or unmodified)) with the highest percent consumption value. In some embodiments, an IVT reaction mixture comprises a starting RNA cap analog concentration that is greater than the concentration of the NTP (e.g., ATP, UTP, GTP, or CTP (modified or unmodified)) with the highest percent consumption value.

In some embodiments, an IVT reaction mixture comprises a starting RNA cap analog concentration (concentration of RNA cap analog prior to commencement of transcription) that is at least 10% (e.g., at least 20%, at least 30%, at least 40%, or at least 50%) greater than the concentration of the purine (modified or unmodified) with the highest percent consumption value. In some embodiments, an IVT reaction mixture comprises a starting RNA cap analog concentration that is greater than the concentration of the purine (modified or unmodified) with the highest percent consumption value.

In some embodiments, an IVT reaction mixture comprises a starting RNA cap analog concentration (concentration of RNA cap analog prior to commencement of transcription) that is at least 10% (e.g., at least 20%, at least 30%, at least 40%, or at least 50%, or at least 100%) greater than the concentration of the individual NTPs (e.g., ATP, UTP, GTP, or CTP (modified or unmodified)) present in the first coding position of the RNA of interest. In some embodiments, an IVT reaction mixture comprises a starting RNA cap analog concentration (concentration of RNA cap analog prior to commencement of transcription) that is 10%-100%, 10%-50%, 10%-40%, or 10%-30% greater than the concentration of the NTP (e.g., ATP, UTP, GTP, or CTP (modified or unmodified)) present in the first coding position of the RNA of interest.

In some embodiments, an IVT reaction mixture, e.g., the initial and ongoing IVT reaction mixtures, comprises a ratio of [RNA cap analog]:[purine] of 1:1 to 20:1, 1:1 to 15:1, 1:1 to 10:1, 1:1 to 5:1, 1:1 to 3:1, or 1:1 to 2:1. In some embodiments, the concentration of RNA cap analog relative to the concentration of purine nucleotides (e.g., ATP and GTP) is 1:1 to 20:1, 1:1 to 15:1, 1:1 to 10:1, 1:1 to 5:1, 1:1 to 3:1, or 1:1 to 2:1

Additional IVT Reaction Components In some embodiments, the IVT reaction mixture comprises a buffer, e.g., Tris, phosphate or a Good's buffer. The concentration of buffer used in an empirically-balanced fed-batch IVT reaction mixture may be, for example, at least 10 mM, at least 20 mM, at least 30 mM, at least 40 mM, at least 50 mM, at least 60 mM, at least 70 mM, at least 80 mM, at least 90 mM, at least 100 mM or at least 110 mM phosphate. In some embodiments, the concentration of phosphate is 20-60 mM or 10-100 mM. In some embodiments, the buffer comprises Tris-HCl. For example, the buffer may comprise 10-100 mM, 10-80 mM, 10-60 mM, 20-100 mM, 20-18 mM, 20-60 mM Tris-HCl. In some embodiments, the buffer comprises 40 mM Tris-HCl.

In some embodiments, the fed-batch IVT reaction mixture contains a reductant or reducing agent such as dithiothreitol (DTT) or tris(2-carboxyethyl)phosphine (TCEP). The concentration of DTT used in an IVT reaction mixture may be, for example, at least 1 mM, at least 5 mM, or at least 50 mM.

In some embodiments, the concentration of DTT used in an IVT reaction mixture is 1-50 mM or 5-50 mM. In some embodiments, the concentration of DTT used in an IVT reaction mixture is 5 mM. The concentration of TCEP used in an IVT reaction mixture may be, for example, at least 1 mM, at least 5 mM, or at least 50 mM. In some embodiments, the concentration of TCEP used in an IVT reaction mixture is 1-50 mM or 5-50 mM. In some embodiments, the concentration of TCEP used in an IVT reaction mixture is 2 mM.

In some embodiments, the empirically-balanced fed-batch IVT reaction mixture contains magnesium. In some embodiments, the molar ratio of NTP to magnesium ions ($Mg^{2+}$; e.g., $Mg(OAc)_2$) present in an IVT reaction is 1:1 to 1:5. For example, the molar ratio of NTP to magnesium ions may be 1:1, 1:2, 1:3, 1:4 or 1:5.

Feeding Schedule

A fed-batch IVT reaction typically comprises a regular feeding schedule. A regular feeding schedule may be used to maintain NTP concentrations within the IVT reaction at a desired level, e.g., above a threshold level, e.g., above 5%, 10%, 20%, 30%, or 50% of the initial NTP concentration. In some embodiments, the timing and/or amount used in a feed schedule is determined using a scouting fed-batch IVT reaction. In some embodiments, if an IVT reaction is overfed (i.e., too much of any given NTP is added during a reaction), the ratio of cap analog relative to purine may decrease to less than 1:1, wherein overfeeding may result in low % capped RNA product. In other embodiments, if an IVT reaction is underfed (i.e., not enough of any given NTP is added during a reaction), one or more nucleotides may be depleted below a threshold level, e.g., depleted to 0 mM, and the total yield of transcribed RNA may be low. In some embodiments, a feeding schedule may involve bolus feeding of a feed stock. In some embodiments, a feeding schedule may involve continuous feeding of a feed stock.

In some embodiments, bolus feeding of a feed stock to an ongoing IVT reaction involves the addition of a discrete volume or quantity of feed stock once every 10-250 minutes, 20-200 minutes, 10-175 minutes, 10-100 minutes, 10-20 minutes, 10-30 minutes, 30-60 minutes, 30-100 minutes, 30-150 minutes, 50-100 minutes, 50-150 minutes, 100-300 minutes, 100-250 minutes, or 100-150 minutes. In some embodiments, bolus feeding of a feed stock to an ongoing IVT reaction involves the addition of a discrete volume or quantity of feed stock once every 10, 20, 30, 40, 50, 60, 70, 80, 90, 100, 110, 120, 130, 140, 150, 160, 170, 180, 190, 200, 210, 220, 230, 240, 250, 260, 270, 280, 290, or 300 minutes. In some embodiments, a discrete volume involved in a bolus feeding is 1-20 mL, 5-20 mL, 10-50 mL, 25-100 mL, 50-500 mL, 250-1000 mL, or more. In some embodiments, a discrete volume involved in a bolus feeding is 1, 2, 3, 4, 5, 6, 7, 8, 9, 10, 15, 20, 25, 50, 75, 100, 150, 200, 250, 500, 750, or 1000 mL. In some embodiments, a discrete quantity of feed stock is any amount sufficient to maintain NTP concentrations above a threshold level as described above, e.g., within a range of 5% to 200%, 5%-100%, 5%-75%, 20%-100%, 20%-75%, or 25%-50% of initial NTP concentrations. In some embodiments, a discrete quantity of feed stock is any amount sufficient to maintain a ratio of [ATP]:[UTP] of 1:1 to 5:1, 1:1 to 4:1, 1:1 to 3:1, or 1:1 to 2:1. In some embodiments, a discrete quantity of feed stock is any amount sufficient to maintain a ratio of [ATP]:[UTP] of 2:1. In some embodiments, a discrete quantity of feed stock is any amount sufficient to maintain a ratio of [GTP]:[CTP] of 1:1 to 5:1, 1:1 to 4:1, 1:1 to 3:1, or 1:1 to 2:1. In some embodiments, a discrete quantity of feed stock is any amount sufficient to maintain a ratio of [GTP]:[CTP] of 4:1. In some embodiments, a discrete quantity of feed stock is any amount sufficient to maintain a ratio of [ATP]:[UTP] of 2:1 and a ratio of [GTP]:[CTP] of 4:1.

In some embodiments, an IVT reaction is supplemented with a bolus feeding of a feed stock once, twice, or three times during the entirety of the reaction. In some embodiments, an IVT reaction is supplemented with a bolus feeding of a feed stock 4, 5, 6, 7, 8, 9, 10, or more times during the entirety of the reaction. In some embodiments, an IVT reaction is supplemented with a bolus feeding of a feed stock 1-5, 2-5, 2-10, 3-10, 3-7, 4-8, 5-10, 5-15, or more times during the entirety of the reaction.

In some embodiments, continuous feeding of a feed stock to an ongoing IVT reaction involves continuous or constant addition of feed stock over time, e.g., throughout the entirety of the IVT reaction. In some embodiments, a continuous feeding schedule is determined based on the bolus feeding schedule of the same RNA of interest, e.g., by dividing the total volume or quantity added over a period of time during a reaction by the total time over which that volume or quantity was added. In some embodiments, continuous feeding involves constant addition of a feed stock to an ongoing IVT reaction at a continuous flow rate of 1-50 mL/min, 2-25 mL/min, 2-10 ml/min, 2-8 mL/min, 4-6 mL/min, 3-6 mL/min, or any operable flow rate. In some embodiments, continuous feeding involves constant addition of a feed stock to an ongoing IVT reaction at a continuous flow rate of 1, 2, 3, 4, 5, 6, 7, 8, 9, 10, 11, 12, 13, 14, 15, 16, 17, 18, 19, 20, 25, 30, 35, 40, 45, or 50 mL/min. In some embodiments, continuous feeding involves constant addition of a feed stock to an ongoing IVT reaction at a continuous flow rate of 0.0030-0.007 mL/min per mL of initial volume, 0.0040-0.0060 mL/min per mL of initial volume, 0.0050-0.0080 mL/min per mL of initial volume, or 0.0060-0.0090 mL/min per mL of initial volume. In some embodiments, the concentration of NTPs in a feed stock used in continuous feeding is sufficient to maintain NTP concentrations above a threshold level as described above, e.g., within a range of 5% to 200%, 5%-100%, 5%-75%, 20%-100%, 20%-75%, or 25%-50% of initial NTP concentrations. In some embodiments, continuous feeding is performed using a peristaltic pump in order to accurately deliver consistent flow rates (volumes) over time.

In some embodiments, the concentration of NTPs in a feed stock used in continuous or bolus feeding is sufficient to maintain NTP concentrations above a threshold level. In some embodiments, a discrete quantity of feed stock is any amount sufficient to maintain NTP concentrations above a threshold level. In some embodiments, the threshold level is 1 mM to 50 mM, 1 mM to 40 mM, 1 mM to 30 mM, 1 mM to 20 mM, 1 mM to 10 mM, 2 mM to 50 mM, 2 mM to 40 mM, 2 mM to 30 mM, 2 mM to 20 mM, 2 mM to 10 mM, 3 mM to 50 mM, 3 mM to 40 mM, 3 mM to 30 mM, 3 mM to 20 mM, 3 mM to 10 mM, 4 mM to 50 mM, 4 mM to 40 mM, 4 mM to 30 mM, 4 mM to 20 mM, 4 mM to 10 mM, 5 mM to 50 mM, 5 mM to 40 mM, 5 mM to 30 mM, 5 mM to 20 mM, or 5 mM to 10 mM. In some embodiments, the threshold level is 10 mM to 20 mM. In some embodiments, the threshold level is 1 mM, 2 mM, 3 mM, 4 mM, 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, or 20 mM. In some embodiments, the threshold level is a lower limit of 2 mM to 10 mM, above a lower limit of 2 mM to 9 mM, above a lower limit of 2 mM to 8 mM, above a lower limit of 2 mM to 7 mM, above a lower limit of 2 mM to 6 mM, or above a lower limit of 2 mM to 6 mM. In some embodiments, the threshold level is within 5% to 200% of the initial NTP concentration. For example, the threshold level may be within 5% to 175%, within 5% to 150%, within 5% to 125%, within 5% to 100%, within 5% to 75%, within 5% to 50%, or within 5% to 25% of the initial NTP concentration. In some embodiments, the threshold level is within 5%, 10%, 15%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, or 200% of the initial NTP concentration.

Results from fed-batch IVT have consistently shown a decrease in reaction rate (both consumption of NTPs and production of RNA) throughout the reaction. As a result, the rate of feeding must also be varied throughout the reaction. If a signal continuous feed rate (described previously) were used to feed an IVT with a decreasing reaction rate throughout the entire duration, the reaction would be under-fed at the start of the reaction when the rate is fastest, and over-fed at the end of the reaction when the rate is slowest. To prevent the risk of under- and over-feeding, the reaction can be split into two or more continuous feed rates to be used during specified time intervals of the reaction. The number of distinct feed rate and switch times required may vary depending upon the decrease in reaction rate observed throughout fed-batch IVT.

Scouting Fed-Batch IVT Reaction

To determine an appropriate feeding schedule, a scouting fed-batch IVT reaction may be conducted, in which bolus feeding is used to add feed stock to an active IVT reaction at defined time intervals and in defined volumes or quantities. In some embodiments, these initial feed conditions are selected based on the prior results of fed-batch IVT reactions with other DNA encoding different RNA sequences, and are not intended to produce high quality product or yield. In some embodiments, the scouting IVT reaction includes sampling time points from the active fed-batch IVT immediately prior to each bolus feed. The measured NTP concentrations within each of these samples may then be used to calculate the rates of NTP consumption in the IVT reaction for the unique DNA being transcribed over time. Feeding schedules may then be adjusted to match the observed NTP consumption and to maintain the target NTP concentration throughout the reaction. In some embodiments, these discrete feed times and volumes constitute the bolus feed schedule for the fed-batch IVT reaction.

Additional Embodiments

1. A method of determining percent (%) nucleoside triphosphates (NTPs) consumption of an in vitro transcription (IVT) reaction comprising:
   (a) conducting an IVT reaction with a reaction mixture that comprises known initial NTP concentrations, a deoxyribonucleic acid (DNA) encoding a ribonucleic acid (RNA) of interest, and an RNA polymerase;
   (b) measuring individual NTP concentrations at discrete intervals over a period of time; and
   (c) calculating a percent (%) consumption value for each NTP of the reaction mixture.

2 The method of paragraph 1, wherein the NTPs comprise adenosine triphosphate (ATP), cytidine triphosphate (CTP), uridine triphosphate (UTP), and guanosine triphosphate (GTP).

3. The method of paragraph 1, wherein step (b) comprises (i) dividing individual NTP consumption rate over total NTP consumption rate.

4. The method of paragraph 3, wherein the individual NTP consumption rate is calculated by measuring individual NTP concentrations at discrete intervals over a period of time; and the total NTP consumption rate is calculated by measuring total NTP concentration at discrete intervals over a period of time.

5. The method of paragraph 4, wherein the individual NTP concentration and total NTP concentration measurements are collected until the concentration of at least one of the NTPs drops below a threshold concentration.

6. The method of paragraph 5, wherein the threshold concentration is above zero (0) millimolar (mM), optionally wherein the threshold concentration is 5 mM to 20 mM, and optionally wherein the threshold concentration is within 5%-75% of the initial NTP concentration.

7. The method of any one of paragraphs 1-6, wherein the known initial NTP concentrations comprise equimolar NTP concentrations of each of [ATP], [CTP], [UTP], and [GTP].

8. The method of any one of paragraphs 1-6, wherein the known initial NTP concentrations comprise a ratio of [ATP]:[UTP] of 1:1 to 4:1, optionally 1:1 to 2:1, and/or a ratio of [GTP]:[CTP] of 1:1 to 4:1.

9. The method of any one of paragraphs 1-8, wherein the known initial NTP concentrations comprise a ratio of [ATP]:[UTP]:[CTP]:[GTP] of 2:1:1:4.

10. The method of any of the above paragraphs, wherein the NTP is a chemically modified NTP, a naturally-occurring NTP, or a synthetic NTP.

11. The method of any one of paragraphs 1-10, wherein the IVT reaction is conducted over a time interval of 20 to 40 minutes.

12. A method of fed-batch in vitro transcription (IVT) of a ribonucleic acid (RNA) of interest comprising:
(a) conducting an IVT reaction with an initial reaction mixture that comprises deoxyribonucleic acid (DNA) encoding an RNA of interest, RNA polymerase, and nucleoside triphosphates (NTPs); and
(b) delivering to the ongoing IVT reaction mixture a feed stock mixture over time that comprises NTPs, wherein each NTP is present in the feed stock mixture at a molar ratio based on percent consumption value calculated separately for each NTP, wherein the percent consumption values are specific to the RNA of interest, and wherein the feed stock mixture is delivered in an amount that maintains a total NTP concentration in the reaction mixture above zero mM,
thereby producing a transcribed RNA of interest.

13. The method of paragraph 12, wherein the NTPs comprise adenosine triphosphate (ATP), cytidine triphosphate (CTP), uridine triphosphate (UTP), and guanosine triphosphate (GTP).

14. The method of paragraph 12 or 13, wherein the initial reaction mixture of (a) comprises a ratio of [ATP]:[UTP] of 1:1 to 4:1, optionally 1:1 to 2:1, and/or a ratio of [GTP]:[CTP] of 1:1 to 4:1.

15. The method of any one of paragraphs 12-14, wherein the initial reaction mixture of (a) comprises a ratio of [ATP]:[UTP]:[CTP]:[GTP] of 2:1:1:4.

16. The method of any one of paragraphs 12-15, wherein each NTP in the initial reaction mixture of (a) is present at a molar ratio equivalent that is different from the percent (%) consumption value calculated for each NTP.

17. The method of any one of paragraphs 12-16, wherein each NTP in the initial reaction mixture of (a) is present in an equimolar concentration for each NTP.

18. The method of any one of paragraphs 12-17, wherein each NTP in the initial reaction mixture of (a) is present at a concentration of 1-10 mM, 1-6 mM, 2-6 mM, or 3-6 mM.

19. The method of any one of paragraphs 12-18, wherein the concentration of each NTP in the ongoing IVT reaction mixture is maintained within a range of 5% to 200%, 5%-100%, 5%-75%, 20%-100%, 20%-75%, or 25%-50% of its corresponding initial NTP concentration.

20. The method of any one of paragraphs 12-19, wherein the reaction mixture is maintained at a ratio of [ATP]:[UTP] of 1:1 to 4:1, optionally 1:1 to 2:1, and/or a ratio of [GTP]:[CTP] of 1:1 to 4:1.

21. The method of any one of paragraphs 12-20, wherein the reaction mixture is maintained at a ratio of [ATP]:[UTP]:[CTP]:[GTP] of 2:1:1:4.

22. A method of fed-batch in vitro transcription (IVT) of a ribonucleic acid (RNA) of interest comprising:
(a) conducting an IVT reaction with an initial reaction mixture that comprises deoxyribonucleic acid (DNA) encoding an RNA of interest, RNA polymerase, and nucleoside triphosphates (NTPs), wherein the NTPs comprise a ratio of [ATP]:[UTP] of 2:1 and a ratio of [GTP]:[CTP] of 4:1; and
(b) delivering to the ongoing IVT reaction mixture a feed stock mixture over time that comprises NTPs, wherein each NTP is present in the feed stock mixture at a molar ratio based on percent consumption value calculated separately for each NTP, wherein the percent consumption values are specific to the RNA of interest, and wherein the feed stock mixture is delivered in an amount that maintains a ratio of [ATP]:[UTP] of 2:1 and a ratio of [GTP]:[CTP] of 4:1,
thereby producing a transcribed RNA of interest.

23. The method of any one of paragraphs 12-22, wherein the NTPs are chemically modified NTPs, naturally-occurring NTPs, or synthetic NTPs.

24. The method of any one of paragraphs 12-23, wherein the feed stock mixture is delivered to the ongoing IVT reaction mixture using bolus feeding over time.

25. The method of paragraph 24, wherein the feed stock mixture is delivered to the ongoing IVT reaction mixture every 10-250 minutes, optionally every 20-200 minutes.

26. The method of any one of paragraphs 12-23, wherein the feed stock mixture is delivered to the ongoing IVT reaction mixture using continuous feeding over time.

27. The method of paragraph 26, wherein the feed stock mixture is delivered to the ongoing IVT reaction mixture at a continuous flow rate of
(i) 2-8 mL/min, optionally 4-6 mL/min; or
(ii) 0.0030-0.007 mL/min per mL of initial volume, optionally 0.0040-0.0060 mL/min per mL of initial volume.

28. The method of any one of paragraphs 12-27, wherein each NTP in the initial reaction mixture of (a) is present at a molar ratio equivalent to the percent (%) consumption value calculated for each NTP.

29. The method of any one of paragraphs 12-28, wherein the total NTP concentration in the ongoing IVT reaction mixture is maintained above a lower limit of 0.5 mM, optionally maintained at 10 mM to 20 mM.

30. The method of any one of paragraphs 1-29, wherein the initial and/or ongoing IVT reaction mixtures further comprise an RNA cap analog.

31. The method of paragraph 30, wherein the RNA cap analog is a chemically modified RNA cap analog, a naturally-occurring RNA cap analog, or a synthetic RNA cap analog.

32. The method of paragraph 30 or 31, wherein the RNA cap analog is (i) a trinucleotide RNA cap analog, optionally selected from trinucleotide cap analogs comprising a Cap 1, Cap 2, Cap 3, or Cap 4 structure, or (ii) a tetranucleotide RNA cap analog, optionally selected from trinucleotide cap analogs comprising a Cap 5, Cap 6, Cap 7, or Cap 8 structure.

33. The method of any one of paragraphs 30-32, wherein the initial and ongoing IVT reaction mixtures comprise a ratio of [RNA cap analog]:[purine] of 1:1 to 20:1, 1:1 to 15:1, 1:1 to 10:1, 1:1 to 5:1, 1:1 to 3:1, or 1:1 to 2:1.

34. The method of any one of paragraphs 12-33, wherein the yield of transcribed RNA of interest is greater than the yield of RNA transcribed using a batch IVT reaction.

35. The method of paragraph 34, wherein the yield of transcribed RNA of interest is at least 100% greater than the yield of RNA transcribed using a batch IVT reaction.

36. The method of any one of paragraphs 12-35, wherein the yield of transcribed RNA of interest is greater than 5, 10, 15, 20, 25, or 30 mg/mL of initial reaction volume.

37. The method of any one of paragraphs 12-36, wherein the initial and ongoing IVT reaction mixtures further comprise a buffer and/or magnesium.

38. The method of paragraph 37, wherein the buffer is Tris-HCl, optionally wherein the buffer is 20 to 60 mM Tris-HCl, optionally wherein the buffer is 40 mM Tris-HCl.

39. The method of any one of paragraphs 30-3387, wherein at least 90%, optionally at least 95%, of the transcribed RNA of interest comprises the RNA cap analog.

40. The method of any one of paragraphs 30-39, wherein the cap analog to ATP ratio, or the cap analog to GTP ratio, is greater than 0.6, and at least 90% of the transcribed RNA of interest comprises a cap analog.

41. The method of paragraph 39 or 40, wherein the transcribed RNA of interest has a length of at least 2000 nucleotides.

42. The method of any one of paragraphs 30-41, wherein at least 90% of the transcribed RNA of interest comprises the RNA cap analog by the $180^{th}$ minute and/or the $360^{th}$ minute of the IVT reaction.

43. The method of any one of paragraphs 12-42, wherein the initial and/or ongoing IVT reaction mixtures are not supplemented with an RNA cap analog during the IVT reaction.

44. The method of any one of paragraphs 12-43, wherein the DNA concentration in the initial reaction mixture is 0.025-0.075 mg/mL, optionally 0.05 mg/mL.

45. The method of any one of paragraphs 12-44, wherein the DNA concentration is maintained at a concentration of above 0.01 mg/mL during the IVT reaction, optionally 0.01-0.05 mg/mL.

46. The method of any one of paragraphs 12-45, wherein the molar ratio of transcribed RNA of interest to the DNA in the IVT reaction is at least 2-fold or at least 3-fold greater than the molar ratio of transcribed RNA to DNA of a non-fed batch control method.

47. The method of any one of paragraphs 23-46, wherein the UTP is a modified UTP selected from 1-methylpseudouridine and 1-ethylpseudouridine.

48. The method of any one of paragraphs 12-47, wherein the transcribed RNA of interest is a messenger RNA (mRNA).

49. The method of any one of paragraphs 12-48, wherein the transcribed RNA of interest has a length of longer than 100 nucleotides.

50. The method of any one of paragraphs 12-49, wherein the total IVT reaction time is 150-1000 minutes.

51. The method of any one of paragraphs 12-50, wherein at least 50% or at least 70% of the transcribed RNA of interest comprises a polyA tail by the $420^{th}$ minute of the IVT reaction.

52. The method of paragraph 51, wherein the polyA tail is an $A_{100}$ polyA tail.

53. The method of any one of paragraphs 30-52, wherein the initial reaction mixture comprises an RNA cap analog concentration that is at least 10% or at least 20% greater than the concentration of the NTP present in the first coding position of the RNA of interest.

54. The method of paragraph 53, wherein the NTP present in the first coding position of the RNA of interest is ATP or GTP.

55. The method of any one of paragraphs 1-54, wherein the RNA polymerase is a T7 RNA polymerase.

56. The method of paragraph 55, wherein the T7 RNA polymerase comprises an additional glycine at the C-terminus relative to wild-type T7 RNA polymerase.

57. The method of paragraph 55, wherein the T7 RNA polymerase comprises a G47A substitution relative to wild-type T7 RNA polymerase.

58. The method of paragraph 55, wherein the T7 RNA polymerase comprises a G47A substitution and an additional glycine at the C-terminus relative to wild-type T7 RNA polymerase.

59. The method of any one of paragraphs 30-58, wherein the RNA cap analog is a dinucleotide cap, a trinucleotide cap, or a tetranucleotide cap.

60. The method of paragraph 59, wherein the RNA cap analog comprises a trinucleotide sequence GAG, optionally $GpppA_{2'OMe}pG$.

61. The method of paragraph 60, wherein the RNA cap analog comprises a tetranucleotide sequence GGAG.

62. The method of any one of paragraphs 12-61 further comprising isolating the transcribed RNA of interest.

63. The RNA of interest isolated from the method of paragraph 62.

64. A ribonucleic acid (RNA) produced by the method of any one of paragraphs 12-63.

65. The RNA of paragraph 63 or 64 formulated in a cationic lipid nanoparticle, optionally wherein the cationic lipid nanoparticle comprises a molar ratio of 20-60% ionizable cationic lipid, 5-25% non-cationic lipid, 25-55% sterol, and 0.5-15% PEG-modified lipid.

EXAMPLES

The present disclosure is further illustrated by the following Examples. These Examples are provided to aid in the understanding of the disclosure, and should not be construed as a limitation thereof.

The empirically-balanced fed-batch in vitro transcription (IVT) reaction of the present disclosure is based, in part, on the following:

Empirical Balancing of Nucleotides
    Determining the percent consumption of each nucleotide for a given DNA
    Formulating a nucleotide master mix for use in the IVT reaction and feed stock by using the percent consumption Determining Feed Schedule and Feed Stock Components
    Feed schedule accommodates changes in the reaction rate over time
    Feeding ensures that the ratio of cap analog to the highest purine NTP concentration is ≥1

Feed stock recipe maximizes yield and product quality while minimizing cost of goods Example 1. Nucleotide Empirical Balancing In this Example, the fed-batch IVT reaction uses four nucleotides: CTP, GTP, UTP, and ATP. We have shown that the relative molar ratios of each nucleotide can be varied to maximize the utilization of reactants or to change the attributes of the RNA product. Here, we present a platform for balancing the ratios of the four nucleotides according to their rate of consumption to ensure that the concentration of each is maintained throughout fed-batch IVT.

When the DNA encoding a new RNA product is obtained, the following steps are followed to calculate percent consumption:

(1) Perform a batch IVT reaction with known initial concentrations of CTP, GTP, UTP, and ATP, and measure the concentration of each nucleotide during the reaction. Ensure that all nucleotides remain >0 mM for all measured time points, otherwise discard the data collected at that time. For the data shown in FIGS. 1A-1B, all nucleotides had an initial concentration of 5 mM, and their concentrations were measured for up to 30 minutes.

(2) Use the measured concentrations and times collected to calculate the rate of CTP, GTP, UTP, and ATP consumption during the reaction. For multiple time points, this can be the slope of a linear fit of the data (FIG. 1A).

Figure 1B:
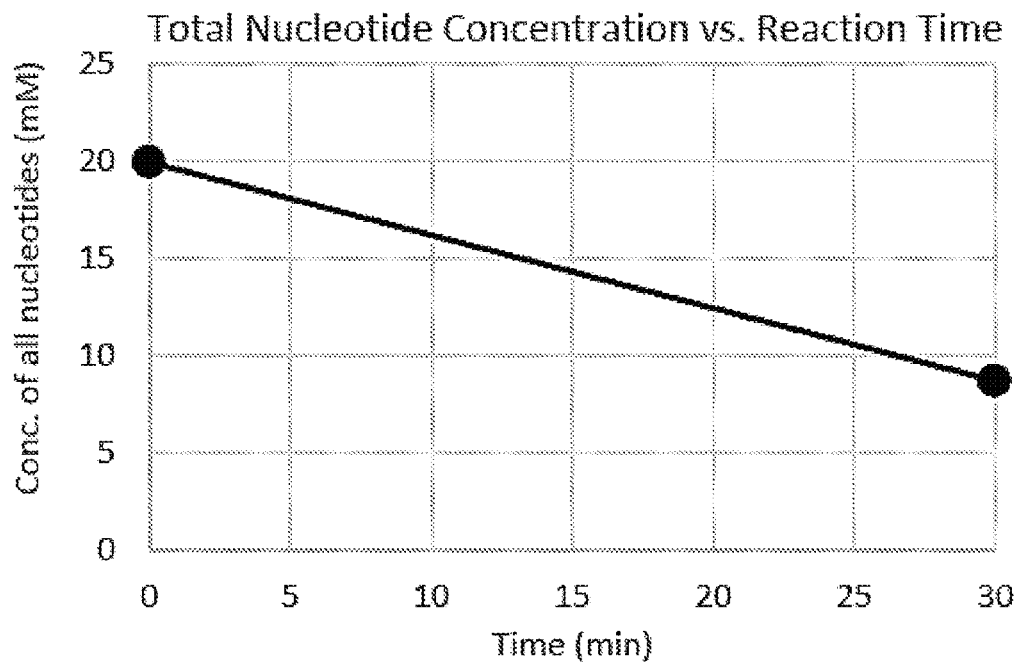

(3) Add the rates of CTP, GTP, UTP, and ATP to determine the total consumption rate for all nucleotides (FIG. 1B).

(4) Divide the rate of each individual nucleotide by the rate of all (total) nucleotides to determine a percent consumption value for CTP, GTP, UTP, and ATP.

The relevant values are provided in Table 1.

TABLE 1

Experimental Determination of Percent Consumption

| | Slope (mM/min) | Slope (mM/hr) | percent consumption | % Abundance in Sequence |
|---|---|---|---|---|
| CTP | −0.086 | −5.18 | 22.9% | 22.9% |
| GTP | −0.092 | −5.49 | 24.2% | 23.8% |
| UTP | −0.064 | −3.84 | 16.9% | 17.9% |
| ATP | −0.136 | −8.15 | 36.0% | 35.4% |
| Total | −0.378 | −22.67 | — | |

The percent consumption values can be used to formulate a reaction mixture for a batch IVT reaction, or the NTP master mixture and the feed stock mixture for a fed-batch IVT reaction. For example, to make sure all nucleotides are fully consumed at the same time in a batch reaction, the NTP master mix can contain molar ratios of NTPs equivalent to the percent consumption values. Alternatively, in the case of a fed-batch reaction, it may instead be preferable to formulate the NTP master mixture so that all nucleotides are equivalent concentrations when the sum of all nucleotides equals 10 mM, or some concentration >0 mM where the NTPs are maintained. Finally, it may be preferable to maintain a specific ratio of nucleotides throughout the reaction, to generate a desired product profile. Using the percent consumption values allows the operator to achieve any of these process requirements.

The empirically determined percent consumption values differ from the observed % abundance of each NTP in the desired RNA sequence. In addition, determining percent consumption does not require prior knowledge of the construct sequence.

Figure 2:
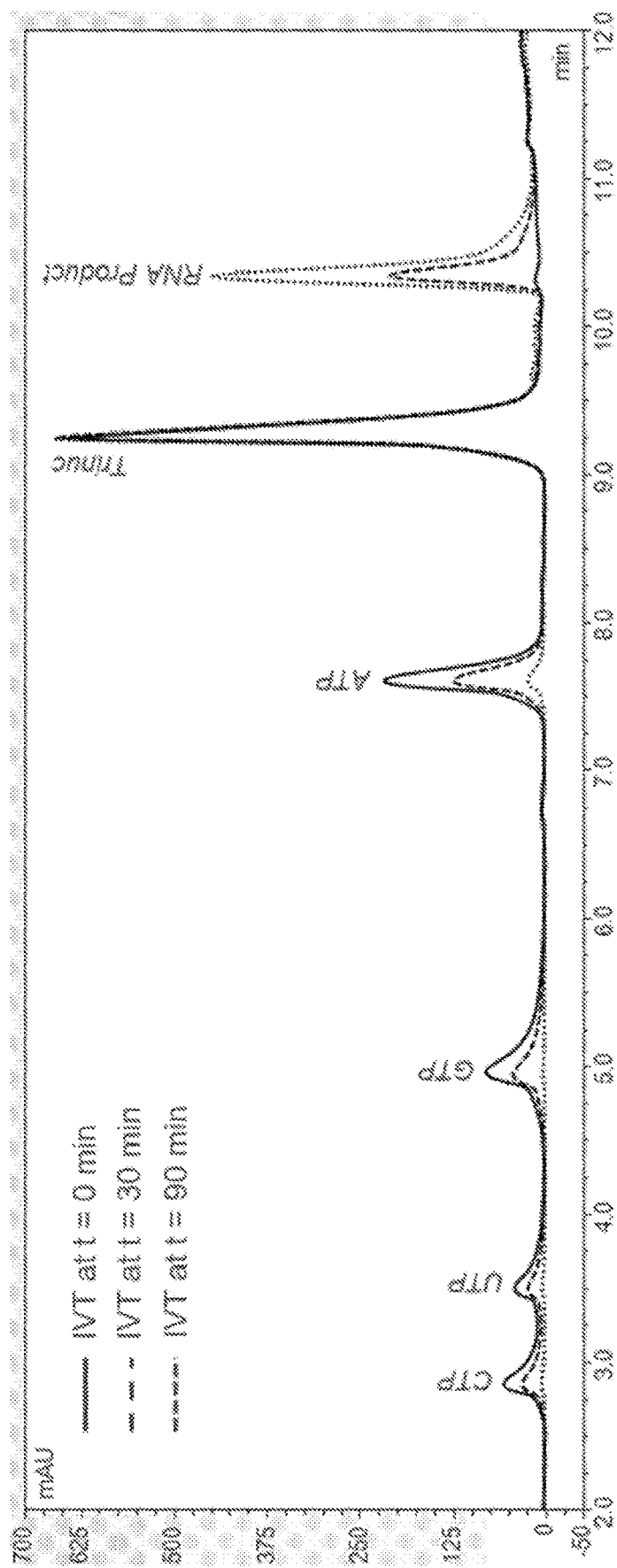
FIG. 2. Monitoring of NTP and cap analog concentrations. Using ultra performance liquid chromatography with UV light detector (UPLC-UV) set to 260 nm, the NTP and trinucleotide concentrations can be monitored over time. The method can also be used to calculate individual NTP concentrations or total NTP concentrations.

As shown in FIG. 2, Ultra-Performance Liquid Chromatography (UPLC®) may be used to monitor NTP and RNA cap analog concentration. This information can then be used to calculate individual NTP concentrations and/or total NTP concentrations. The following conditions are provided as an example:

Column: ACQUITY UPLC Oligonucleotide BEH C18 Column, 130 Å, 1.7 µm, 2.1 mm×150 mm (Part No. 186005516)

Column Temp.: 40° C.

Flow Rate: 0.4 mL/min

Mobile Phase A: 100 mM triethylammonium acetate (TEAA)

Mobile Phase B: 100 mM triethylammonium acetate (TEAA), 25% Acetonitrile

Exemplary IVT master mixture and feed stock mixture recipes are provided as follows in Table 2 and Table 3, based on the data provided in FIGS. 1A-1B:

TABLE 2

IVT Master Mixture

| Component | Concentration | Notes |
|---|---|---|
| Total nucleotides | 20 mM | Balanced to % consumption |
| Magnesium acetate | 30 mM | |
| Trinucleotide | Balance to highest purine (ATP or GTP) | Excess can be added to improve capping |
| RNA polymerase | 0.04 mg/mL | |
| DNA | 0.05 mg/mL | |
| Pyrophosphatase | 1 U/mL | |
| Dithiothreitol (DTT) | 5 mM | |
| Tris HCl, pH 8.0 | 40 mM | |

TABLE 3

Feed Stock Mixture

| Component | Concentration | Notes |
|---|---|---|
| Total nucleotides | 60 mM | Balanced to % consumption |
| Magnesium acetate | 60 mM | |
| RNA polymerase | 0.04 mg/mL | |
| Pyrophosphatase | 1 U/mL | |
| Dithiothreitol (DTT) | 5 mM | |
| Tris HCl, pH 8.0 | 40 mM | |

Example 2. Empirical Balancing NTPs by Consumption Rate

Figure 3A:
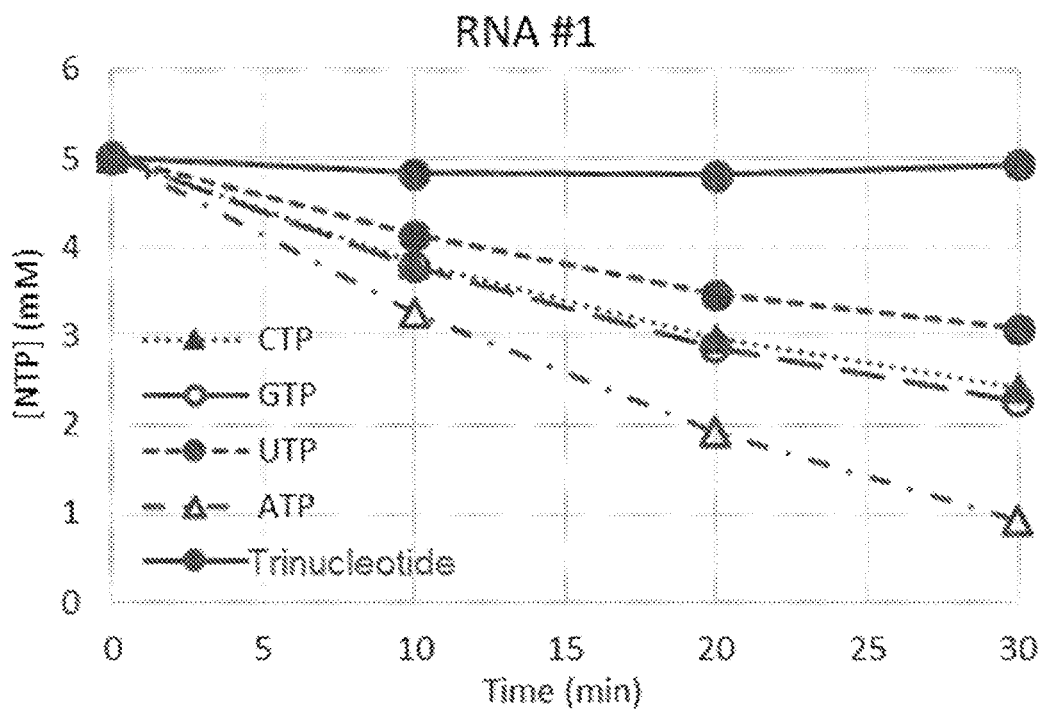
FIGS. 3A-3B. Examples of nucleotide empirical balancing for two sample constructs, RNA #1 (FIG. 3A) and RNA #2 (FIG. 3B). The concentrations of CTP, GTP, UTP, and ATP and the total nucleotide concentration were measured over time. The % consumption of each nucleotide was calculated by dividing the rate of the individual NTP consumption by the rate of the total NTP consumption.
Figure 3B:
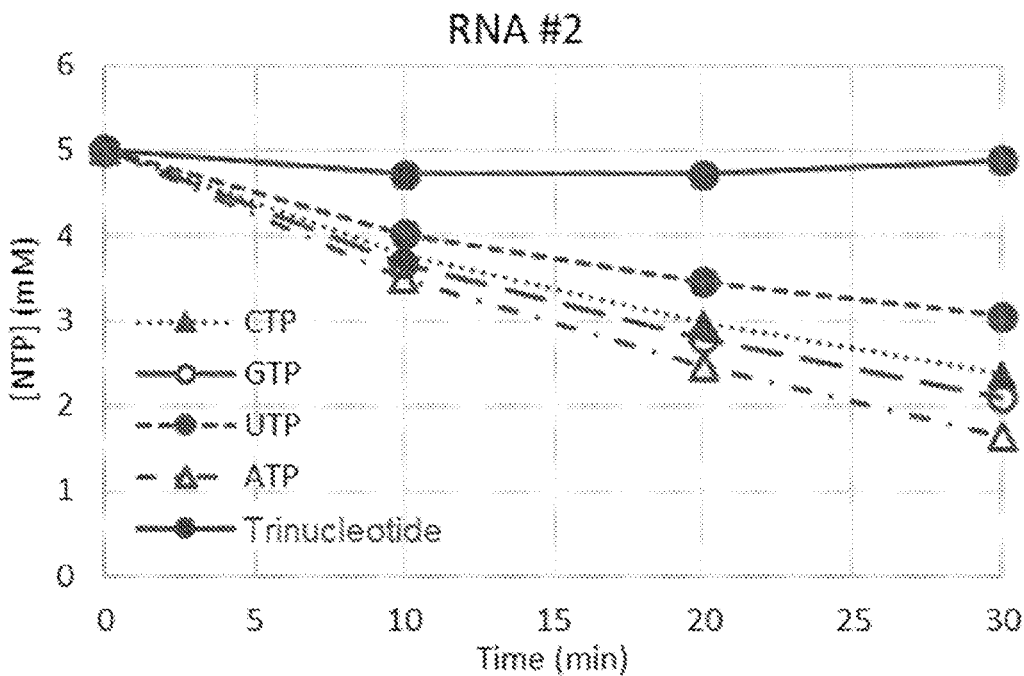

An initial nucleotide empirical balancing reaction was performed for DNA encoding two constructs, RNA #1 and RNA #2. Graphs showing the individual NTP concentrations for each DNA are depicted in FIGS. 3A and 3B. The following percent (%) consumption values were determined, as explained in Example 1:

TABLE 3

Experimental Determination of Percent Composition (RNA #1 and RNA #2)

|  | % CTP | % GTP | % UTP | % ATP |
|---|---|---|---|---|
| RNA #1 | 22.8% | 24.2% | 17.0% | 35.9% |
| RNA #2 | 24.3% | 26.9% | 17.8% | 31.1% |

Customizing NTP Ratios in Fed-Batch IVT Reaction

Figure 4A:
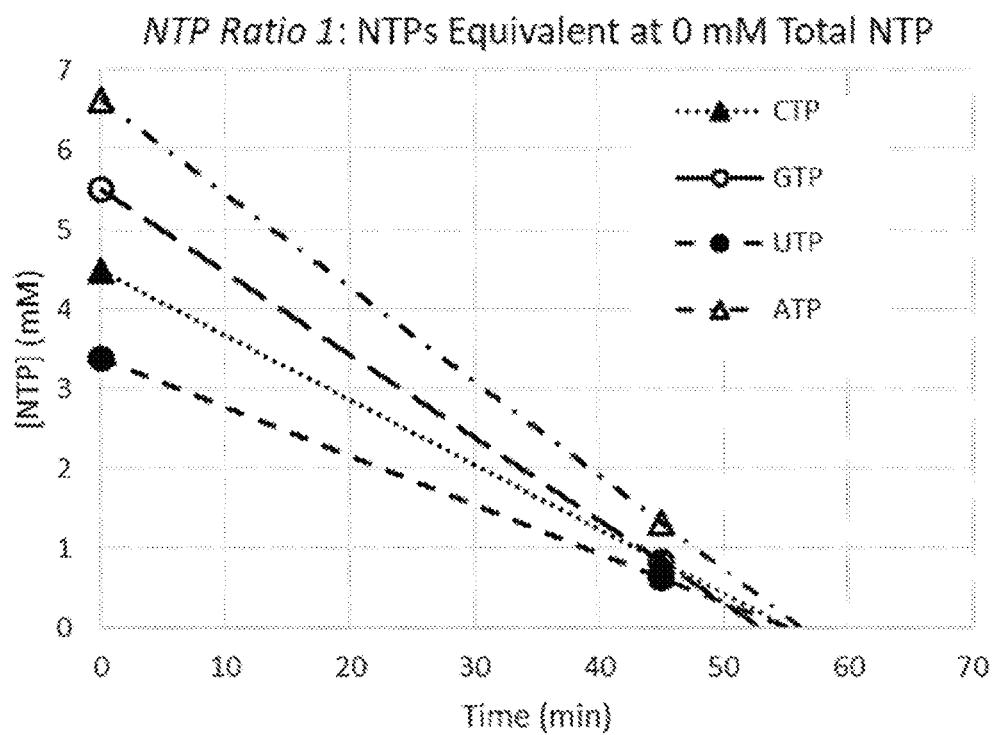
FIGS. 4A-4B. Examples of two NTP master mixtures generated from the % consumption values for RNA #1 to achieve different process requirements. The batch IVT in FIG. 4A shows all four nucleotide reagents reach 0 mM at approximately the same time, thus maximizing the utilization of reagents. The batch IVT reaction in FIG. 4B shows all four nucleotide reagents reach 2.5 mM at the same time, for a total [NTPs] at 10 mM. The latter scenario, among others, is useful in developing fed-batch IVT reactions that require specific ratios of NTPs during the reaction, either to generate a desired product profile or fully utilize a specific reagent.

The percent consumption values for CTP, GTP, UTP, and ATP can be used to control the NTP ratios in the initial IVT reaction mixture, during an ongoing reaction, or remaining after an IVT reaction is complete. In one example, a process to make RNA #1 may require complete utilization of all four NTP reagents by the end of the reaction. In this case, a batch IVT reaction for RNA #1 was conducted in which the relative nucleotide ratios were set equal to the empirical percent consumption values. The graph displayed in FIG. 4A shows the NTP concentrations during this reaction. All four nucleotides approach a concentration of 0 mM at the same time, maximizing the utilization of these components.

Figure 4B:
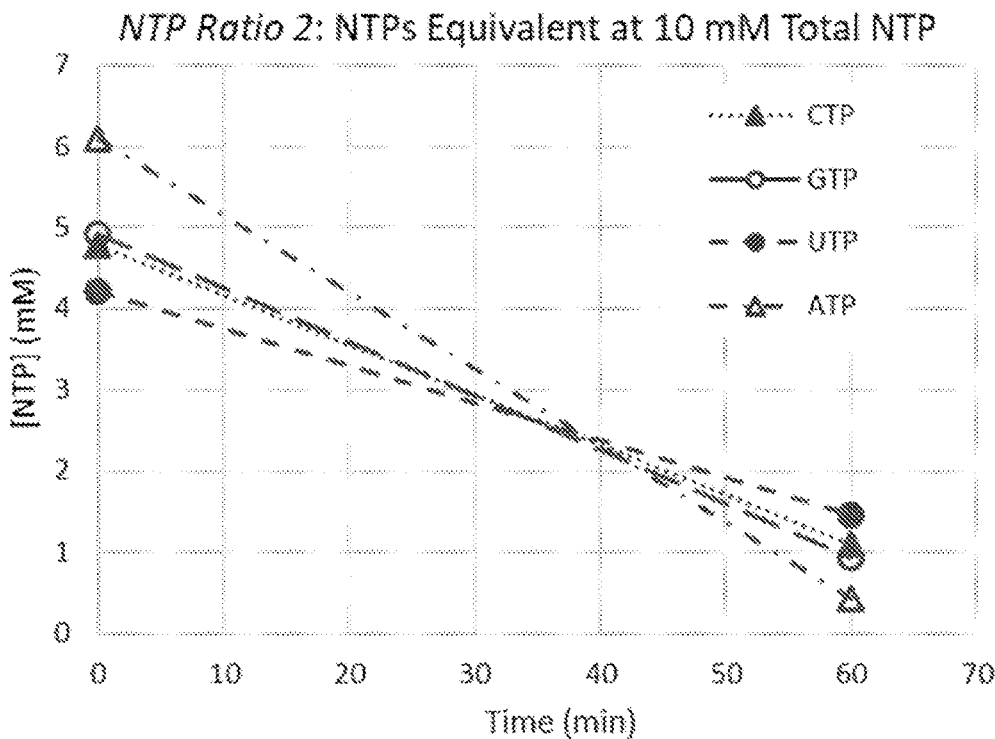

Other scenarios may require that the process maintain specific ratios of NTPs during fed-batch or batch operation, either to produce a specific product profile or ensure complete utilization of specific reagents. For example, the process may require [CTP], [GTP], [UTP], [ATP] to be equal in the range where the fed-batch IVT reaction is maintained, such as when total [NTP] equals 10 mM. In this case, the empirically-determined percent consumption values were used to calculate an adjusted composition of nucleotide master mixture to fulfill this process requirement (Table 4). The graph displayed in FIG. 4B shows a batch IVT reaction with DNA encoding RNA #1 that used the nucleotide master mixture specific for all NTPs to be equivalent at 10 mM total NTPs (Table 4). As shown in the figure, all four nucleotide reagents reached 2.5 mM, or a total NTP concentration equal to 10 mM, at the same time.

TABLE 4

NTP Master Mixtures for Customized Concentrations of NTPs during IVT Reaction

|  | % CTP | % GTP | % UTP | % ATP |
|---|---|---|---|---|
| All NTPs Equivalent at 0 mM Total NTPs | | | | |
| RNA #1 | 22.8% | 24.2% | 17.0% | 35.9% |
| RNA #2 | 24.3% | 26.9% | 17.8% | 31.1% |
| All NTPs Equivalent at 10 mM Total NTPs | | | | |
| RNA #1 | 23.9% | 24.6% | 21.0% | 30.5% |
| RNA #2 | 24.6% | 25.9% | 21.4% | 28.0% |

Trinucleotide (GAG) Capping Efficiency Test

Figure 22:
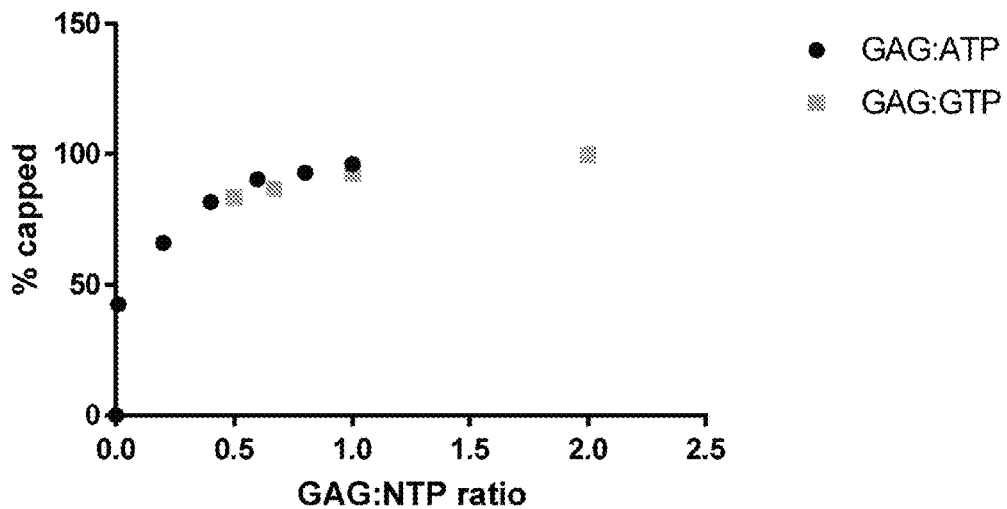
FIG. 22. Measured average A/GTP-to-trinucleotide ratio throughout the reaction for continuous fed-batch.

Test IVTs were performed to evaluate the impact of GAG:NTP ratio, where NTP is either ATP or GTP. In this set of experiments (FIG. 22), GAG:ATP or GAG:GTP ratio greater than 0.6 generated mRNA with greater than 90% cap. Using an RNA cap analog with greater than 0.6 GAG:ATP or GAG:GTP ratio produces mRNA with optimal cap content. Thus, fed-batch IVTs are designed to maintain a ratio of GAG:ATP or GAG:GTP greater than 0.6.

Example 3. Setting the Feeding Schedule

An important aspect of the fed-batch IVT process is determining the appropriate timing of additions for a given feed stock and IVT reaction mixture, to maintain reagents in the desired range. To do this, a scouting fed-batch IVT reaction was conducted with a DNA of interest using the empirically-balanced nucleotide master mixture (from Examples 1 and 2) and an initial feeding schedule based on the predicted NTP consumption rate for that DNA. This initial feeding schedule would be revised following the results and analysis of this scouting fed-batch IVT reaction, as described below.

Figure 5A:
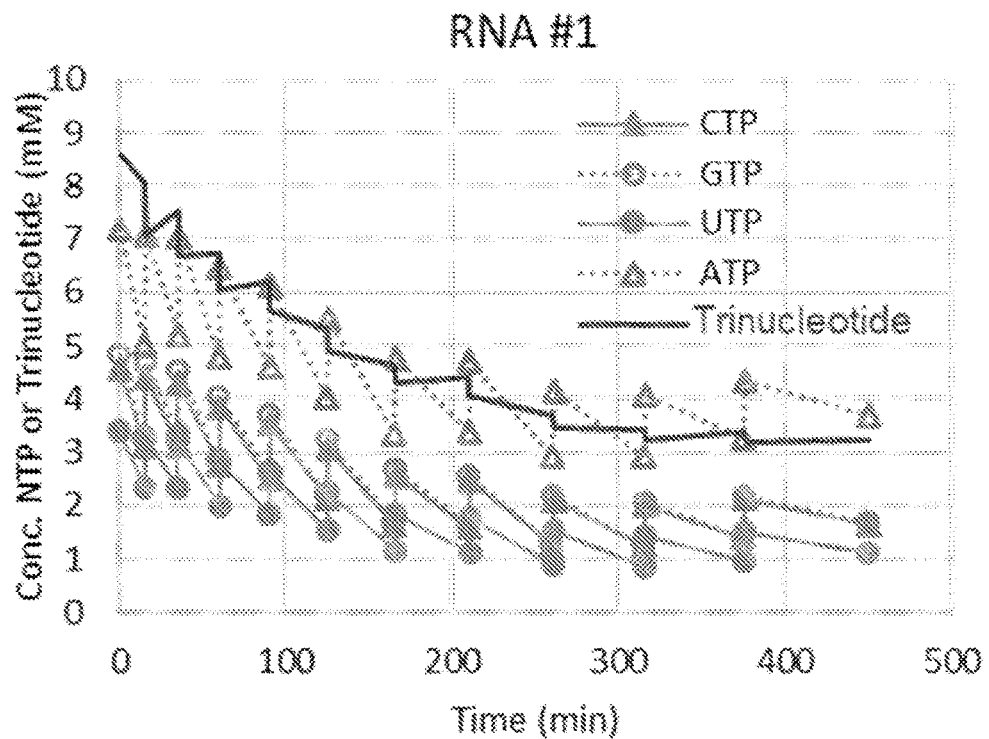
FIGS. 5A-5B and 6A-6B. Determination of a fed-batch feeding schedule. A scouting fed-batch IVT reaction was run using the DNA of interest (RNA #1 and RNA #2 shown in FIGS. 5A and 5B, respectively), empirically-balanced nucleotide master mix, and an initial feeding schedule based on the predicted NTP consumption rate. Throughout the experiment, the total concentration of nucleotides was measured at time points immediately before and immediately after feeding the IVT reaction (FIG. 5A-5B). The concentrations and times were used to calculate the consumption rate between each feed of the reactions generating either RNA #1 or RNA #2 (FIG. 6A-6B).
Figure 5B:
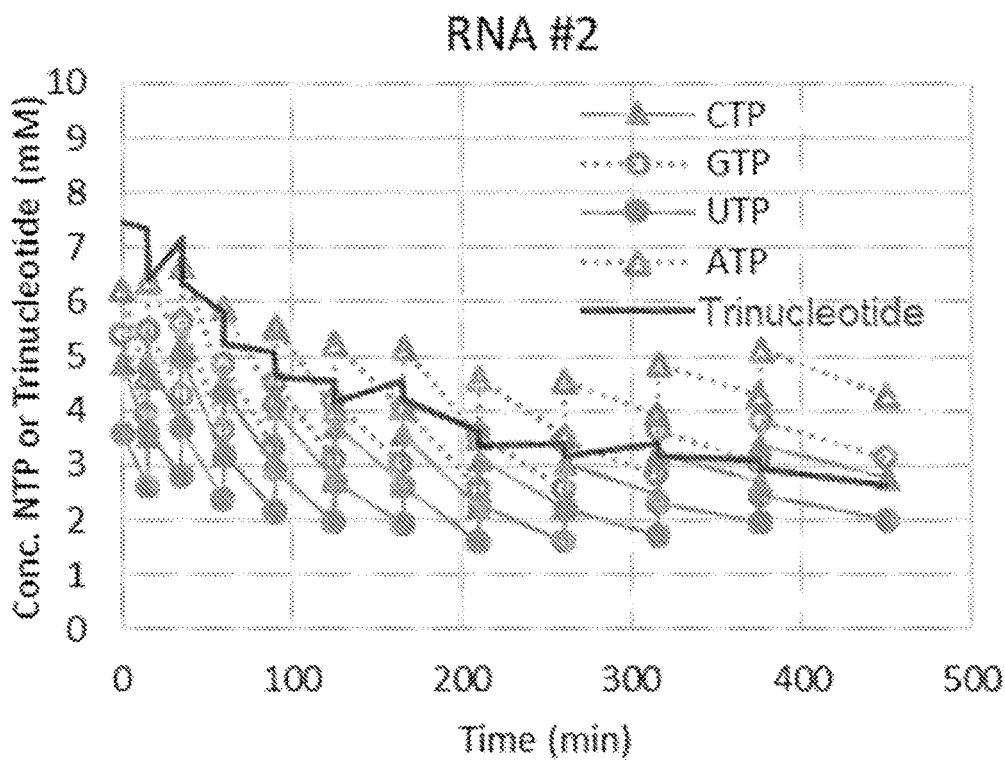
Figure 6A:
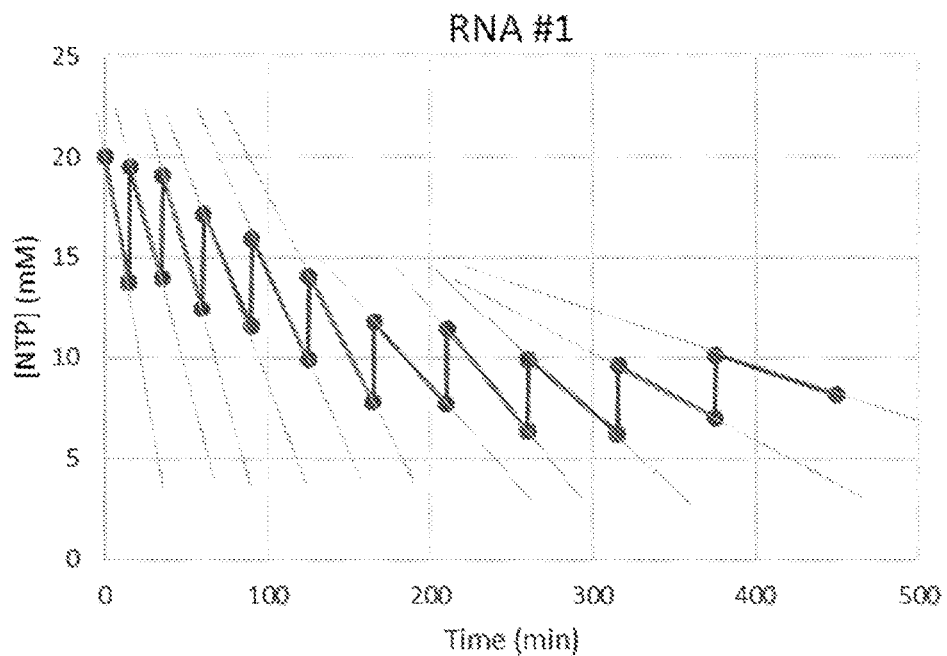
Figure 6B:
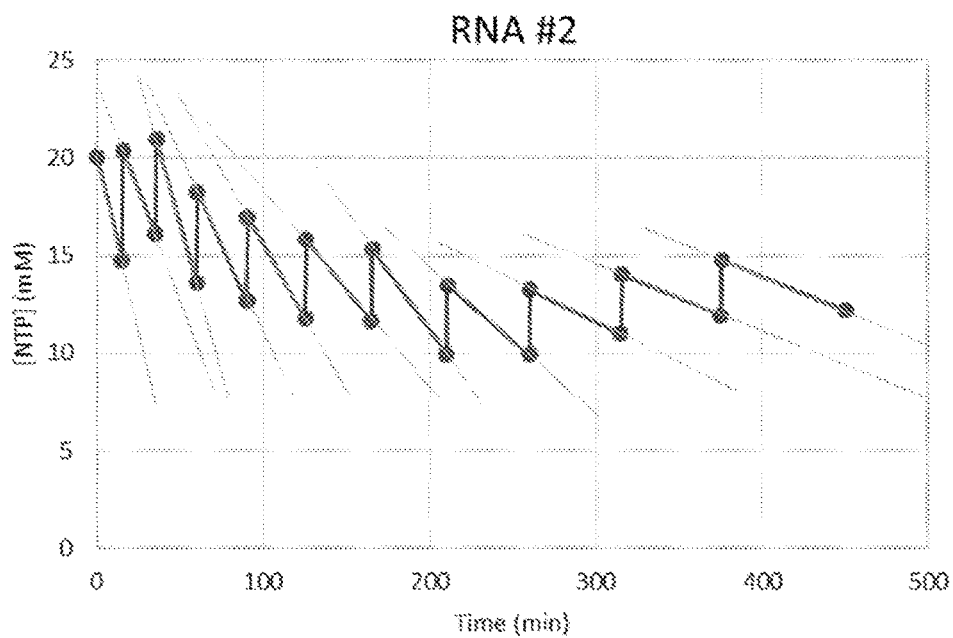
Figure 7A:
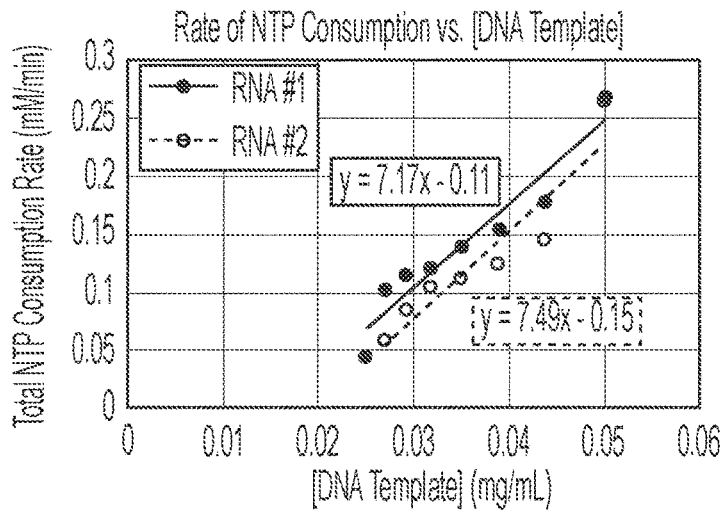
FIGS. 7A-7C. For the scouting fed-batch IVT of RNA #1, the nucleotide consumption rate was plotted against either [DNA] (FIG. 7A), [mRNA] (FIG. 7B), or reaction time (FIG. 7C). Fitting with a curve (linear fit shown) provides an empirical model of the nucleotide consumption rates throughout fed-batch IVT reaction run.
Figure 7B:
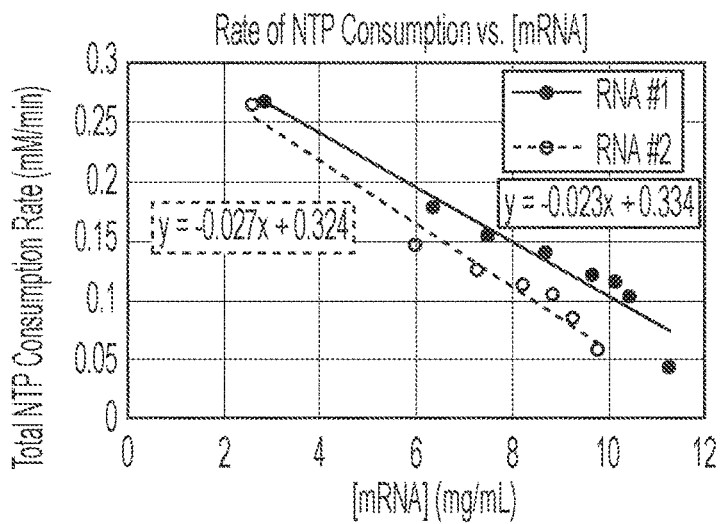
Figure 7C:
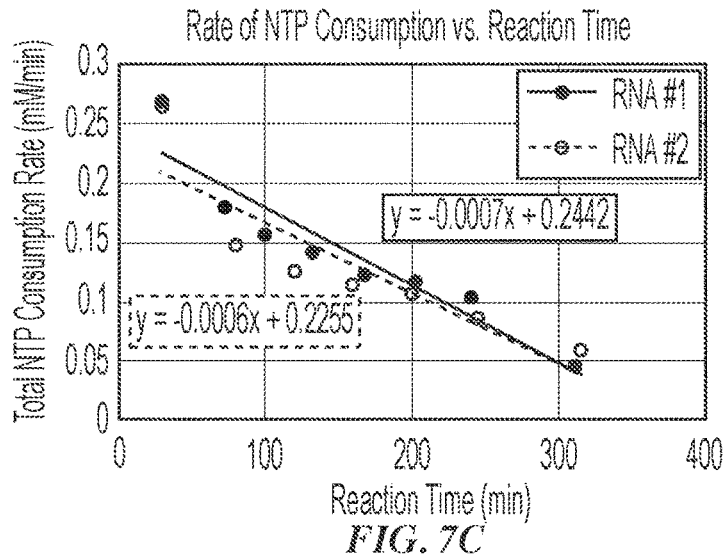
Figure 8:
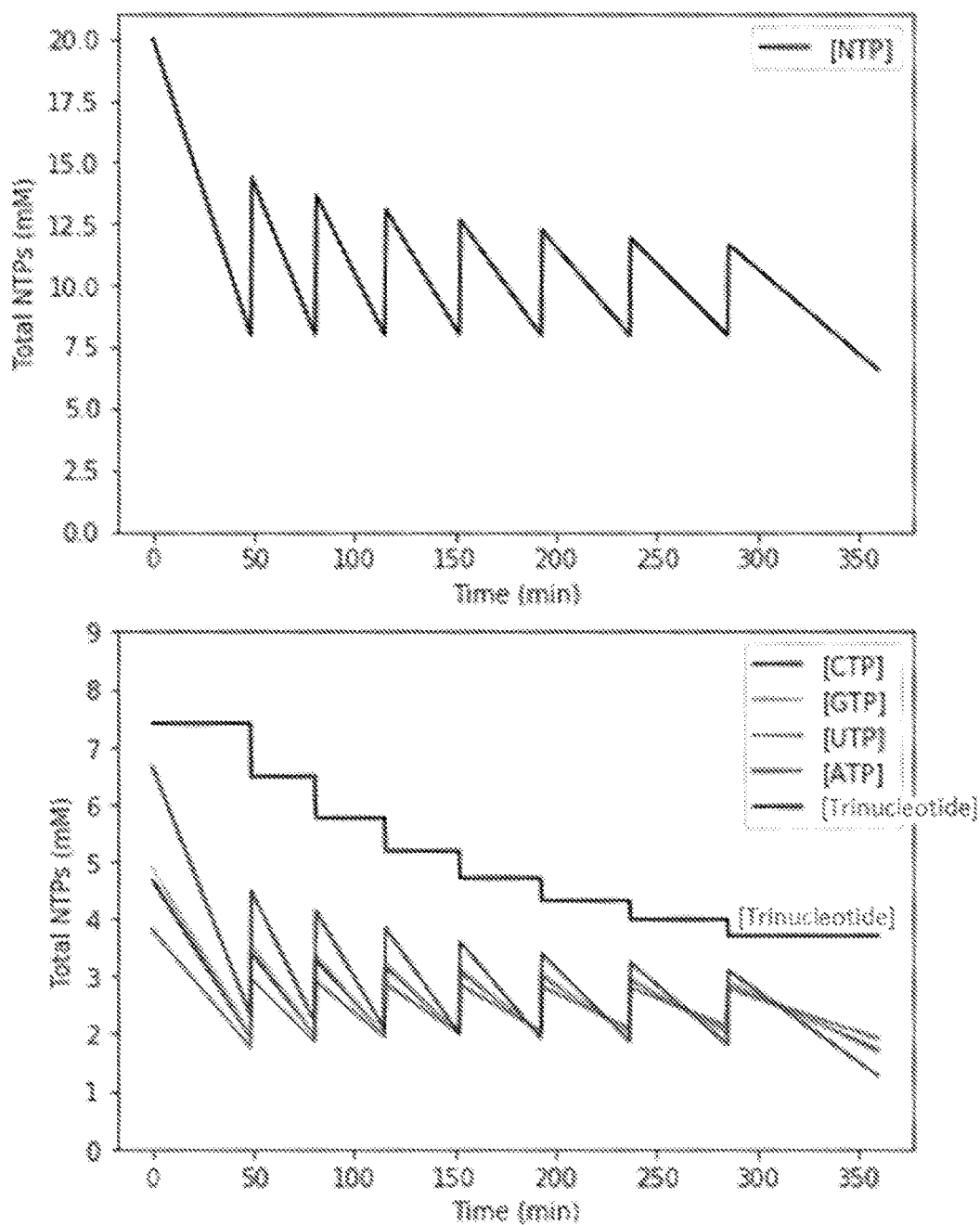
FIGS. 8-10. IVT reaction modeling for RNA #1. Additional construct-specific parameters, including the ratios of CTP, GTP, UTP, and ATP in the master mix, the consumption rate of CTP, GTP, UTP, and ATP, the initial concentration of the cap analog, the initial % tailed RNA product, and the rate of the % tailed RNA product over time, were used to generate reaction models for RNA #1 to estimate the concentration of NTP or trinucleotide reactants (FIG. 8), formation of RNA products (FIG. 9), and % tailed RNA product (FIG. 10).

Throughout the scouting fed-batch IVT reaction, the total concentration of nucleotides was determined immediately before and after adding feed stock mixture to the IVT reaction for each feed (FIG. 5A-B). These total concentration measurements and feed times were then used to calculate a unique total nucleotide consumption rate between each feed of the reaction (FIG. 6A-B). As displayed in FIG. 7A-C, the nucleotide consumption rates were plotted against either [DNA], [mRNA], or reaction time (in this example, [DNA] was used). Fitting this plot with a curve (linear model shown) provided an empirical model of the nucleotide consumption rate throughout the fed-batch IVT reaction. By incorporating these NTP consumption model parameters with a few additional parameters (below), a complete feed schedule was determined for the given feed stock and IVT reaction mixture used for RNA #1 (see Table 5).

Initial [DNA]
Minimum nucleotide concentration
Initial nucleotide concentration
Feed-stock nucleotide concentration
First feed volume fraction (volume of feed/volume of initial reaction)
Either total reaction time or total nucleotides added

TABLE 5

Calculated Feed-Stock Addition Times for RNA#1

| Feed Number | Elapsed Reaction Time (minutes) |
|---|---|
| 1 | 48.5 |
| 2 | 80.5 |
| 3 | 115.0 |
| 4 | 152.0 |
| 5 | 192.5 |
| 6 | 236.5 |
| 7 | 285.0 |

Example 4. Reaction Modeling

Figure 9:
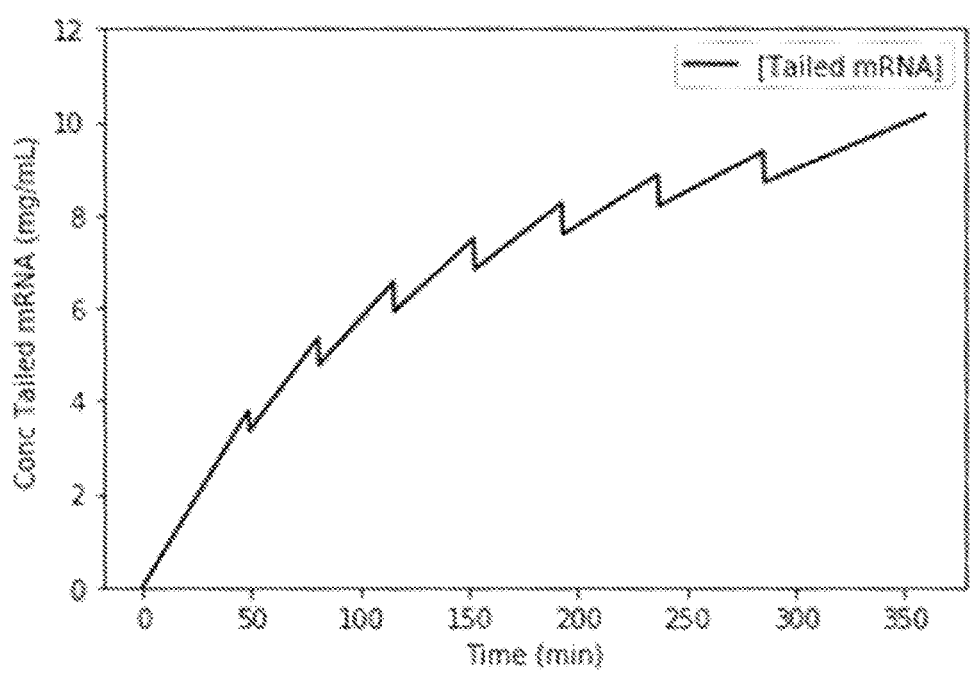
Figure 9:
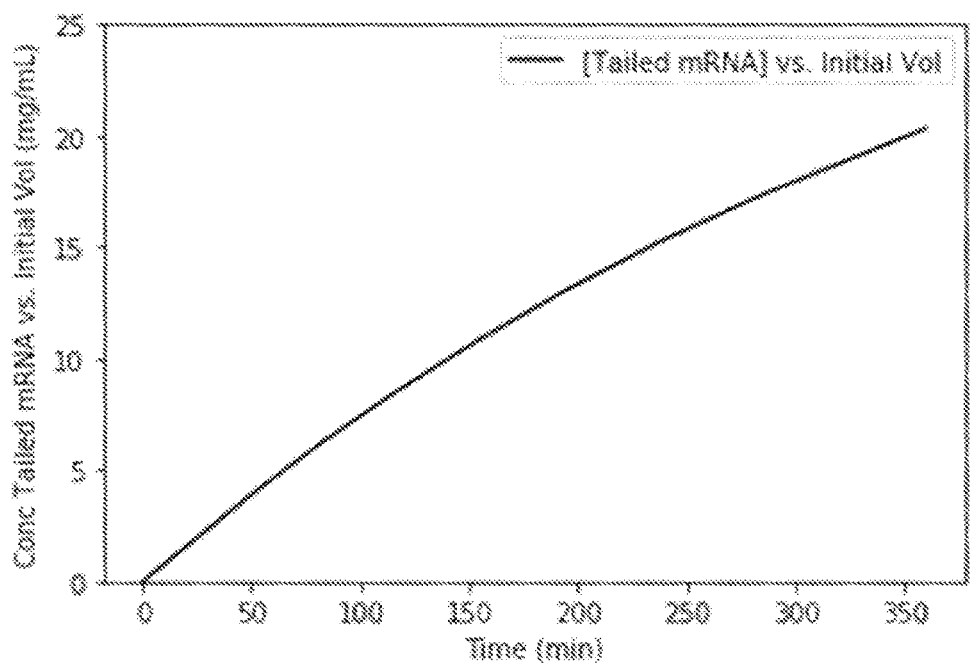
Figure 10:
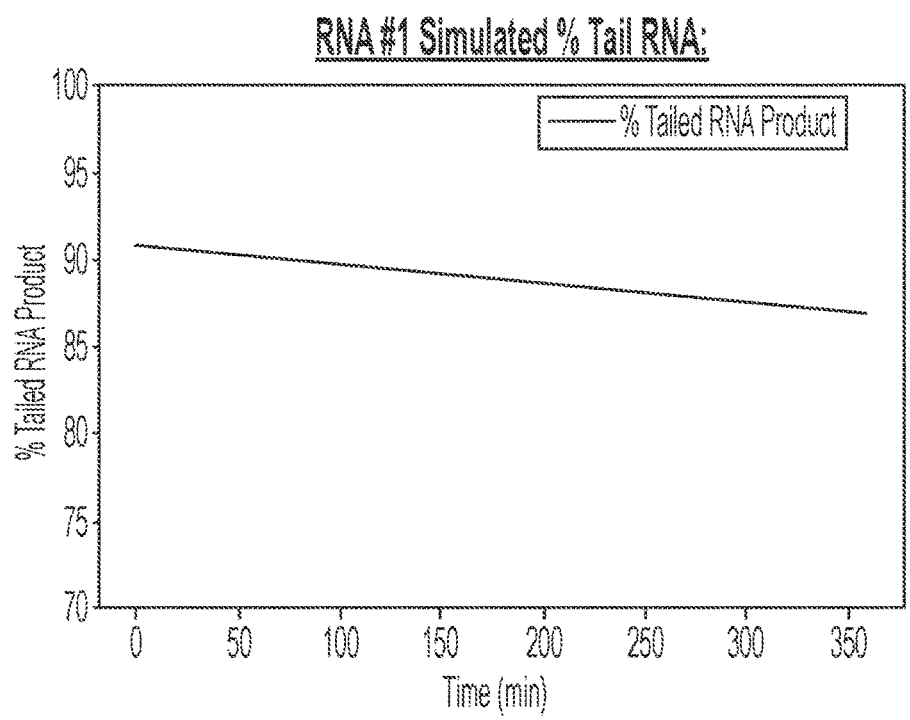
Figure 11A:
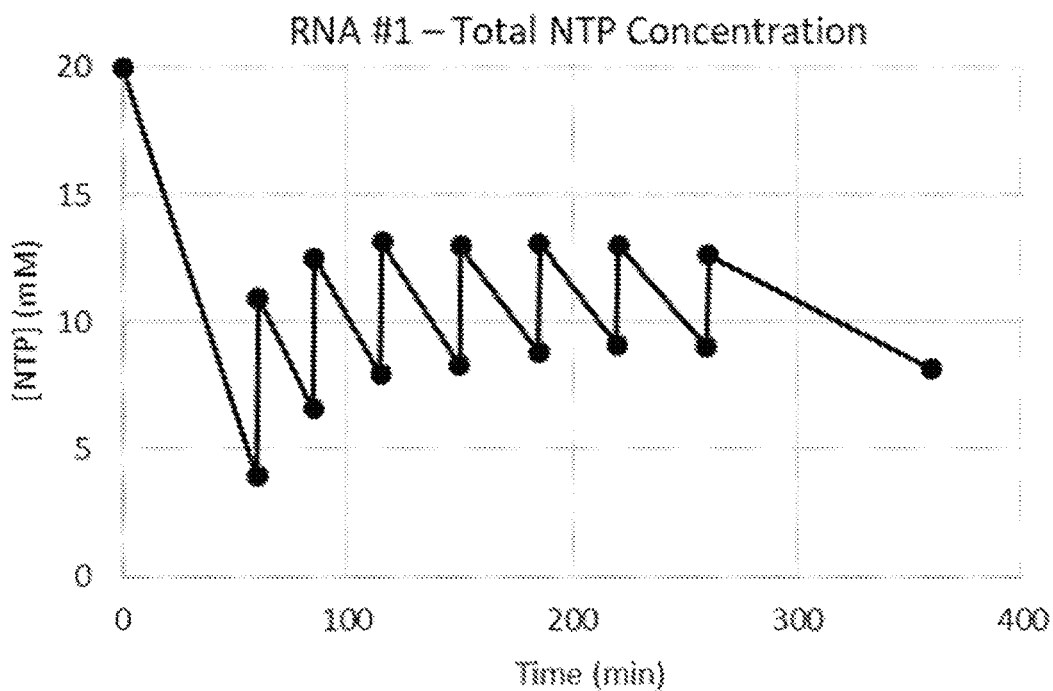
FIGS. 11A-11B and 12A-12B. Measured [NTP] for the defined fed-batch IVT reactions of RNA #1 and RNA #2.
Figure 11B:
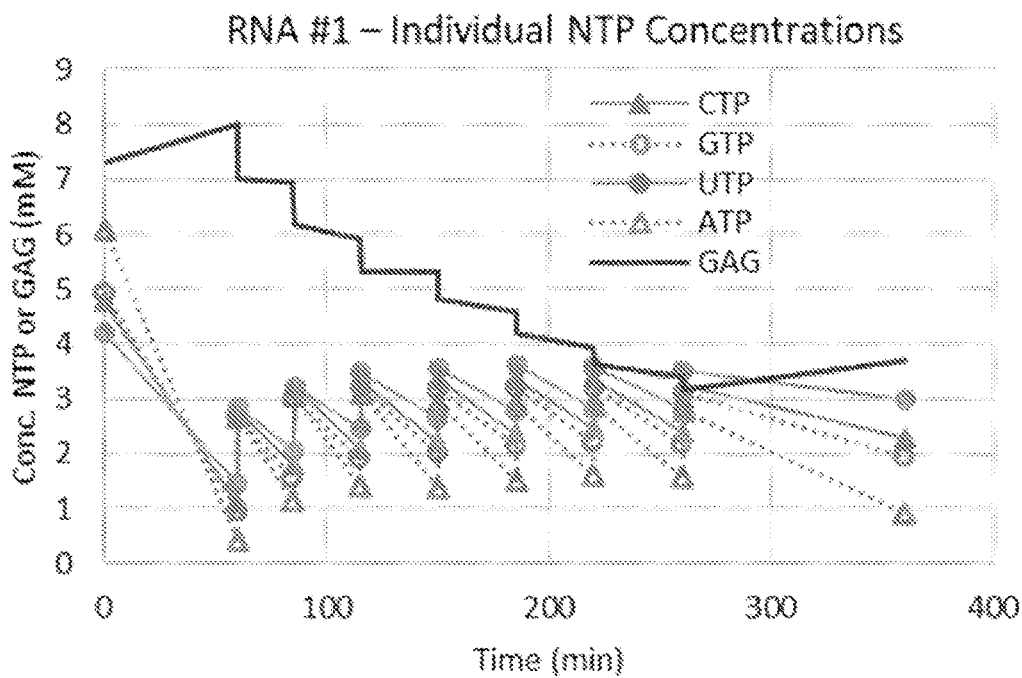
Figure 12A:
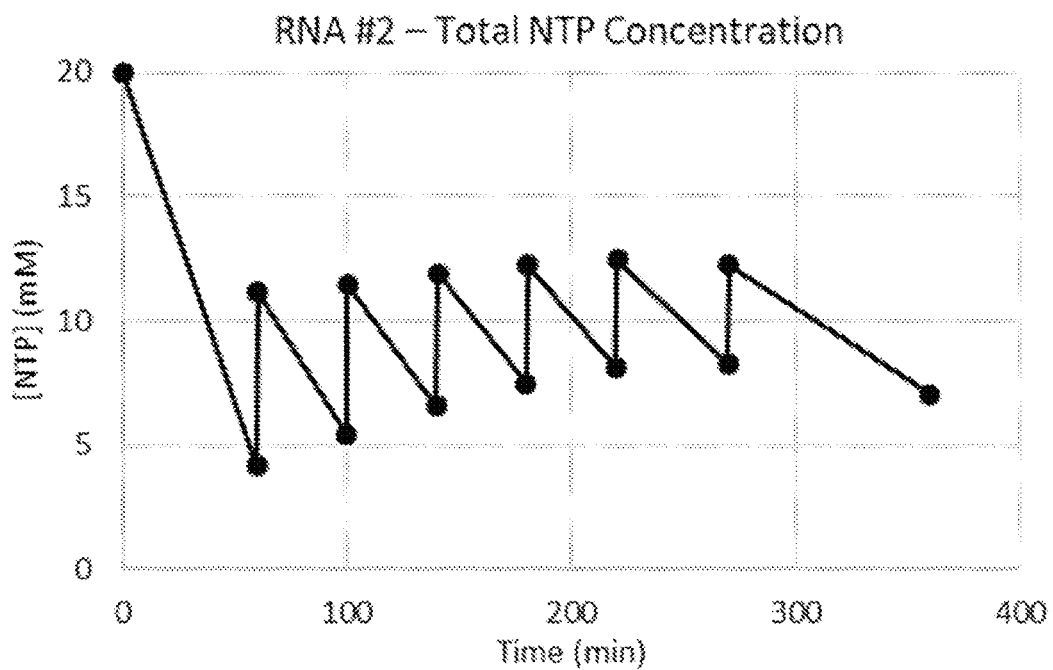
Figure 12B:
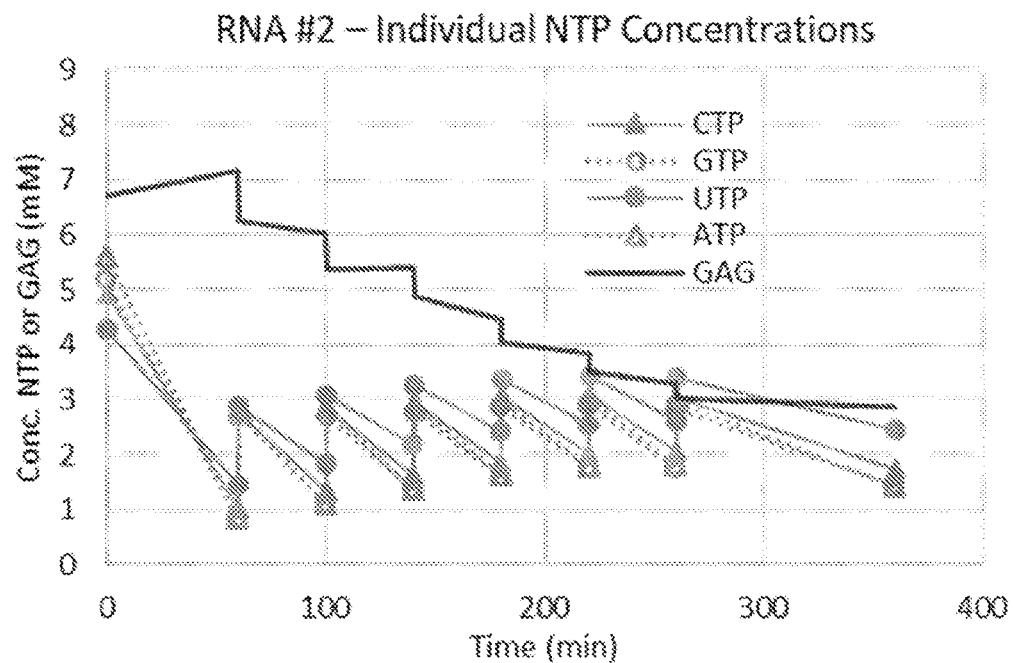

After completing the nucleotide empirical balancing experiments (Examples 1 and 2) and setting the feed schedule (Example 3) for a given DNA, feed-stock, and IVT reaction mixture, a fed-batch IVT reaction model was created by combining several empirically-determined reaction parameters with user-selected parameters for the fed-batch IVT reaction:

Empirically-Determined Reaction Parameters
   % Consumption of CTP, GTP, UTP, and ATP (from Example 1)
   NTP consumption curve-fit parameters (from Example 3)
   Initial % Tailed product (observed in Example 3)
   Rate of % Tailed product vs. time (observed in Example 3)
User-Selected Reaction Parameters
   Ratios of CTP, GTP, UTP, and ATP in the nucleotide master mix for initial IVT reaction
   Ratios of CTP, GTP, UTP, and ATP in the nucleotide master mix for feed-stock Initial [DNA] or reaction volume (if used for NTP consumption curve-fit)
Initial concentration of Trinucleotide
Minimum nucleotide concentration
Initial nucleotide concentration
Feed-stock nucleotide concentration
First feed volume fraction (volume of feed/initial reaction volume)
Either total reaction time or total nucleotides added As shown in FIGS. 9-11, the reaction model was capable of estimating concentration of total and individual nucleotides (FIG. 9), yield of RNA products (FIG. 10), % tailed RNA (FIG. 11). In addition, the model provided guidance on expected % capping in the RNA product (by comparing the [purines] to [trinucleotide]) and optimal reaction time for any DNA.

Example 5. Fed-Batch IVT Process Testing for RNA #1 and RNA #2

Figure 13A:
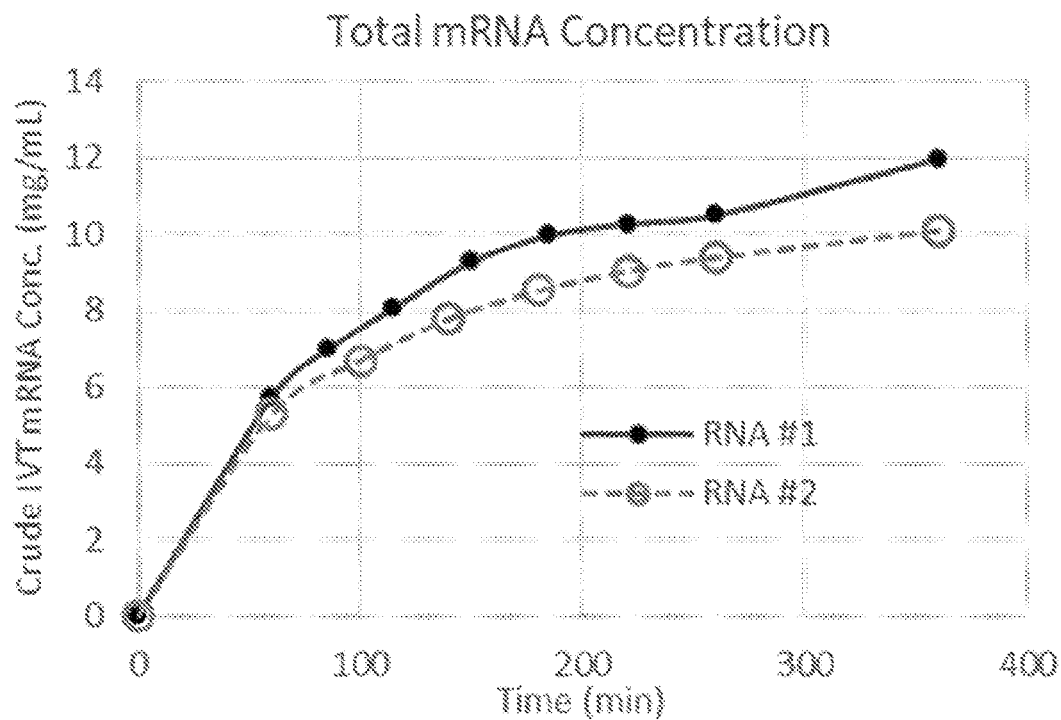
FIGS. 13A-13B and 14A-14B. Measured RNA product yield for the defined fed-batch IVT reactions of RNA #1 and RNA #2.
Figure 13B:
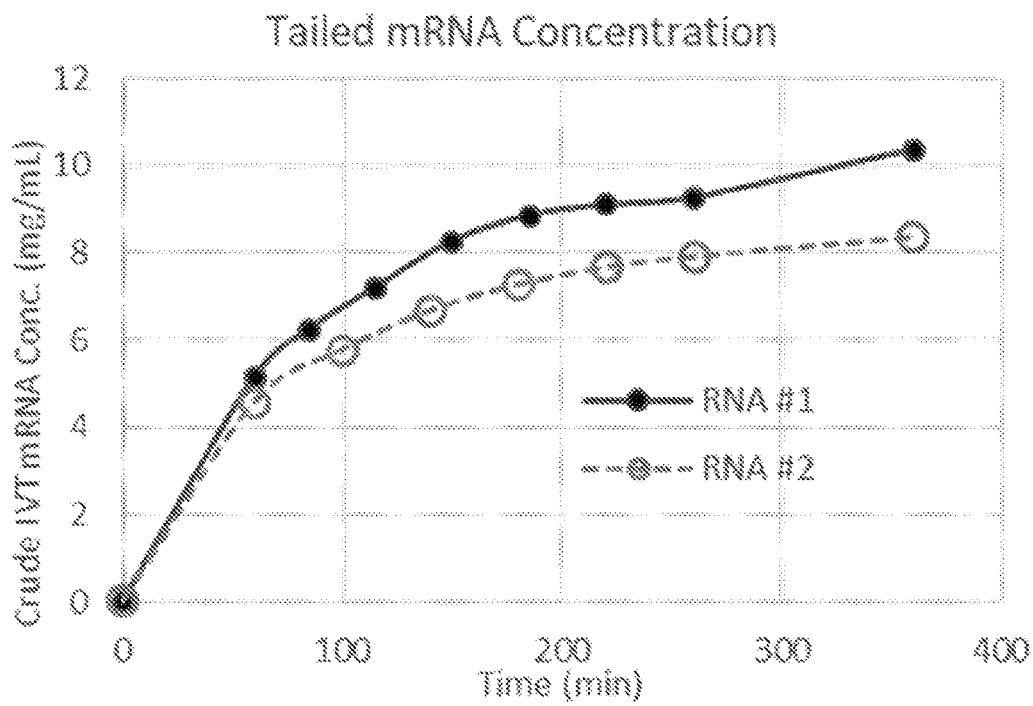
Figure 14A:
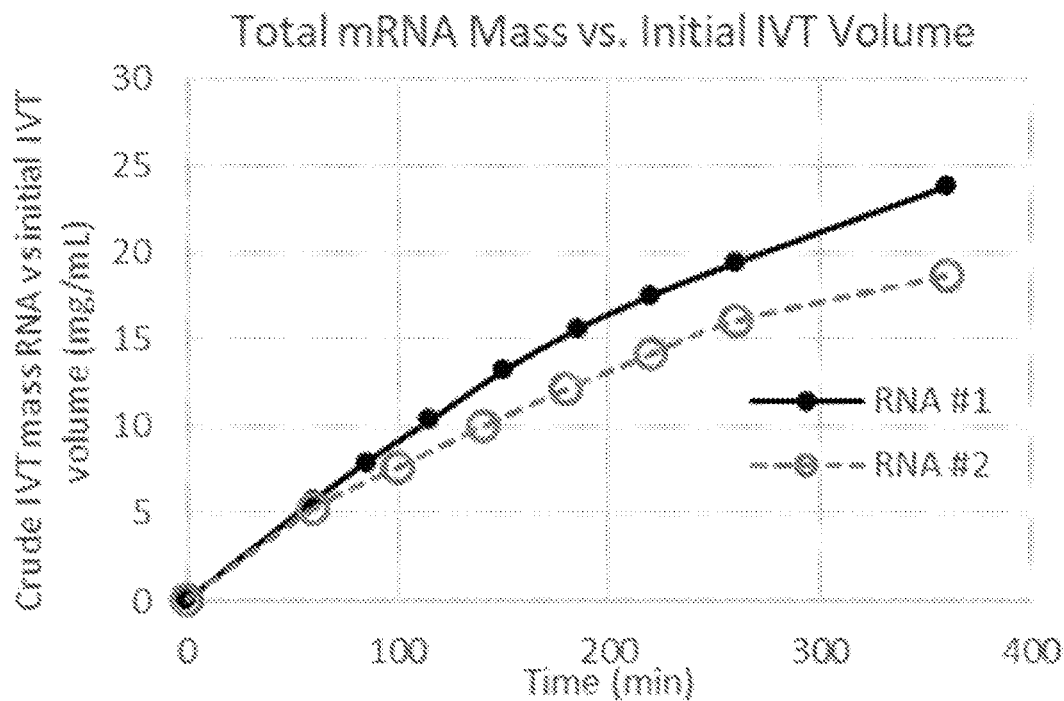
Figure 14B:
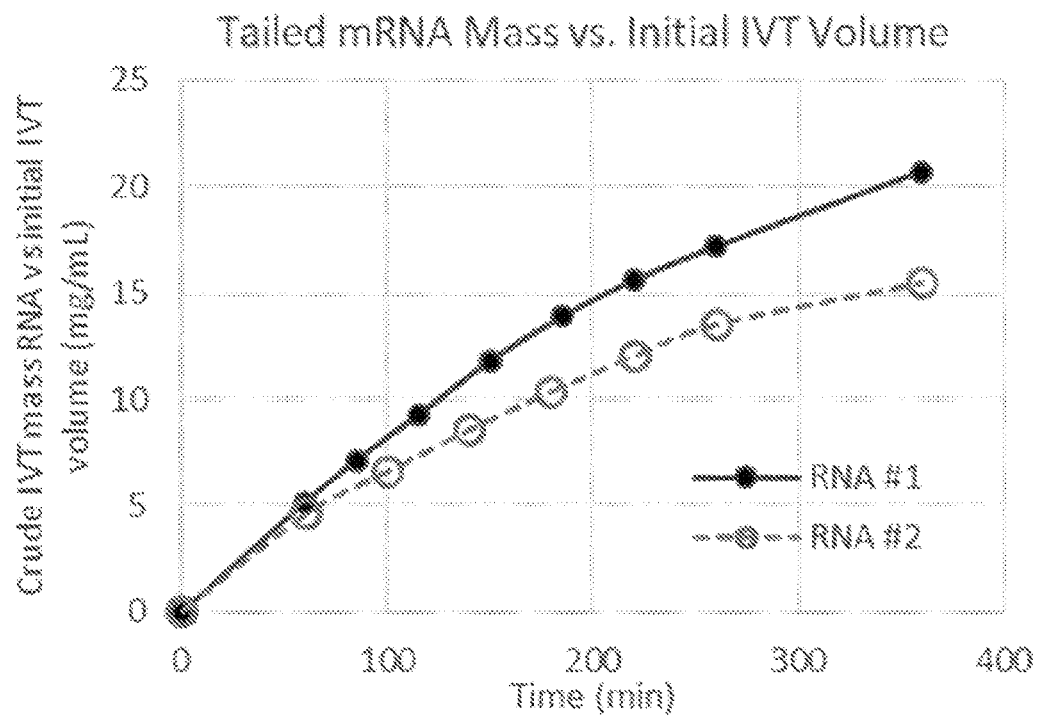
Figure 15:
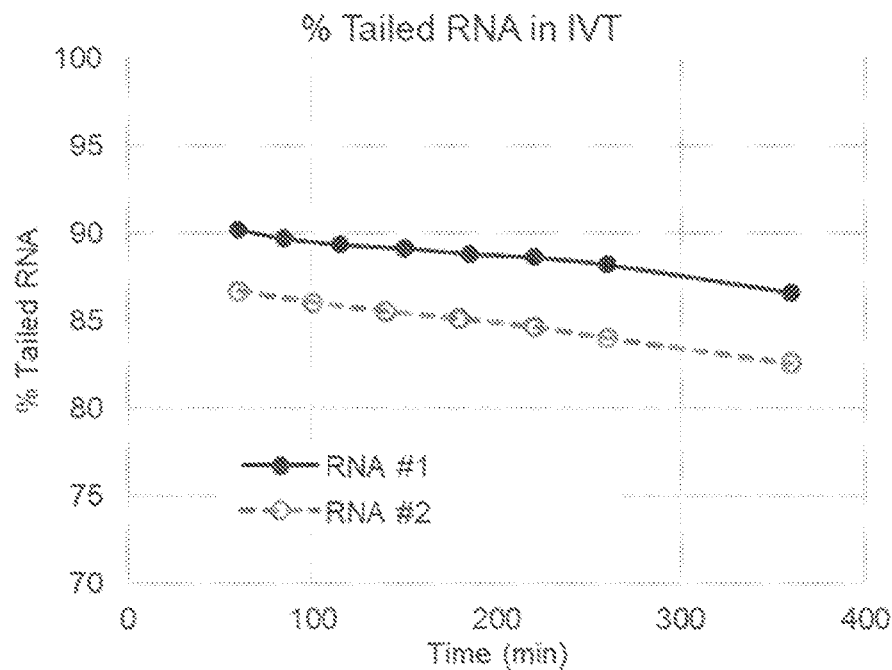
FIG. 15. Measured % tail RNA for the defined fed-batch IVT reactions of RNA #1 and RNA #2.
Figure 16A:
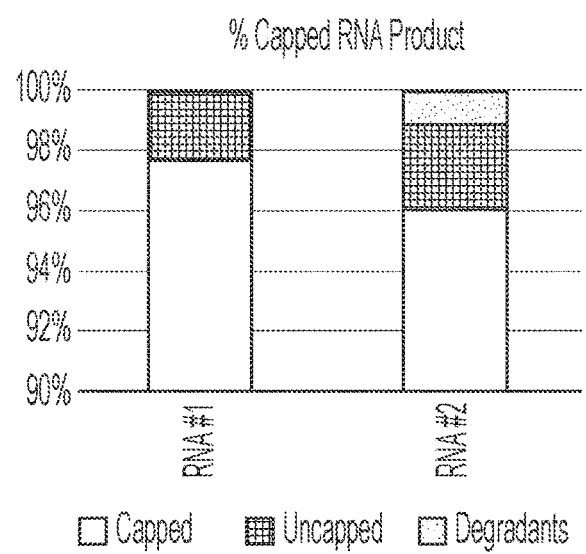
FIGS. 16A-B. The graph in FIG. 16A shows measured % capped RNA product for RNA #1 and RNA #2.
Figure 16B:
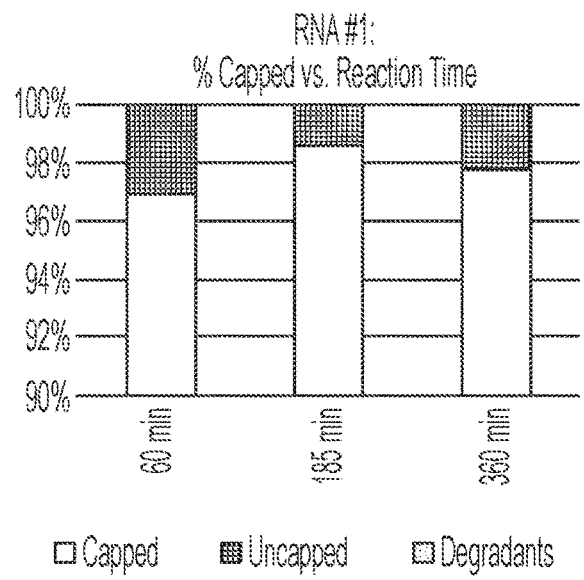

Empirically-balanced fed-batch IVT reactions were conducted for RNA #1 and RNA #2. Feeding schedules were set for both RNA #1 and RNA #2 based on a rate analysis (FIGS. 6A-B and 7A-C). The following initial IVT conditions were used for each construct:

Initial IVT Reaction Recipe:
  40 mM Tris HCl, pH 8.0
  20 mM total nucleotides (empirically balanced to 10 mM NTPs)
  30 mM magnesium acetate
  RNA cap analog (trinucleotide) equal to 1.2*[ATP]
  0.04 mg/mL RNA polymerase
  0.02% Triton X-100 (w/v)
  0.05 mg/mL Plasmid
  5 mM DTT
  1 mM Spermidine
  1 U/mL PPiase
Experiment Details:
  Temperature: 37° C.
  Starting Reaction Volume: 500 μL
  End-over-end mixing
Feed-Stock Recipe:
  40 mM Tris HCl, pH 8.0
  60 mM total nucleotides (empirical balance to 10 mM NTP)
  60 mM magnesium acetate
  0.04 mg/mL RNA polymerase
  0.02% Triton X-100
  5 mM DTT
  1 mM Spermidine
  1 U/mL PPiase
Feeding Schedule:
  Constant feed volume: 71.4 μL
  Feed times:
    RNA #1: 60, 85, 115, 150, 185, 220, 260 min (7 feeds)
    RNA #2: 60, 100, 140, 180, 220, 270 min (6 feeds)
  Total reaction time: 360 min (6 hours)
  Final IVT reaction volume:
    RNA #1 (7 feeds): 1000 μL
    RNA #2 (6 feeds): 928 μL
Analytical Outputs:
  RNA product yield
  Ultra-Performance Liquid Chromatography to monitor NTP and RNA cap analog concentrations
  % Tailed RNA
  % Capped RNA As shown in FIGS. 11-16, The nucleotide concentration, yield, and product quality were evaluated throughout the fed-batch IVT reactions for RNA #1 and RNA #2. FIG. 11A-B and FIG. 12A-B show the measured total [NTPs] and individual [NTPs] during the fed-batch IVT reaction for RNA #1 and RNA #2, respectively. FIGS. 13A and 13B show the measured concentration of total RNA and tailed RNA, respectively, for RNA #1 and RNA #2. FIG. 14A-B show the measured mass of total RNA and tailed RNA versus initial IVT reaction volume for RNA #1 and RNA #2. FIG. 15 shows % tailed RNA product for RNA #1 and RNA #2. FIG. 16A shows % capped mRNA product for RNA #1 and RNA #2, and FIG. 16B shows % capped RNA product over time for RNA #1. The experimental results can be compared to the IVT model outputs using the same parameters to verify the results of the reaction or to improve to the model. The construct-specific parameters can also be recorded and used for developing processes for future constructs.

Example 6. Continuous Fed-Batch with Two Flow Rates for RNA #3

In Examples 3, 4, and 5, each fed-batch IVT reaction was done using bolus feeding, in which the feed-stock mixture was added in constant-volume bolus additions at specified times during the reaction. This process resulted in variations in nucleotide concentration during the reaction with each feed (FIGS. 11A-B and 12A-B). To minimize these variations, and to reduce the need for additional manufacturing controls required for distinct bolus feeds, the feeding schedule was converted to a continuous feed format.

An example of the continuous fed-batch IVT process is shown in FIGS. 17-22, in which a bolus fed-batch reaction is compared to a continuous fed-batch reaction for DNA encoding RNA #3. Tables 6 and 7 show the process parameters for bolus and continuous feed IVT reaction modes used to test RNA #3. The bolus feed version of the process required 18 process parameters and where the initial reaction volume was 1 L and the volume of each bolus feed was 14.28 mL. See Table 6. In contrast, the continuous feed mode required 5 process parameters. See Table 7. The continuous feed schedule contained 5 feed parameters: Start time, flow rate 1, switch time from flow rate 1 to flow rate 2, flow rate 2, and a stop time (Table 7). The two flow rates were used to accommodate any variations in the rate of nucleotide consumption that occurred during the IVT reaction

TABLE 6

Process Parameters for Bolus Feed Schedule for RNA#3
Initial Reaction Volume*: 1 L
Volume of each feed 14.28 mL

| Feed Number | Feed Time (Minutes) |
| --- | --- |
| 1 | 27.0 |
| 2 | 45.0 |
| 3 | 65.0 |
| 4 | 88.0 |
| 5 | 114.0 |
| 6 | 144.0 |
| 7 | 180.0 |
| 8 | 226.0 |
| 9 | 288.0 |
| Stop Reaction | 480.0 |

*All volumes normalized to 1 L reaction

TABLE 7

Process Parameters for Continuous Feed Schedule for RNA#3
Initial Reaction Volume*: 1 L
Stop IVT Reaction: 365.0 min

| Action | Time (Minutes) | Flow rate (mL/min) | Flow rate (mL/min per mL initial volume) |
|---|---|---|---|
| Start Feed | 30 | 5.76 | 0.0058 mL/min per mL initial volume |
| Switch Feed | 150 | 4.00 | 0.0040 mL/min per mL initial volume |
| Stop Feed | 301 | | |

*All volumes normalized to 1 L reaction

Figure 17A:
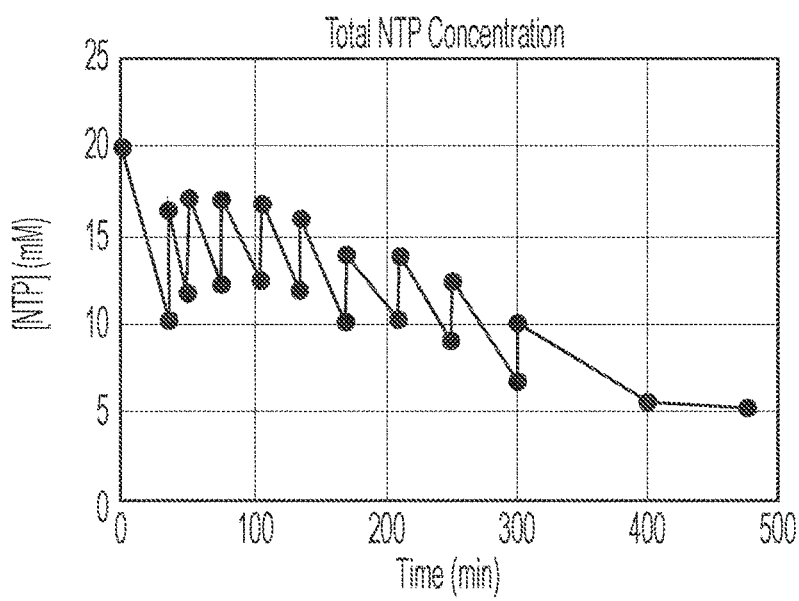
FIGS. 17A-17B. Measured total nucleotide concentrations during the example bolus (FIG. 17A) and continuous (FIG. 17B) fed-batch IVT reactions for RNA #3.
Figure 17B:
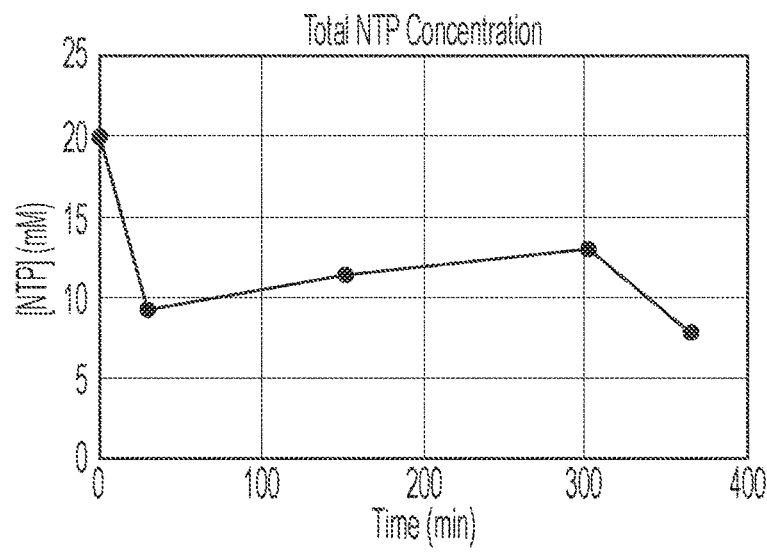
Figure 18A:
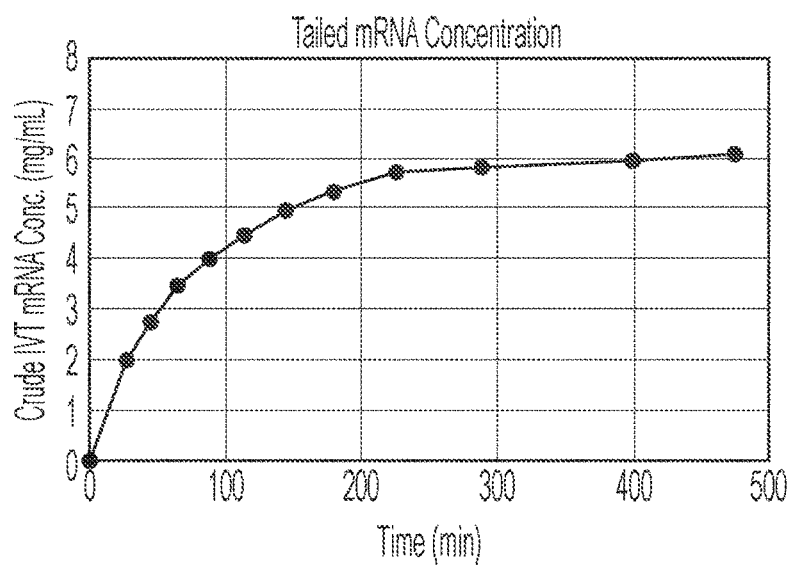
FIGS. 18A-18B and 19A-19B. Measured RNA product yields for the bolus and continuous fed-batch IVT reactions of RNA #3.
Figure 18B:
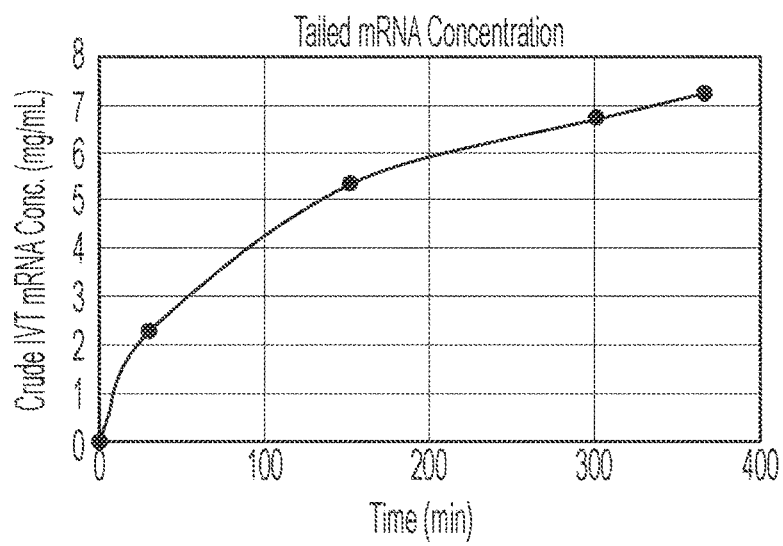
Figure 19A:
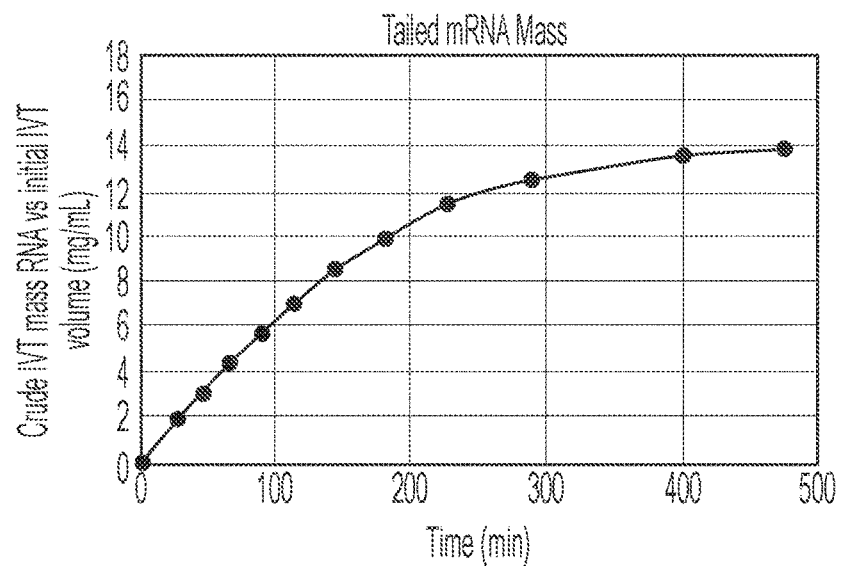
Figure 19B:
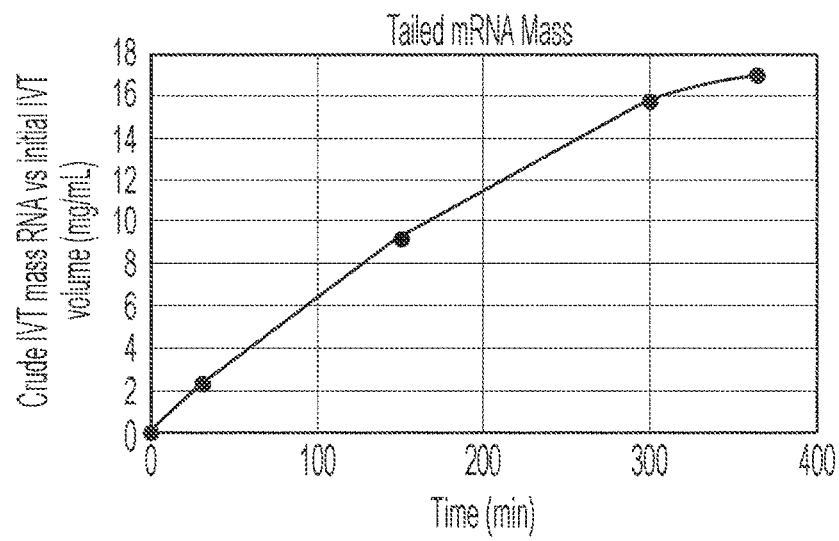

The graphs in FIGS. 17A-17B show that the total nucleotide concentration throughout the IVT reaction for RNA #3 is much more consistent for the continuous fed-batch reaction than the bolus fed-batch reaction. FIGS. 18A-18B and 19A-19B show comparable RNA product yields for the continuous and bolus fed-batch IVT reactions.

Figure 20A:
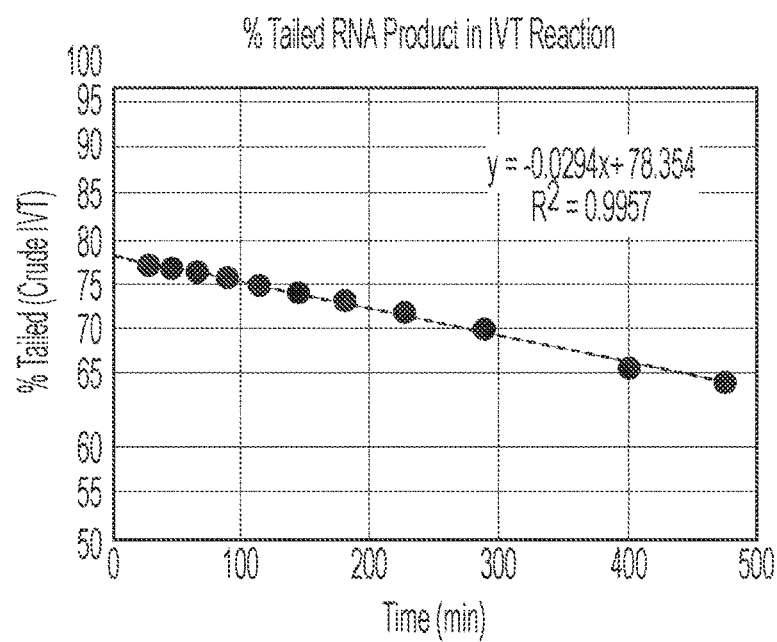
FIGS. 20A-20B. Measured % tailed RNA product during the bolus (FIG. 20A) and continuous (FIG. 20B) fed-batch IVT reactions for RNA #3.
Figure 20B:
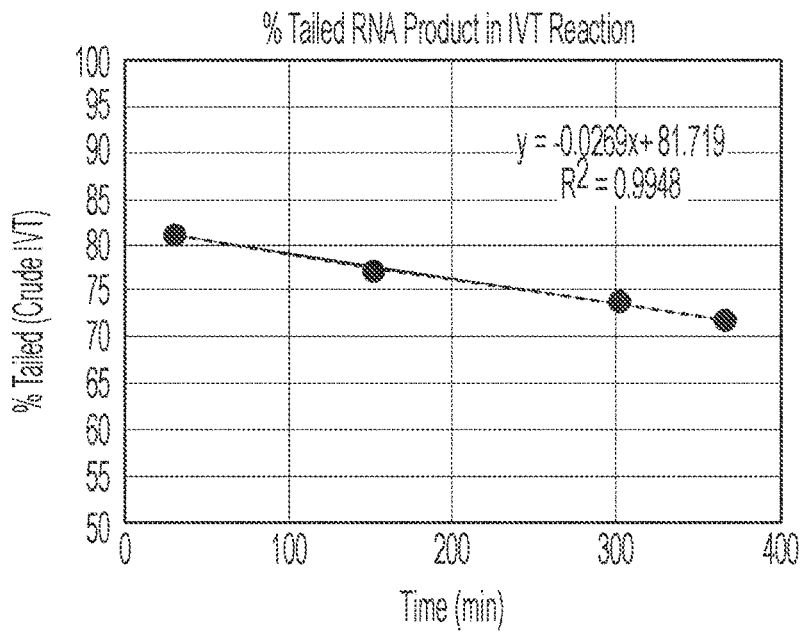
Figure 21A:
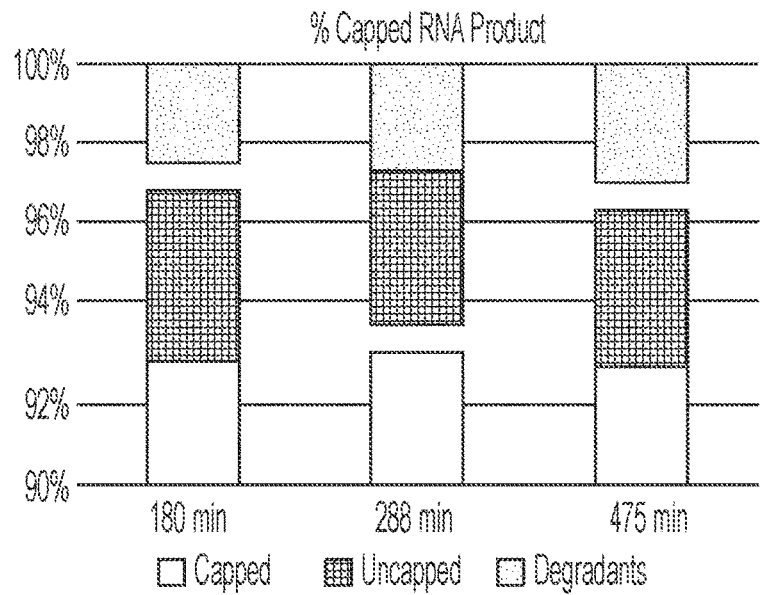
FIGS. 21A-21B. Measured % capped RNA product during the bolus (FIG. 21A) and continuous (FIG. 21B) fed-batch IVT reactions for RNA #3.
Figure 21B:
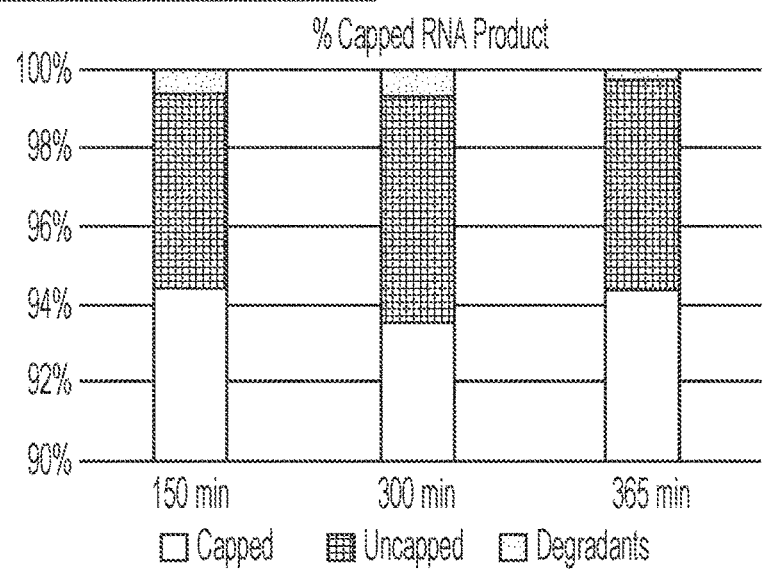

The overall product quality of RNA #3 was slightly improved for the continuous fed-batch IVT reaction compared to bolus fed-batch. The graphs in FIGS. 20A-20B show that the percent of tailed RNA product for RNA #3 is comparable but improved when using continuous over bolus fed-batch. The graphs in FIGS. 21A-21B show that capping was slightly better for the continuous fed-batch IVT reaction. This observation can be explained by a lower average A/GTP-to-trinucleotide ratio throughout the reaction for continuous fed-batch. See FIG. 22.

Example 7. Fed-Batch IVT Using Tetranucleotide Cap Analog

In this example, a fed-batch IVT reaction was performed to synthesize RNA using bolus feeding with tetranucleotide cap analog. An initial IVT mixture was created using nucleotides present in molar ratios balanced to the RNA of interest (Table 8), a GGAG tetranucleotide cap analog, T7 RNA polymerase, pyrophosphatase, buffer, and DNA encoding RNA #4. The initial molar ratio of tetranucleotide cap analog to ATP was 1.3:1. The feed stock master mix was made up of nucleotides, T7 RNA polymerase, pyrophosphatase, and buffer. The reaction was fed using the feed stock master mix at three times in 30-minute intervals, targeting a minimum of 8 mM NTP; and the reaction proceeded for two hours.

A batch IVT reaction using the same initial IVT mixture was performed as a control experiment. The control batch reaction was not fed after the reaction had started.

TABLE 8

Concentrations of nucleotides in initial IVT mixture

| | CTP | GTP | UTP | ATP |
|---|---|---|---|---|
| Concentration relative to total RNA | 29.90% | 24.20% | 15.50% | 30.40% |

Figure 23:
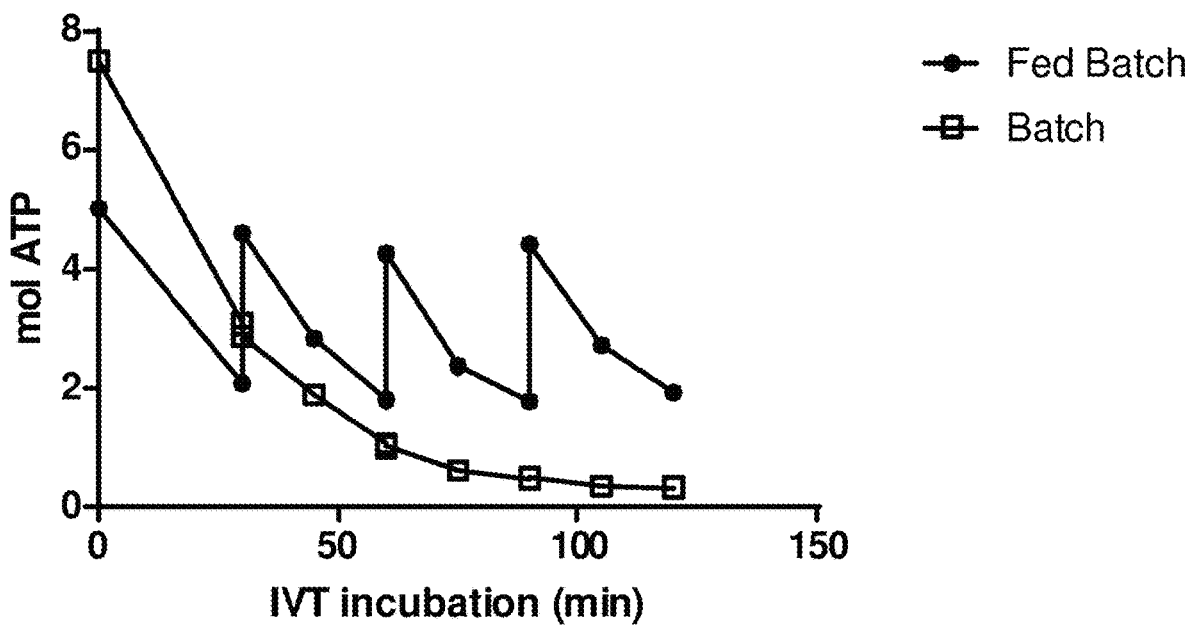
FIG. 23. Measured [ATP] throughout a fed-batch IVT reaction compared to a batch IVT reaction.
Figure 24:
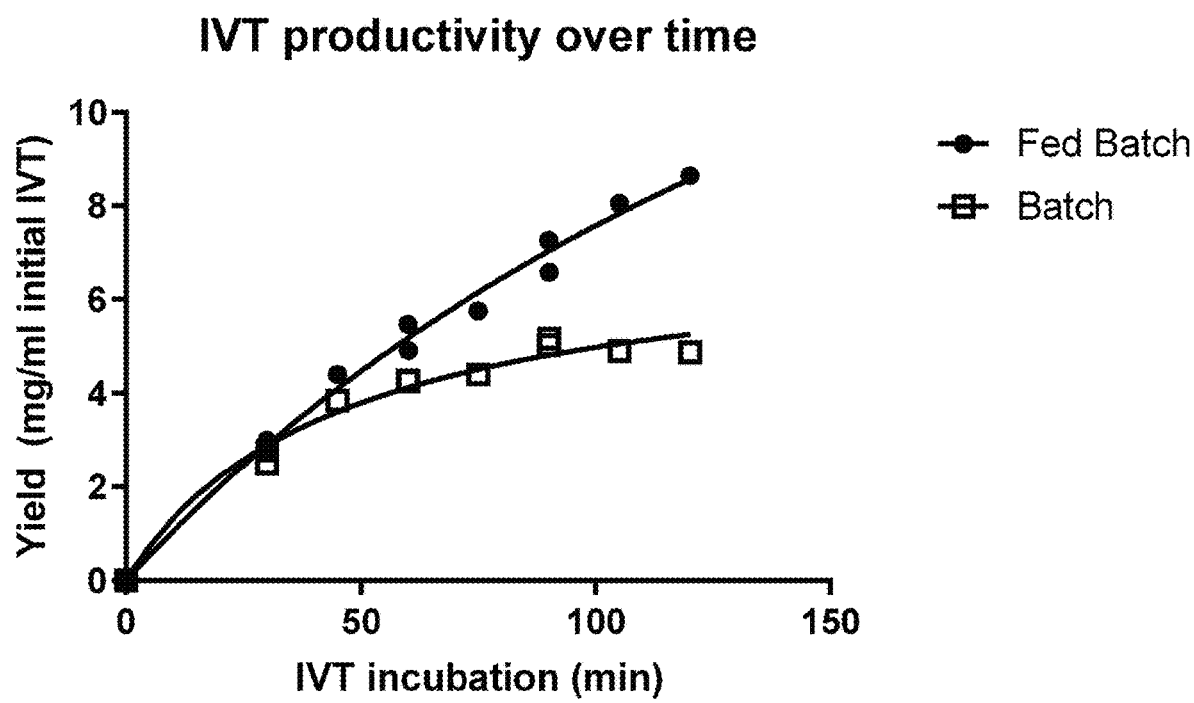
FIG. 24. Measured yield of total RNA (mg/mL initial IVT) for a fed-batch IVT reaction compared to a batch IVT reaction, over a two-hour reaction period.
Figure 25:
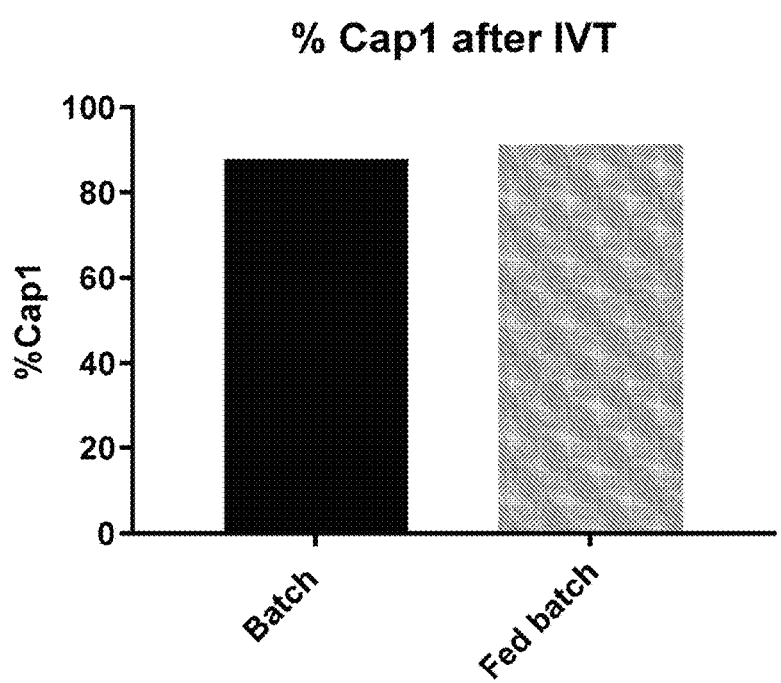
FIG. 25. shows % capped RNA product after a fed-batch IVT reaction compared to a batch IVT reaction, following a two-hour reaction period.

As shown in FIGS. 23-25, ATP concentration, total RNA yield, and percent capping were evaluated for both the fed-batch IVT reaction and the control batch reaction. The fed-batch reaction provided RNA with high capping efficiency (~90% RNA comprising the cap analog). Surprisingly, the fed-batch IVT reaction significantly outperformed the control batch reaction with approximately 1.8-fold higher yield of RNA (~9 mg/mL initial volume for fed-batch reaction compared to ~5 mg/mL initial volume for control batch reaction).

What is claimed is:

1. A method of fed-batch in vitro transcription (IVT) of a messenger ribonucleic acid (mRNA) of interest comprising:
   (a) conducting an IVT reaction with an initial reaction mixture that comprises (i) deoxyribonucleic acid (DNA) encoding an mRNA of interest, (ii) an RNA polymerase, (iii) an initial concentration of nucleoside triphosphates (NTPs) comprising adenosine triphosphate (ATP), cytidine triphosphate (CTP), uridine triphosphate (UTP), and guanosine triphosphate (GTP), and (iv) an RNA cap analog; and
   (b) delivering a feed stock mixture at a continuous flow rate to an ongoing IVT reaction mixture that comprises the initial reaction mixture, wherein the feedstock
      (i) comprises NTPs comprising ATP, CTP, UTP, and GTP at a molar ratio based on percent consumption values that are specific to the mRNA of interest and are calculated separately for each of the NTPs, wherein the percent consumption values are determined using an initial nucleotide empirical balancing reaction, and
      (ii) is delivered in an amount that maintains a total concentration of NTPs in the ongoing reaction mixture that is at least between 5% to 50% of the initial concentration NTPs, thereby producing a transcribed mRNA of interest.

2. The method of claim 1, wherein the continuous flow rate is 2-8 mL/min.

3. The method of claim 1, wherein the initial reaction mixture of (a) comprises a ratio of [ATP]:[UTP] of 1:1 to 4:1 and/or a ratio of [GTP]:[CTP] of 1:1 to 4:1.

4. The method of claim 1, wherein each of the NTPs in the initial reaction mixture of (a) is present at a concentration of 1-10 mM.

5. The method of claim 1, wherein at least 90% of the transcribed mRNA of interest comprises the cap analog.

6. The method of claim 1, wherein at least 95% of the transcribed mRNA of interest comprises the cap analog.

7. The method of claim 1, wherein the ongoing IVT reaction mixture comprises an RNA cap analog to ATP ratio of greater than 0.6 and/or an RNA cap analog to GTP ratio of greater than 0.6.

8. The method of claim 1, wherein the transcribed mRNA of interest comprises a length of longer than 100 nucleotides.

9. The method of claim 1, wherein the initial IVT reaction mixture and the ongoing IVT reaction mixture further comprise a buffer.

10. The method of claim 1, wherein the initial IVT reaction mixture and the ongoing IVT reaction mixture further comprise magnesium.

11. The method of claim 1, wherein the feedstock mixture does not include DNA encoding the mRNA of interest or the RNA cap analog.

12. The method of claim 1, wherein each NTP in the initial reaction mixture of (a) is present in an equimolar concentration for each NTP.

13. The method of claim 1, wherein at least one of the ATP, CTP, UTP, and/or GTP molecules is a modified ATP, CTP, UTP, and/or GTP molecule.

14. The method of claim 1, wherein the RNA cap analog is a chemically modified RNA cap analog, a naturally-occurring RNA cap analog, or a synthetic RNA cap analog.

15. The method of claim 1, wherein the initial and ongoing IVT reaction mixtures comprise a ratio of [RNA cap analog]:[purine] of 1:1 to 20:1, 1:1 to 15:1, 1:1 to 10:1, 1:1 to 5:1, 1:1 to 3:1, or 1:1 to 2:1.

16. The method of claim 1, wherein the ongoing IVT reaction mixture is not supplemented with an RNA cap analog during the IVT reaction.

17. The method of claim 1, wherein the DNA concentration in the initial reaction mixture is 0.025-0.075 mg/mL.

18. The method of claim 1, wherein the RNA cap analog is a dinucleotide cap, a trinucleotide cap, or a tetranucleotide cap.

19. The method of claim 1, wherein the UTP is a 1-methylpseudouridine.

* * * * *